(12) United States Patent
Cuenod et al.

(10) Patent No.: US 7,272,725 B2
(45) Date of Patent: *Sep. 18, 2007

(54) METHOD TO PROTECT SOFTWARE AGAINST UNWANTED USE WITH A "TEMPORAL DISSOCIATION" PRINCIPLE

(75) Inventors: Jean-Christophe Cuenod, Montesson (FR); Gilles Sgro, Bourg de Peage (FR)

(73) Assignee: SAS Validy, Romans sur Isere (FR)

( * ) Notice: Subject to any disclaimer, the term of this patent is extended or adjusted under 35 U.S.C. 154(b) by 851 days.

This patent is subject to a terminal disclaimer.

(21) Appl. No.: 10/178,917

(22) Filed: Jun. 25, 2002

(65) Prior Publication Data

US 2003/0028793 A1   Feb. 6, 2003

Related U.S. Application Data

(60) Provisional application No. 60/308,825, filed on Aug. 1, 2001.

(51) Int. Cl.
*G06F 12/14* (2006.01)
*G06F 21/00* (2006.01)

(52) U.S. Cl. .............. 713/193; 713/187; 713/194; 713/189; 380/201

(58) Field of Classification Search ............... 713/187
See application file for complete search history.

(56) References Cited

U.S. PATENT DOCUMENTS 5,608,894 A * 3/1997 Kawakami et al. ......... 717/162
5,754,646 A * 5/1998 Williams et al. ............ 705/55
5,930,357 A * 7/1999 Fukui ........................... 705/59
6,314,409 B2 * 11/2001 Schneck et al. ............. 705/54
6,463,538 B1 * 10/2002 Elteto ......................... 713/190
6,668,325 B1 * 12/2003 Collberg et al. ............ 713/194
6,931,542 B1 * 8/2005 Gregoire .................... 713/193
2001/0037450 A1 * 11/2001 Metlitski et al. ............ 713/152
2001/0044902 A1 * 11/2001 Shavit ........................ 713/200
2003/0023856 A1 * 1/2003 Horne et al. ................ 713/187
2006/0031686 A1 * 2/2006 Atallah et al. .............. 713/190

FOREIGN PATENT DOCUMENTS

| FR | 2634917 | 2/1990 |
| WO | WO9901815 | 1/1999 |
| WO | WO9966387 | 12/1999 |

* cited by examiner

*Primary Examiner*—Nasser Moazzami
*Assistant Examiner*—Carl Colin
(74) *Attorney, Agent, or Firm*—Sughrue Mion Pllc.

(57) ABSTRACT

The invention concerns a process to protect a vulnerable software working on a data processing system against its unauthorized usage using a processing and memorizing unit. The process comprises creating a protected software by choosing in the source of the vulnerable software at least one algorithmic processing and by producing the source of the protected software so that during the execution of the protected software appear several distinct steps, namely 1) the placing of at least one operand at the processing and memorizing unit's disposal 2) the carrying out by the processing and memorizing unit, of the algorithmic processing's functionality on at least said operand 3) and possibly, the placing at the data processing system's disposal of at least one result by the processing and memorizing unit.

51 Claims, 15 Drawing Sheets

METHOD TO PROTECT SOFTWARE AGAINST UNWANTED USE WITH A "TEMPORAL DISSOCIATION" PRINCIPLE

BACKGROUND OF THE INVENTION

This invention concerns the technical domain of data processing systems in the general sense, and is more precisely aimed at the means of protecting software running on said data processing systems against unauthorized usage.

The subject of the invention aims in particular at the means of protecting software against unauthorized usage, using a processing and memorizing unit, such a unit being commonly materialized by a chip card or a material key on USB port.

In the technical domain above, the main problem concerns the unauthorized usage of software by users who have not paid the license rights. This illicit use of software causes an obvious loss for software editors, software distributors and/or any person integrating such software in products. To avoid such illicit copies, various solutions, in the state of technology, have been proposed to protect software.

Thus, a protection solution is known, which makes use of a hardware protection system, such as a physical component named protection key or "dongle". Such a protection key should guarantee that the software executes only in presence of the key. Yet, it must be acknowledged that this solution is ineffective because it presents the inconvenience of being easy to bypass. An ill-intentioned person or a hacker can, with the aid of specialized tools such as disassemblers, delete the control instructions of the protection key. It becomes then possible to make illicit copies corresponding to modified versions of the software able to run without the protection. Moreover, this solution cannot be generalized to all software, inasmuch as it is difficult to connect more than two protection keys to the same system.

BRIEF SUMMARY OF THE INVENTION

The subject of the invention aims precisely at finding a solution to the aforementioned problems by proposing a process to protect a software against unauthorized usage, using an ad hoc processing and memorizing unit, inasmuch as the presence of such a unit is necessary for the software to be completely functional.

So as to reach such a goal, the subject of the invention concerns a process to protect, using at least one blank unit including at least processing means and memorization means, a vulnerable software against its unauthorized usage, said vulnerable software being produced from a source and working on a data processing system. The process according to the invention comprises:
in a protection phase:
  creating a protected software:
    by choosing, at least one algorithmic processing which, during the execution of the vulnerable software, uses at least one operand and enables to obtain at least one result,
    by choosing at least one portion of the source of the vulnerable software containing, at least one chosen algorithmic processing,
    by producing a source of the protected software from the source of the vulnerable software, by modifying at least one chosen portion of the source of the vulnerable software to obtain at least one modified portion of the source of the protected software, this modification being such that:
      during the execution of the protected software a first execution part is executed in the data processing system and a second execution part is executed in a unit, obtained from the blank unit after upload of information,
      the second execution part executes at least the functionality of at least one chosen algorithmic processing,
      at least one chosen algorithmic processing is split so that during the execution of the protected software appear by means of the second execution part, several distinct steps, namely:
        the placing of at least one operand at the unit's disposal,
        the carrying out by the unit, of the algorithmic processing's functionality on at least said operand,
        and possibly, the placing at the data processing system's disposal of at least one result by the unit,
      for at least one chosen algorithmic processing, steps commands are defined so that during the execution of the protected software, each step command is executed by the first execution part and triggers, in the unit, the execution by means of the second execution part, of a step,
      and a sequence of the steps commands is chosen among the set of sequences allowing the execution of the protected software,
    and by producing:
      a first object part of the protected software, from the source of the protected software, said first object part being such that during the execution of the protected software, appears a first execution part which is executed in the data processing system and whose at least a portion takes into account that the steps commands are executed according to the chosen sequence,
      and a second object part of the protected software, said second object part being such that, after being uploaded to the blank unit and during the execution of the protected software, appears the second execution part by means of which the steps triggered by the first execution are executed,
  and uploading the second object part to the blank unit, with the intention of obtaining the unit,
and during a usage phase during which is executed the protected software:
  in the presence of the unit and each time a step command contained in a portion of the first execution part imposes it, executing the corresponding step in the unit, so that said portion is executed correctly and that, consequently, the protected software is completely functional,
  and in the absence of the unit, in spite of the request by a portion of the first execution part to trigger the execution of a step in the unit, not being able to fulfill said request correctly, so that at least said portion is not executed correctly and that, consequently the protected software is not completely functional.

According to a preferred embodiment, the process according to the invention comprises:
during the protection phase:
  modifying the protected software:
    by choosing at least one variable used in at least one chosen algorithmic processing, which during the execution of the protected software, partially defines the state of the protected software, by modifying at least one chosen portion of the source of the protected software, this modification being such that during the execution of the protected software, at least one chosen variable or at least one copy of chosen variable resides in the unit, and by producing:

the first object part of the protected software, said first object part being such that during the execution of the protected software, at least one portion of the first execution part takes also into account that at least one variable or at least one copy of variable resides in the unit, and the second object part of the protected software, said second object part being such that, after upload to the unit and during the execution of the protected software, appears the second execution part by means of which at least one chosen variable, or at least one copy of chosen variable resides too in the unit, and during the usage phase:

in the presence of the unit each time a portion of the first execution part imposes it, using a variable or a copy of variable residing in the unit, so that said portion is executed correctly and that, consequently, the protected software is completely functional, and in the absence of the unit, in spite of the request by a portion of the first execution part to use a variable or a copy of variable residing in the unit, not being able to fulfill said request correctly, so that at least said portion is not executed correctly and that, consequently the protected software is not completely functional.

According to another preferred embodiment, the process according to the invention comprises:

during the protection phase:

defining:

a set of elementary functions whose elementary functions are liable to be executed in the unit, and a set of elementary commands for said set of elementary functions, said elementary commands being liable to be executed in the data processing system and to trigger the execution in the unit, of the elementary functions, constructing exploitation means enabling the unit to execute the elementary functions of said set, the execution of said elementary functions being triggered by the execution in the data processing system, of the elementary commands, and modifying the protected software:

by modifying at least one chosen portion of the source of the protected software, this modification being such that:

at least one step is split so that during the execution of the protected software, said step is executed by means of the second execution part, using elementary functions, for at least one split step, elementary commands are integrated to the source of the protected software, so that during the execution of the protected software, each elementary command is executed by the first execution part and triggers in the unit, the execution by means of the second execution part, of an elementary function, and a sequence of the elementary commands is chosen among the set of sequences allowing the execution of the protected software, and by producing:

the first object part of the protected software, said first object part being such that during the execution of the protected software, at least one portion of the first execution part also executes the elementary commands according to the chosen sequence, and the second object part of the protected software also containing the exploitation means, said second object part being such that, after upload to the unit and during the execution of the protected software, appears the second execution part by means of which are also executed the elementary functions triggered by the first execution part, and during the usage phase:

in the presence of the unit and each time an elementary command contained in a portion of the first execution part imposes it, executing the corresponding elementary function in the unit, so that said portion is executed correctly and that, consequently, the protected software is completely functional, and in the absence of the unit, in spite of the request by a portion of the first execution part, to trigger the execution of an elementary function in the unit, not being able to fulfill said request correctly, so that at least said portion is not executed correctly and that, consequently, the protected software is not completely functional.

According to another preferred embodiment, the process according to the invention comprises:

during the protection phase:

defining:

at least one software execution characteristic, liable to be monitored at least in part in the unit, at least one criterion to abide by for at least one software execution characteristic, detection means to implement in the unit and enabling to detect that at least one software execution characteristic does not abide by at least one associated criterion, and coercion means to implement in the unit and enabling to inform the data processing system and/or modify the execution of a software, when at least one criterion is not abided by, constructing the exploitation means enabling the unit, to also implement the detection means and the coercion means, and modifying the protected software:

by choosing at least one software execution characteristic to monitor, among the software execution characteristics liable to be monitored, by choosing at least one criterion to abide by for at least one chosen software execution characteristic, by choosing in the source of the protected software, elementary functions for which at least one chosen software execution characteristic is to be monitored, by modifying at least one chosen portion of the source of the protected software, this modification being such that during the execution of the protected software, at least one chosen execution characteristic is monitored by means of the second execution part, and the fact that a criterion is not abided by leads to the data processing system being informed and/or to a modification of the execution of the protected software, and by producing the second object part of the protected software containing the exploitation means also implementing the detection means and the coercion means, said second object part being such that, after upload to the unit and during the execution of the protected software, at least one software execution characteristic is monitored and the fact that a criterion is not abided by leads to the data processing system being informed and/or to a modification of the execution of the protected software, and during the usage phase:
  in the presence of the unit:
    as long as all the criteria corresponding to all the monitored execution characteristics of all the modified portions of the protected software are abided by, enabling said portions of the protected software to work nominally and consequently enabling the protected software to work nominally,
    and if at least one of the criteria corresponding to a monitored execution characteristic of a portion of the protected software is not abided by, informing the data processing system of it and/or modifying the functioning of the portion of the protected software, so that the functioning of the protected software is modified.

According to a variant embodiment, the process according to the invention comprises:
during the protection phase:
  defining:
    as software execution characteristic liable to be monitored, a variable of measurement of the usage of a functionality of a software,
    as criterion to abide by, at least one threshold associated to each variable of measurement,
    and actualization means enabling to update at least one variable of measurement,
  constructing the exploitation means enabling the unit to also implement the actualization means,
  and modifying the protected software:
    by choosing as software execution characteristic to monitor, at least one variable of measurement of the usage of at least one functionality of a software,
    by choosing:
      at least one functionality of the protected software whose usage is liable to be monitored using a variable of measurement,
      at least one variable of measurement used to quantify the usage of said functionality,
      at least one threshold associated to a chosen variable of measurement corresponding to a limit of usage of said functionality,
      and at least one method of update of a chosen variable of measurement depending on the usage of said functionality,
    and by modifying at least one chosen portion of the source of the protected software, this modification being such that, during the execution of the protected software, the variable of measurement is actualized by means of the second execution part depending on the usage of said functionality, and at least one threshold crossing is taken into account,
and during the usage phase, in the presence of the unit, and in the case where at least one threshold crossing corresponding to at least one limit of usage is detected, informing the data processing system of it and/or modifying the functioning of the portion of the protected software, so that the functioning of the protected software is modified.

According to a variant embodiment, the process according to the invention comprises:
during the protection phase:
  defining:
    for at least one variable of measurement, several associated thresholds,
    and different coercion means corresponding to each of said thresholds,
  and modifying the protected software:
    by choosing in the source of the protected software, at least one chosen variable of measurement to which must be associated several thresholds corresponding to different limits of usage of the functionality,
    by choosing at least two thresholds associated to the chosen variable of measurement,
    and by modifying at least one chosen portion of the source of the protected software, this modification being such that, during the execution of the protected software, the crossings of the various thresholds are taken into account differently, by means of the second execution part,
and during the usage phase:
  in the presence of the unit:
    in the case where the crossing of a first threshold is detected, enjoining the protected software not to use the corresponding functionality anymore,
    and in the case where the crossing of a second threshold is detected, making ineffective the corresponding functionality and/or at least one portion of the protected software.

According to a variant embodiment, the process according to the invention comprises:
during the protection phase:
  defining refilling means enabling to credit at least one software functionality monitored by a variable of measurement with at least one additional usage,
  constructing the exploitation means also allowing the unit to implement the refilling means,
  and modifying the protected software:
    by choosing in the source of the protected software, at least one chosen variable of measurement enabling to limit the usage of a functionality and which must be able to be credited with at least one additional usage,
    and by modifying at least one chosen portion, this modification being such that during a phase called of refilling, at least one additional usage of at least one functionality corresponding to a chosen variable of measurement can be credited,
and during the phase of refilling:
  reactualizing at least one chosen variable of measurement and/or at least one associated threshold, so as to allow at least one additional usage of the functionality.

According to a variant embodiment, the process according to the invention comprises:
during the protection phase:
  defining:
    as software execution characteristic liable to be monitored, a profile of software usage,
    and as criterion to abide by, at least one feature of software execution,
  and modifying the protected software:
    by choosing as software execution characteristic to monitor at least one profile of software usage,
    by choosing at least one feature of execution by which at least one chosen profile of usage must abide, and by modifying at least one chosen portion of the source of the protected software, this modification being such that, during the execution of the protected software, the second execution part abides by all the chosen features of execution, and during the usage phase in the presence of the unit, and in the case where it is detected that at least one feature of execution is not abided by, informing the data processing system of it and/or modifying the functioning of the portion of the protected software, so that the functioning of the protected software is modified.

According to a variant embodiment, the process according to the invention comprises:

during the protection phase:
  defining:
    an instructions set whose instructions are liable to be executed in the unit,
    a set of instructions commands for said instructions set, said instructions commands being liable to be executed in the data processing system and to trigger in the unit the execution of the instructions,
    as profile of usage, the chaining of the instructions,
    as feature of execution, an expected chaining for the execution of the instructions,
    as detection means, means enabling to detect that the chaining of the instructions does not correspond to the expected one,
    and as coercion means, means enabling to inform the data processing system and/or to modify the functioning of the portion of protected software when the chaining of the instructions does not correspond to the expected one,
  constructing the exploitation means also enabling the unit to execute the instructions of the instructions set, the execution of said instructions being triggered by the execution in the data processing system, of the instructions commands,
  and modifying the protected software:
    by modifying at least one chosen portion of the source of the protected software:
      by transforming the elementary functions into instructions,
      by specifying the chaining by which must abide at least some of the instructions during their execution in the unit,
      and by transforming the elementary commands into instructions commands corresponding to the instructions used, and during the usage phase, in the presence of the unit, in the case where it is detected that the chaining of the instructions executed in the unit does not correspond to the expected one, informing the data processing system of it and/or modifying the functioning of the portion of the protected software, so that the functioning of the protected software is modified.

According to a variant embodiment, the process according to the invention comprises:

during the protection phase:
  defining:
    as instructions set, an instructions set whose at least some instructions work with registers and use at least one operand with the intention of returning a result,
    for at least some of the instructions working with registers:
      a part defining the functionality of the instruction,
      and a part defining the expected chaining for the execution of the instructions and including bits fields corresponding to:
        an identification field of the instruction,
        and for each operand of the instruction:
          a flag field,
          and an expected identification field of the operand,
      for each register belonging to the exploitation means and used by the instructions set, a generated identification field in which is automatically memorized the identification of the last instruction which has returned its result in said register,
    as detection means, means enabling, during the execution of an instruction, for each operand, when the flag field imposes it, to check the equality of the generated identification field corresponding to the register used by said operand, and the expected identification field of the origin of said operand,
    and as coercion means, means enabling to modify the result of the instructions, if at least one of the checked equalities is false.

According to another preferred embodiment, the process according to the invention comprises:

during the protection phase:
  defining:
    as a triggering command, an elementary command or an instruction command,
    as a dependent function, an elementary function or an instruction,
    as an order, at least one argument for a triggering command, corresponding at least in part to the information transmitted by the data processing system to the unit, so as to trigger the execution of the corresponding dependent function,
    a method of renaming of the orders enabling to rename the orders so as to obtain triggering commands with renamed orders,
    and restoring means designed to be used in the unit during the usage phase, and enabling to restore the dependent function to execute, from the renamed order,
  constructing exploitation means enabling the unit to also implement the restoring means,
  and modifying the protected software:
    by choosing in the source of the protected software, triggering commands,
    by modifying at least one chosen portion of the source of the protected software by renaming the orders of the chosen triggering commands, so as to conceal the identity of the corresponding dependent functions,
    and by producing:
      the first object part of the protected software, said first object part being such that during the execution of the protected software, the triggering commands with renamed orders are executed,
      and the second object part of the protected software containing the exploitation means also implementing the restoring means, said second object part being such that, after upload to the unit and during the execution of the protected software, the identity of the dependent functions whose execution is triggered by the first execution part is restored by means of the second execution part, and the dependent functions are executed by means of the second execution part, and during the usage phase:

in the presence of the unit and each time a triggering command with renamed order, contained in a portion of the first execution part imposes it, restoring in the unit, the identity of the corresponding dependent function and executing it, so that said portion is executed correctly and that, consequently, the protected software is completely functional, and in the absence of the unit, in spite of the request by a portion of the first execution part, to trigger the execution of a dependent function in the unit, not being able to fulfill said request correctly, so that at least said portion is not executed correctly and that, consequently, the protected software is not completely functional.

According to a variant embodiment, the process according to the invention comprises:

during the protection phase:

defining for at least one dependent function, a family of dependent functions algorithmically equivalent, but triggered by triggering commands whose renamed orders are different, and modifying the protected software:

by choosing, in the source of the protected software at least one triggering command with renamed order, and by modifying at least one chosen portion of the source of the protected software by replacing at least the renamed order of one chosen triggering command with renamed order, with another renamed order, triggering a dependent function of the same family.

According to a variant embodiment, the process according to the invention comprises:

during the protection phase, defining, for at least one dependent function, a family of algorithmically equivalent dependent functions:

by concatenating a field of noise to the information defining the functional part of the dependent function to execute in the unit, or by using the identification field of the instruction and the expected identification fields of the operands.

According to a variant embodiment, the process according to the invention comprises:

during the protection phase:

defining:

as method of renaming of the orders, a ciphering method to cipher the orders, and as restoring means, means implementing a deciphering method to decipher the renamed orders and thus restore the identity of the dependent functions to execute in the unit.

According to another preferred embodiment, the process according to the invention comprises:

during the protection phase:

modifying the protected software:

by choosing, in the source of the protected software, at least one conditional branch carried out in at least one chosen algorithmic processing, by modifying at least one chosen portion of the source of the protected software, this modification being such that during the execution of the protected software, the functionality of at least one chosen conditional branch is executed, by means of the second execution part, in the unit, and by producing:

the first object part of the protected software, said first object part being such that during the execution of the protected software, the functionality of at least one chosen conditional branch is executed in the unit, and the second object part of the protected software, said second object part being such that, after upload to the unit and during the execution of the protected software, appears the second execution part by means of which the functionality of at least one chosen conditional branch is executed, and during the usage phase:

in the presence of the unit and each time a portion of the first execution part imposes it, executing the functionality of at least one conditional branch in the unit, so that said portion is executed correctly and that, consequently, the protected software is completely functional, and in the absence of the unit and in spite of the request by a portion of the first execution part to execute the functionality of a conditional branch in the unit, not being able to fulfill said request correctly, so that at least said portion is not executed correctly and that consequently, the protected software is not completely functional.

According to a variant embodiment, the process according to the invention comprises, during the protection phase, modifying the protected software:

by choosing, in the source of the protected software, at least one series of chosen conditional branches, by modifying at least one chosen portion of the source of the protected software, this modification being such that during the execution of the protected software, the overall functionality of at least one chosen series of conditional branches is executed, by means of the second execution part, in the unit, and by producing:

the first object part of the protected software, said first object part being such that during the execution of the protected software, the functionality of at least one chosen series of conditional branches is executed in the unit, and the second object part of the protected software, said second object part being such that, after upload to the unit and during the execution of the protected software, appears the second execution part by means of which the overall functionality of at least one chosen series of conditional branches is executed.

The process according to the invention thus enables to protect usage of a software by using a processing and memorizing unit which presents the characteristic of containing a part of the software being executed. It follows that any derived version of the software attempting to work without the processing and memorizing unit imposes to recreate the part of the software contained in the processing and memorizing unit during the execution, or else said derived version of the software will not be completely functional.

BRIEF DESCRIPTION OF THE DRAWINGS

Various other characteristics emerge from the description made below in reference to the appended diagrams which show, as non-limiting examples, embodiments and implementations of the subject of the invention.

DETAILED DESCRIPTION OF THE INVENTION

Figure 10:
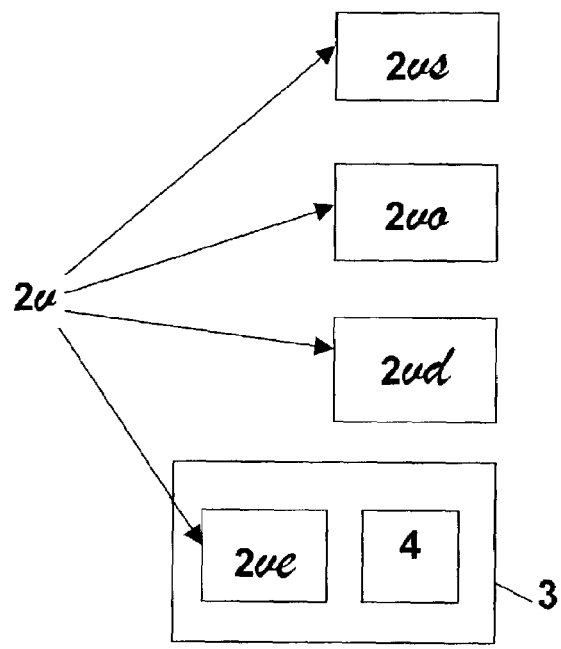
FIGS. 10 and 11 are functional blocks diagrams illustrating the various representations of a software respectively not protected and protected by the process in accordance with the invention.

In the rest of the description, the following definitions will be used:

A data processing system 3 is a system able to execute a program.

A processing and memorizing unit is a unit able:
  to accept data provided by a data processing system 3,
  to return data to the data processing system 3,
  to store data at least partly in secret and to retain at least a part of said data even if the unit is switched off,
  and to carry out algorithmic processing on said data, part or all of the result being secret.

A unit 6 is a processing and memorizing unit implementing the process according to the invention.

A blank unit 60 is a unit which does not implement the process according to the invention, but which can receive data transforming it into a unit 6.

A pre-customized unit 66 is a blank unit 60 which has received part of data enabling it, after reception of supplementary data, to be transformed into a unit 6.

The upload of information to a blank unit 60 or a pre-customized unit 66 corresponds to a transfer of information to the blank unit 60 or the pre-customized unit 66, and to a storage of said transferred information. The transfer can possibly include a change of the information format.

A variable, a function or data contained in the data processing system 3 will be indicated by an uppercase letter, while a variable, a function or data contained in the unit 6 will be indicated by a lowercase letter.

A "protected software", is a software which has been protected by at least one of the principles of protection implemented by the process in accordance with the invention.

A "vulnerable software", is a software which has not been protected by any principle of protection implemented by the process in accordance with the invention.

In the case where differentiation between a vulnerable software and a protected software is not important, the term "software" is used.

A software has various representations depending on the instant considered in its life cycle:
  a source representation,
  an object representation,
  a distribution,
  or a dynamic representation.

A source representation of a software is understood as a representation which after transformation, results in an object representation. A source representation can offer different levels, from a conceptual abstract level to a level executable directly by a data processing system or a processing and memorizing unit.

An object representation of a software corresponds to a level of representation which after transfer to a distribution and upload to a data processing system or a processing and memorizing unit, can be executed. It can be, for instance, a binary code, an interpreted code, etc.

A distribution is a physical or virtual support containing the object representation, said distribution having to be put at the user's disposal to enable them to use the software.

A dynamic representation corresponds to the execution of the software from its distribution.

A portion of a software corresponds to some part of the software and can, for instance correspond, to one or several consecutive or not instructions, and/or one or several consecutive or not functional blocks, and/or one or several functions, and/or one or several subprograms, and/or one or several modules. A portion of a software can also correspond to all of said software.

Figure 11:
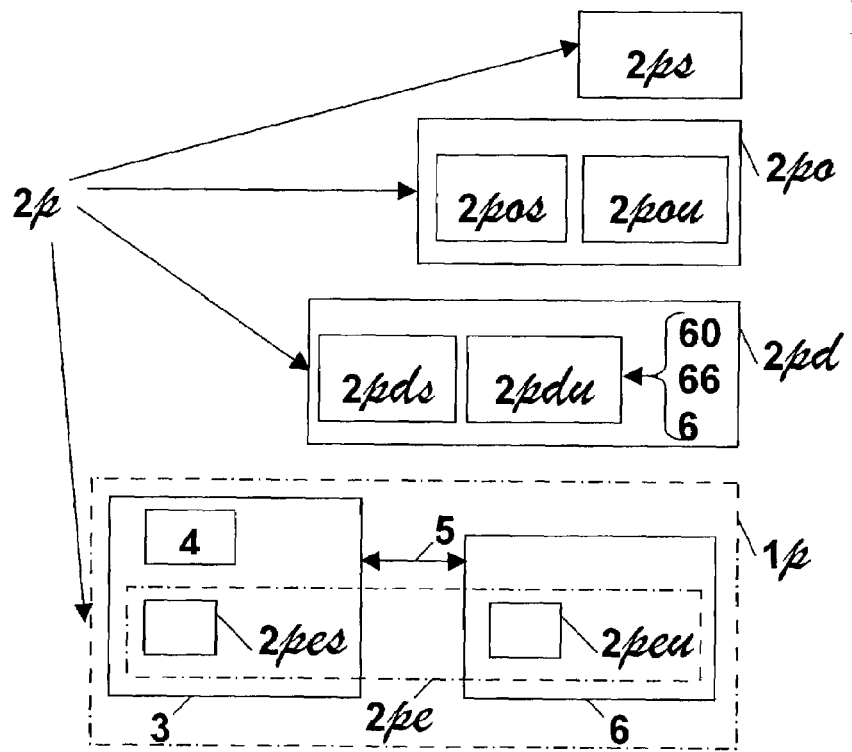

FIGS. 10 and 11 illustrate the various representations respectively of a vulnerable software 2v in the general sense, and of a protected software 2p protected according to the process in accordance with the invention.

FIG. 10 illustrates various representations of a vulnerable software 2v appearing during its life cycle. The vulnerable software 2v can thus appear under any of the following representations:
  a source representation 2vs,
  an object representation 2vo,
  a distribution 2vd. Said distribution can have commonly the form of a physical distribution medium such as a CDROM or the form of files distributed through a network (GSM, Internet, etc.), or a dynamic representation 2ve corresponding to the execution of the vulnerable software 2v on a data processing system 3 of any known type, which classically includes, at least one processor 4.

FIG. 11 illustrates various representations of a protected software 2p appearing during its life cycle. The protected software 2p can thus appear under any of the following representations:

a source representation 2ps including a first source part intended for the data processing system 3 and a second source part intended for the unit 6, part of said source parts can commonly be contained in common files, an object representation 2po including a first object part 2pos intended for the data processing system 3 and a second object part 2pou intended for the unit 6, a distribution 2pd including:

a first distribution part 2pds containing the first object part 2pos, said first distribution part 2pds being intended for the data processing system 3 and which can commonly have the form of a physical distribution medium such as a CDROM or the form of files distributed through a network (GSM, Internet, etc.), and a second distribution part 2pdu having the form:

of at least one pre-customized unit 66 to which a part of the second object part 2pou has been uploaded and for which the user has to finish the customization by uploading supplementary data so as to obtain a unit 6, said supplementary data being obtained, for instance, by download through a network, or of at least one unit 6 to which the second object part 2pou has been uploaded, or a dynamic representation 2pe corresponding to the execution of the protected software 2p. Said dynamic representation 2pe includes a first execution part 2pes which is executed in the data processing system 3 and an second execution part 2peu which is executed in the unit 6.

In the case where the differentiation between the different representations of the protected software 2p is not important, the expressions first part of the protected software and second part of the protected software shall be used.

The implementation of the process according to the invention in accordance with the dynamic representation of FIG. 11, uses an apparatus 1p including a data processing system 3 linked up by a link 5 to a unit 6. The data processing system 3 is of any type and includes, classically, at least one processor 4. The data processing system 3 can be a computer or be part, for instance, of various machines, devices, fixed or mobile products, or vehicles in the general sense. The link 5 can be realized in any possible way, such as for instance a serial link, a USB bus, a radio link, an optical link, a network link or a direct electric connection to a circuit of data processing system 3, etc. It should be observed that the unit 6 can possibly be physically located inside the same integrated circuit than the processor 4 of the data processing system 3. In this case, the unit 6 can be considered as a co-processor in relation to the processor 4 of the data processing system 3 and the link 5 is internal to the integrated circuit.

Figure 20:
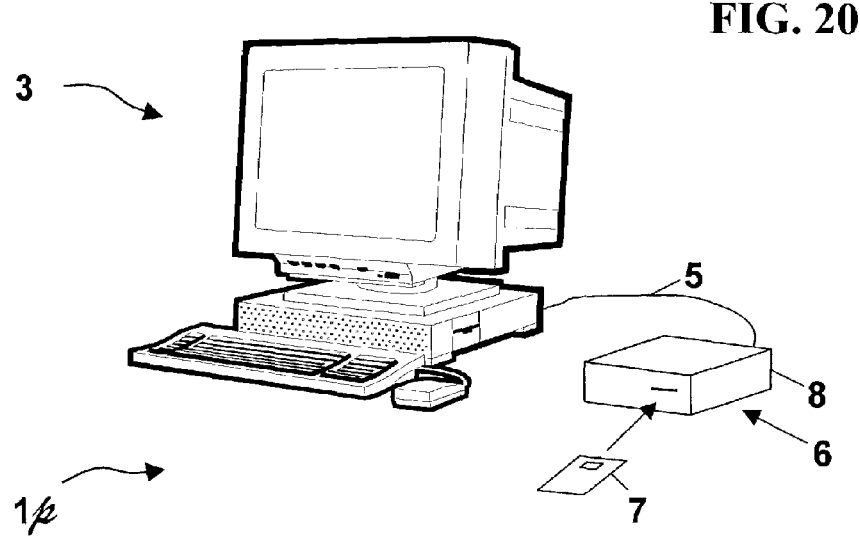
FIGS. 20 to 22 illustrate as examples, various embodiments of an apparatus implementing the process in accordance with the invention.
Figure 21:
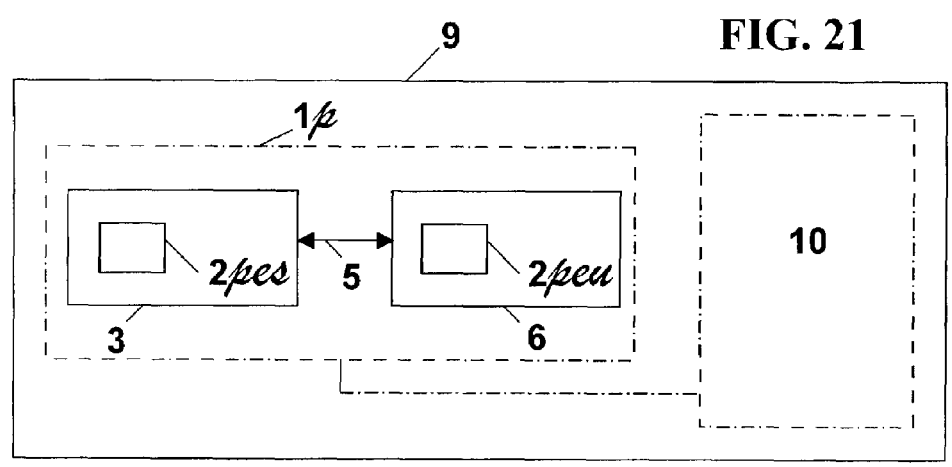
Figure 22:
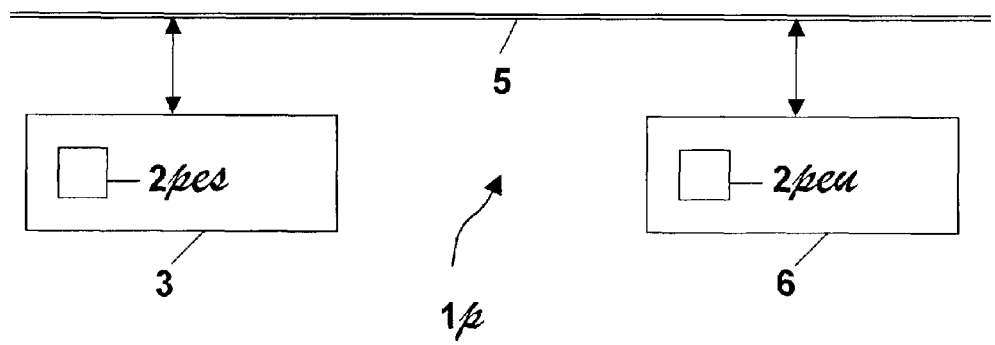

FIGS. 20 to 22 show in an illustrative and non-limiting manner, various embodiments of the apparatus 1p allowing the implementation of the protection process in accordance with the invention.

In the embodiment illustrated in FIG. 20, the protection apparatus 1p includes, as a data processing system 3, a computer and, as a unit 6, a chip card 7 and its interface 8 commonly called card reader. The computer 3 is linked up to the unit 6 by a link 5. During the execution of the protected software 2p, the first execution part 2pes which is executed in the computer 3 and the second execution part 2peu which is executed in the chip card 7 and its interface 8, must both be functional so that the protected software 2p is completely functional.

In the embodiment illustrated in FIG. 21, the protection apparatus 1p equips a product 9 in the general sense, including various components 10 adapted to the function(s) assumed by such a product 9. The protection apparatus 1p includes, on the one hand, a data processing system 3 embedded in the product 9 and, on the other hand, a unit 6 associated with the product 9. So that the product 9 is completely functional, the protected software 2p, must be completely functional. Thus, during the execution of the protected software 2p, the first execution part 2pes which is executed in the data processing system 3 and the second execution part 2peu which is executed in the unit 6, must both be functional. Said protected software 2p enables therefore indirectly, to protect against unauthorized usage, the product 9 or one of its functionalities. For instance, the product 9 can be an installation, a system, a machine, a toy, a piece of domestic appliances, a phone, etc.

In the embodiment illustrated in FIG. 22, the protection apparatus 1p includes several computers, as well as part of a communication network. The data processing system 3 is a first computer linked up by a link 5 of network type, to a unit 6 constituted by a second computer. For the implementation of the invention, the second computer 6 is used as a license server for a protected software 2p. During the execution of the protected software 2p, the first execution part 2pes which is executed in the first computer 3 and the second execution part 2peu which is executed in the second computer 6, must both be functional so that the protected software 2p is completely functional.

Figure 30:
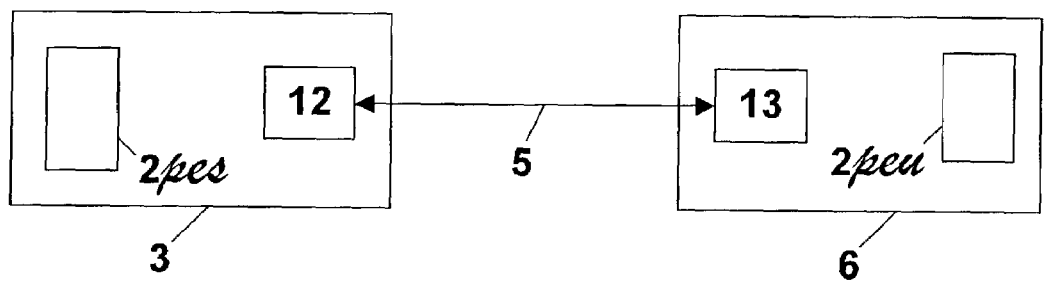
FIGS. 30 and 31 are functional blocks diagrams making explicit the general principle of the process in accordance with the invention.

FIG. 30 enables to make explicit more precisely, the protection process in accordance with the invention. It should be observed that a vulnerable software 2v, is considered as being executed totally in a data processing system 3. On the other hand, in the case of the implementation of a protected software 2p, the data processing system 3 includes transfer means 12 linked up by the link 5, to transfer means 13 being part of the unit 6 enabling to establish communication between the first execution part 2pes and the second execution part 2peu of the protected software 2p.

It must be considered that the transfer means 12, 13 are of software and/or hardware nature and are capable of providing and, possibly, optimizing the data communication between the data processing system 3 and the unit 6. Said transfer means 12, 13 are adapted to enable to have at one's disposal a protected software 2p which is, preferably, independent from the type of link 5 used. Said transfer means 12, 13 are not part of the subject of the invention and are not described more precisely as they are well known by the Man of art. The first part of the protected software 2p includes commands. During the execution of the protected software 2p, the execution of said commands by the first execution part 2pes enables the communication between the first execution part 2pes and the second execution part 2peu. In the rest of the description, said commands are represented by IN, OUT or TRIG.

Figure 31:
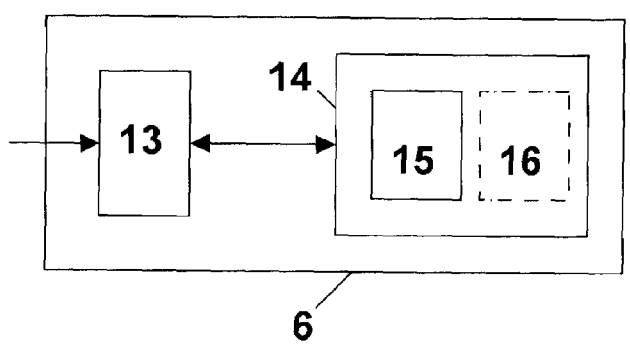

As illustrated in FIG. 31, to allow the implementation of the second execution part 2peu of the protected software 2p, the unit 6 includes protection means 14. The protection means 14 include memorization means 15 and processing means 16.

For the sake of simplification in the rest of the description, it is chosen to consider, during the execution of the protected software 2p, the presence of the unit 6 or the absence of the unit 6. In actual fact, a unit 6 providing protection means 14 not adapted to the execution of the second execution part 2peu of the protected software 2p is also considered as missing, each time the execution of the protected software 2p is not correct. In other words:

- a unit 6 physically present and including protection means 14 adapted to the execution of the second execution part 2peu of the protected software 2p, is always considered as present,
- a unit 6 physically present but including protection means 14 not adapted, i.e. not allowing the correct implementation of the second execution part 2peu of the protected software 2p is considered as present, when it works correctly, and as missing when it does not work correctly,
- and a unit 6 physically missing is always considered as missing.

In the case where the unit 6 is constituted by a chip card 7 and its interface 8, the transfer means 13 are split into two parts, one being on the interface 8 and the other one being on the chip card 7. In this embodiment, the absence of the chip card 7 is considered as equivalent to the absence of the unit 6. In other words, in the absence of the chip card 7 and/or its interface 8, the protection means 14 are not accessible and do not enable the execution of the second execution part 2peu of the protected software 2p, so much so that the protected software 2p is not completely functional.

In accordance with the invention, the protection process aims at implementing a principle of protection, called by "temporal dissociation", a description of which is carried out in relation to FIGS. 50 to 54.

For the implementation of the principle of protection by temporal dissociation, is chosen, in the source of the vulnerable software 2vs, at least one algorithmic processing using at least one operand and returning at least one result. Is also chosen at least one portion of the source of the vulnerable software 2vs containing at least one chosen algorithmic processing.

At least one chosen portion of the source of the vulnerable software 2vs is then modified, so as to obtain the source of the protected software 2ps. This modification is such that, among others:

- during the execution of the protected software 2p, at least one portion of the first execution part 2pes, which is executed in the data processing system 3, takes into account that the functionality of at least one chosen algorithmic processing is executed in the unit 6,
- during the execution of the protected 2p, the second execution part 2peu, which is executed in the unit 6, executes at least the functionality of at least one chosen algorithmic processing,
- during the execution of the protected software 2p, each chosen algorithmic processing is split into several distinct steps, namely:
  - step 1: the placing of the operand(s) at the unit 6's disposal,
  - step 2: the carrying out in the unit 6, of the functionality of the chosen algorithmic processing using said operand(s),
  - and step 3: possibly, the placing of the result of the chosen algorithmic processing at the data processing system 3's disposal by the unit 6,
- steps commands are defined to trigger the execution of the steps,
- and a sequence of the steps commands is chosen among the set of sequences allowing the execution of the protected software 2p.

The first execution part 2pes of the protected software 2p, which is executed in the data processing system 3, executes the steps commands, triggering in the unit 6, the execution by means of the second execution part 2peu, of each of the previously defined steps.

Figure 50:
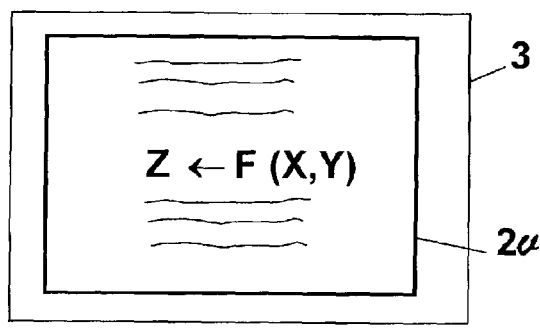
FIGS. 50 to 54 are diagrams illustrating the protection process according to the invention implementing the principle of protection by temporal dissociation.

FIG. 50 illustrates an example of execution of a vulnerable software 2v. In this example, appears, during the execution of the vulnerable software 2v, in the data processing system 3, at a certain time instant, the calculation of $Z \leftarrow F(X, Y)$ corresponding to the assignment to a variable Z, of the result of an algorithmic processing represented by a function F and using operands X and Y.

Figure 51:
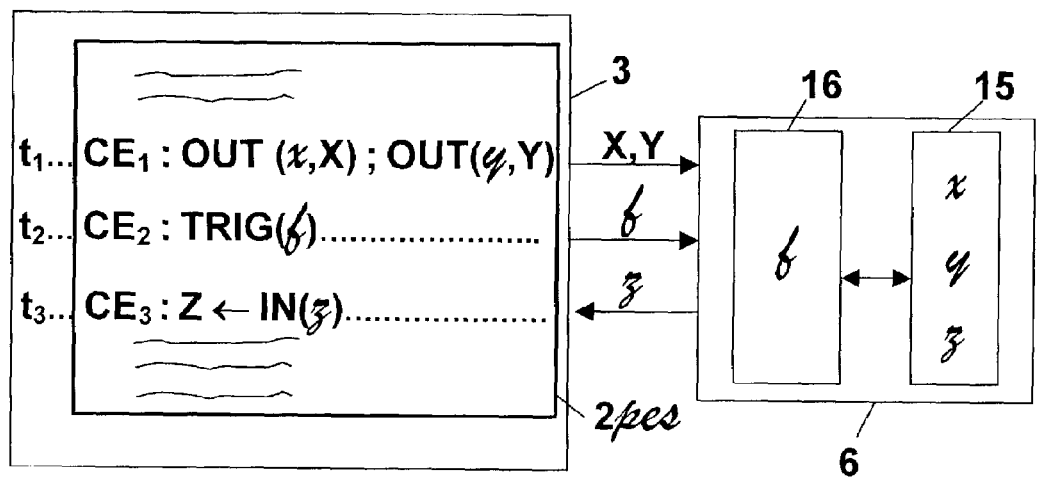

FIG. 51 illustrates an example of implementation of the invention for which the algorithmic processing chosen in FIG. 50 is remoted in the unit 6. In this example, during the execution in the data processing system 3 of the first execution part 2pes of the protected software 2p and in the presence of the unit 6, appear:

- at time instant $t_1$, the step 1, i.e. the execution of a step command $CE_1$ triggering the transfer of data X and Y from the data processing system 3 to the memorization zones respectively x and y located in the memorization means 15 of the unit 6, said step command CE, being represented by OUT(x, X), OUT(y, Y),
- at time instant $t_2$, the step 2, i.e. the execution of a step command $CE_2$, triggering in the unit 6, the execution by means of the second execution part 2peu, of the function f, said function f being algorithmically equivalent to the function F and said step command $CE_2$ being represented by TRIG(f). More precisely, the execution of the step command $CE_2$ leads to the execution of the function f which uses the contents of the memorization zones x and y and returns its result to a memorization zone z of the unit 6,
- and at time instant $t_3$, the step 3, i.e. the execution of a step command $CE_3$ triggering the transfer of the result of the function f, contained in the memorization zone z of the unit 6 to the data processing system 3 so as to assign it to the variable Z, said step command $CE_3$ being represented by IN(z).

In the illustrated example, the steps 1 to 3 are executed successively. It should be observed that two improvements can be effected:

The first improvement concerns the case where several algorithmic processings are remoted in the unit 6 and at least the result of one algorithmic processing is used by another algorithmic processing. In this case, certain transfer steps can possibly be removed.

Figure 52:
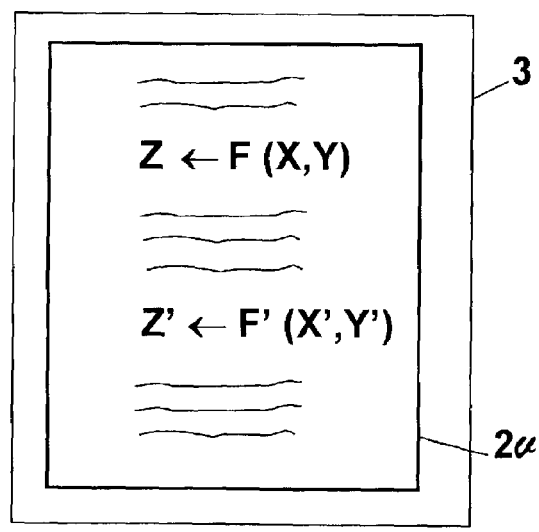
Figure 53:
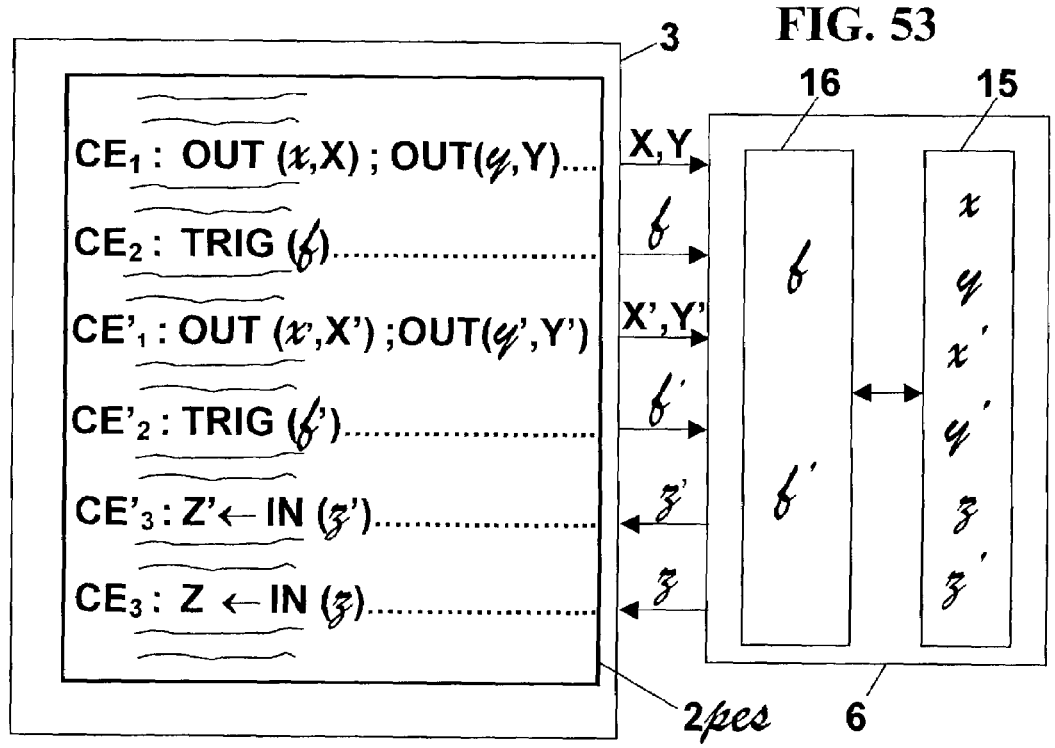

The second improvement aims at opting for a pertinent sequence of the steps commands among the set of sequences allowing the execution of the protected software 2p. In this respect, it is preferable to chose a sequence of the steps commands which temporally dissociates the execution of the steps, by intercalating between them, portions of code executed in the data processing system 3 and including or not steps commands used to determine other data. FIGS. 52 and 53 illustrate the principle of such an embodiment.

FIG. 52 shows an example of execution of a vulnerable software 2v. In this example, appears, during the execution of the vulnerable software 2v, in the data processing system 3, the execution of two algorithmic processings leading to the determination of Z and Z', such that Z←F(X, Y) and Z'←F'(X', Y').

FIG. 53 illustrates an example of implementation of the process according to the invention for which the two algorithmic processings chosen in FIG. 52 are remoted in the unit 6. According to such an example, during the execution in the data processing system 3, of the first execution part 2pes of the protected software 2p, and in the presence of the unit 6, appears, as explained above, the execution of steps commands $CE_1$, $CE_2$, $CE_3$ corresponding to the determination of Z and of steps commands $CE'_1$, $CE'_2$, $CE'_3$ corresponding to the determination of Z'. As illustrated, the steps commands $CE_1$ to $CE_3$ are not executed consecutively inasmuch as steps commands $CE'_1$ to $CE'_3$, as well as other code portions are intercalated. In the example, the following sequence is thus carried out: $CE_1$, portion of intercalated code, $CE_2$, portion of intercalated code, $CE'_1$, portion of intercalated code, $CE'_2$, portion of intercalated code, $CE'_3$, portion of intercalated code, $CE_3$.

It should be observed that, during the execution of the protected software 2p, in the presence of the unit 6, each time a step command contained in a portion of the first execution part 2pes of the protected software 2p imposes it, the corresponding step is executed in the unit 6. Thus, it appears, that in the presence of the unit 6, said portion is executed correctly and that, consequently, the protected software 2p is completely functional.

Figure 54:
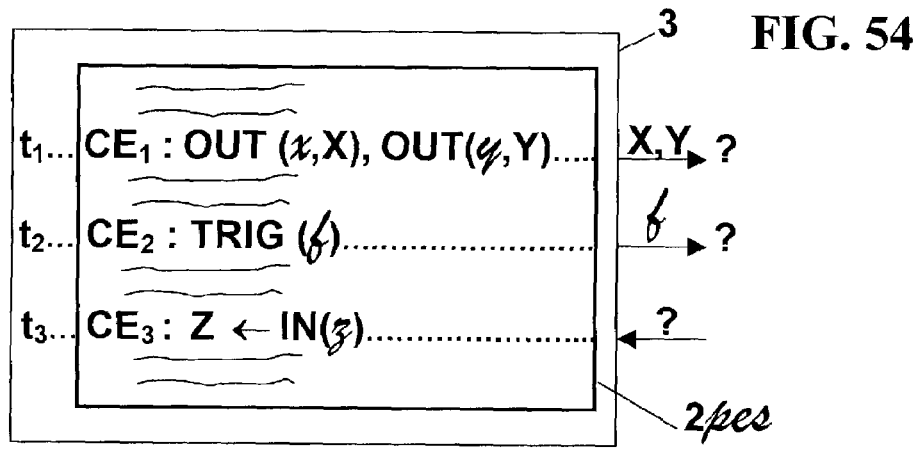

FIG. 54 illustrates an example of an attempt of execution of the protected software 2p, when the unit 6 is missing. In this example, during the execution in the data processing system 3 of the first execution part 2pes of the protected software 2p:

at time instant $t_1$, the execution of the step command OUT(x, X), OUT(y, Y) cannot trigger the transfer of data X and Y to the respective memorization zones x and y taking into account the absence of the unit 6, at time instant $t_2$, the execution of the step command TRIG(f) cannot trigger the execution of the function f, taking into account the absence of the unit 6, and at time instant $t_3$, the execution of the step command IN(z) cannot trigger the transfer of the result of the function f, taking into account the absence of the unit 6.

It therefore appears that in the absence of the unit 6, at least one request by a portion of the first execution part 2pes to trigger the execution of a step in the unit 6, cannot be fulfilled correctly, so that at least said portion is not executed correctly and that, consequently, the protected software 2p is not completely functional.

According to another advantageous characteristic of the invention, the protection process aims at implementing a principle of protection called by <<variable>> a description of which is carried out in relation to FIGS. 40 to 43.

For the implementation of the principle of protection by variable, is chosen in the source of the vulnerable software 2vs at least one variable which, during the execution of the vulnerable software 2v, partially defines its state. By state of a software, must be understood the set of pieces of information, at a given moment, necessary to the complete execution of said software, so much so that the absence of such a chosen variable prejudices the complete execution of said software. Is also chosen at least one portion of the source of the vulnerable software 2vs containing at least one chosen variable.

At least one chosen portion of the source of the vulnerable software 2vs is then modified, so as to obtain the source of the protected software 2ps. This modification is such that during the execution of the protected software 2p, at least one portion of the first execution part 2pes which is executed in the data processing system 3, takes into account that at least one chosen variable or at least one copy of chosen variable resides in the unit 6.

Figure 40:
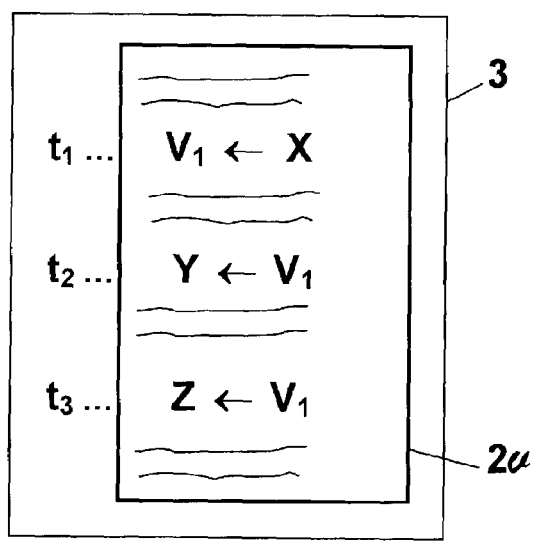
FIGS. 40 to 43 are diagrams illustrating the protection process according to the invention implementing the principle of protection by variable.

FIG. 40 illustrates an example of execution of a vulnerable software 2v. In this example, during the execution of the vulnerable software 2v in the data processing system 3, appear:

at time instant $t_1$, the assignment of the data X to the variable $V_1$, represented by $V_1 \leftarrow X$, at time instant $t_2$, the assignment of the value of the variable $V_1$ to the variable Y, represented by $Y \leftarrow V_1$, and at time instant $t_3$, the assignment of the value of the variable $V_1$ to the variable Z, represented by $Z \leftarrow V_1$.

Figure 41:
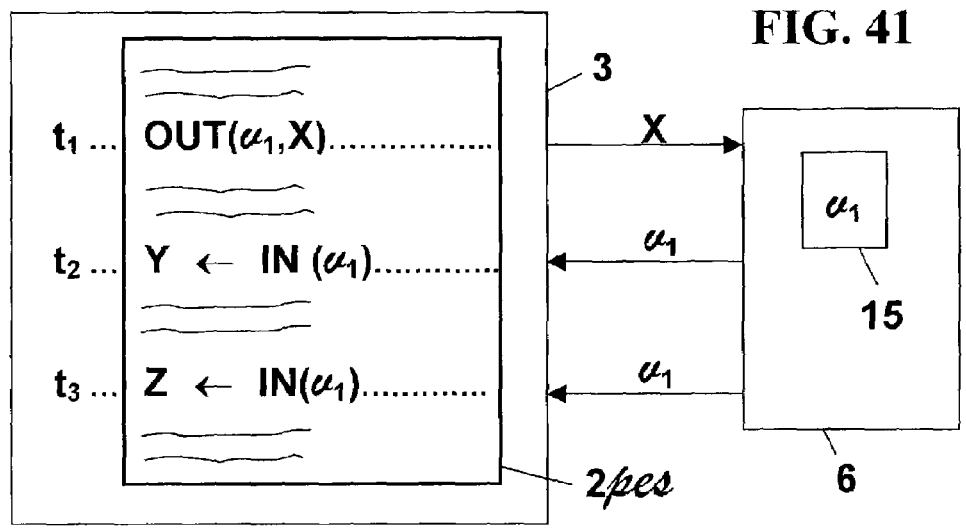

FIG. 41 illustrates an example of a first form of implementation of the invention for which the variable resides in the unit 6. In this example, during the execution in the data processing system 3 of the first execution part 2pes of the protected software 2p, and in presence of the unit 6, appear:

at time instant $t_1$, the execution of a transfer command triggering the transfer of the data X from the data processing system 3 to the variable $v_1$ located in the memorization means 15 of the unit 6, said transfer command being represented by OUT($v_1$, X) and corresponding in the end to the assignment of the data X to the variable $v_1$, at time instant $t_2$, the execution of a transfer command triggering the transfer of the value of the variable $v_1$ residing in the unit 6 to the data processing system 3 so as to assign it to the variable Y, said transfer command being represented by IN($v_1$) and corresponding in the end to the assignment of the value of the variable $v_1$ to the variable Y, and at time instant $t_3$, the execution of a transfer command triggering the transfer of the value of the variable $v_1$ residing in the unit 6 to the data processing system 3 so as to assign it to the variable Z, said transfer command being represented by IN($v_1$) and corresponding in the end to the assignment of the value of the variable $v_1$ to the variable Z.

It should be observed that during the execution of the protected software 2p, at least one variable resides in the unit 6. Thus, when a portion of the first execution part 2pes of the protected software 2p imposes it, and in the presence of the unit 6, the value of said variable residing in the unit 6 is transferred to the data processing system 3 to be used by the first execution part 2pes of the protected software 2p, so much so that said portion is executed correctly and that, consequently, the protected software 2p is completely functional.

Figure 42:
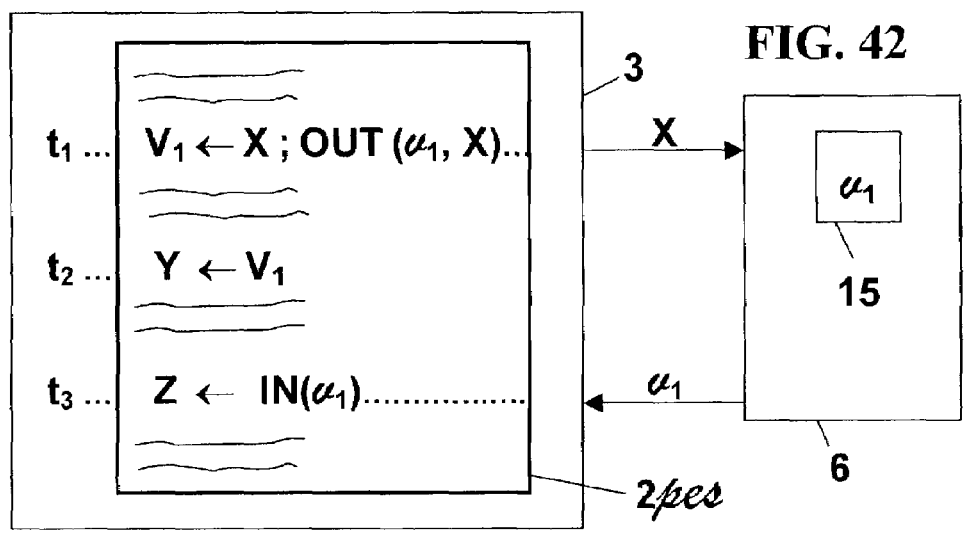

FIG. 42 illustrates an example of a second form of implementation of the invention for which a copy of the variable resides in the unit 6. In this example, during the execution in the data processing system 3 of the first execution part 2pes of the protected software 2p, and in the presence of the unit 6, appear:

at time instant $t_1$, the assignment of the data X to the variable $V_1$ located in the data processing system 3, as well as the execution of a transfer command triggering the transfer of the data X from the data processing system 3 to the variable $v_1$ located in the memorization means 15 of the unit 6, said transfer command being represented by OUT($v_1$, X), at time instant $t_2$, the assignment of the value of the variable $V_1$ to the variable Y, and at time instant $t_3$, the execution of a transfer command triggering the transfer of the value of the variable $v_1$ residing in the unit 6 to the data processing system 3 so as to affect it to the variable Z, said transfer command being represented by IN($v_1$).

It should be observed that during the execution of the protected software 2p, at least one copy of a variable resides in the unit 6. Thus, when a portion of the first execution part 2pes of the protected software 2p, imposes it, and in the presence of the unit 6, the value of said copy of variable residing in the unit 6 is transferred to the data processing system 3 to be used by the first execution part 2pes of the protected software 2p, so much so that said portion is executed correctly and that, consequently, the protected software 2p is completely functional.

Figure 43:
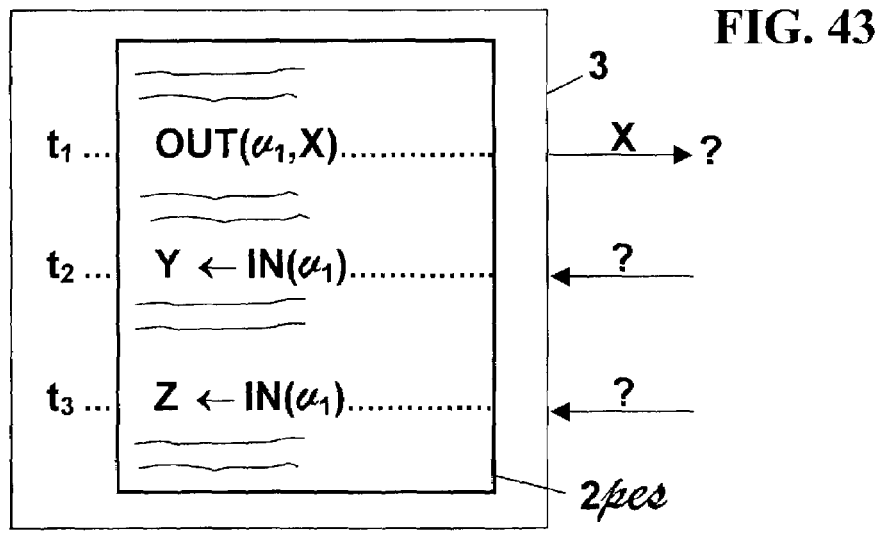

FIG. 43 illustrates an example of attempt of execution of the protected software 2p, when the unit 6 is missing. In this example, during the execution in the data processing system 3 of the first execution part 2pes of the protected software 2p:

at time instant $t_1$, the execution of the transfer command OUT($v_1$, X) cannot trigger the transfer of the data X to the variable $v_1$, taking into account the absence of the unit 6, at time instant $t_2$, the execution of the transfer command IN($v_1$) cannot trigger the transfer of the value of the variable $v_1$ to the data processing system 3, taking into account the absence of the unit 6, and at time instant $t_3$, the execution of the transfer command IN($v_1$) cannot trigger the transfer of the value of the variable $v_1$ to the data processing system 3, taking into account the absence of the unit 6.

It therefore appears that in the absence of the unit 6, at least one request by a portion of the first execution part 2pes to use a variable or a copy of variable residing in the unit 6, cannot be fulfilled correctly, so that at least said portion is not executed correctly and that, consequently, the protected software 2p is not completely functional.

It should be observed that the data transfers between the data processing system 3 and the unit 6 illustrated in the previous examples use only simple assignments but that the Man of art will know how to combine them with other operations to obtain complex operations such as for instance OUT(v1, 2*X+3) or Z←(5*v1+v2).

According to another advantageous characteristic of the invention, the protection process aims at implementing a principle of protection called by <<elementary function>> a description of which is carried out in relation to FIGS. 60 to 64.

For the implementation of the principle of protection by elementary functions, are defined:

a set of elementary functions whose elementary functions are liable to be executed, by means of the second execution part 2peu, in the unit 6, and possibly to transfer data between the data processing system 3 and the unit 6, and a set of elementary commands for said set of elementary functions, said elementary commands being liable to be executed in the data processing system 3 and to trigger the execution in the unit 6, of the corresponding elementary functions.

For the implementation of the principle of protection by elementary functions, are also constructed exploitation means enabling to transform a blank unit 60 into a unit 6 able to execute elementary functions, the execution of said elementary functions being triggered by the execution in the data processing system 3, of elementary commands.

For the implementation of the principle of protection by elementary functions, is also chosen, in the source of the vulnerable software 2vs, at least one algorithmic processing using at least one operand and returning at least one result. Is also chosen at least one portion of the source of the vulnerable software 2vs containing at least one chosen algorithmic processing.

At least one chosen portion of the source of the vulnerable software 2vs is then modified, so as to obtain the source of the protected software 2ps. This modification is such that, among others:

during the execution of the protected software 2p, at least one portion of the first execution part 2pes, which is executed in the data processing system 3, takes into account that the functionality of at least one chosen algorithmic processing is executed in the unit 6, during the execution of the protected software 2p, the second execution part 2peu, which is executed in the unit 6, executes at least the functionality of at least one chosen algorithmic processing, each chosen algorithmic processing is split so that during the execution of the protected software 2p, each chosen algorithmic processing is executed, by means of the second execution part 2peu, using elementary functions. Preferably, each chosen algorithmic processing is split into elementary functions $fe_n$ (with n varying from 1 to N), namely:

possibly one or several elementary functions enabling the placing of one or several operands at the unit 6's disposal, elementary functions, some of which use the operand(s) and in combination, execute the functionality of the chosen algorithmic processing, using said operand(s), and possibly one or several elementary functions enabling the placing of the result of the chosen algorithmic processing at the data processing system 3's disposal by the unit 6, and a sequence of the elementary commands is chosen among the set of sequences allowing the execution of the protected software 2p.

The first execution part 2pes of the protected software 2p, which is executed in the data processing system 3, executes elementary commands $CFE_n$ (with n varying from 1 to N), triggering in the unit 6, the execution by means of the second execution part 2peu, of each of the previously defined elementary functions $fe_n$.

Figure 60:
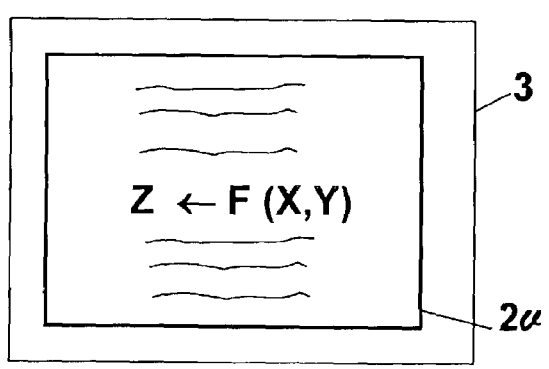
FIGS. 60 to 64 are diagrams illustrating the protection process according to the invention implementing the principle of protection by elementary functions.

FIG. 60 illustrates an example of execution of a vulnerable software 2v. In this example, appears, during the execution of the vulnerable software 2v in the data processing system 3, at a certain time instant, the calculation of Z←F(X, Y) corresponding to the assignment to a variable Z of the result of an algorithmic processing represented by a function F and using operands X and Y.

Figure 61:
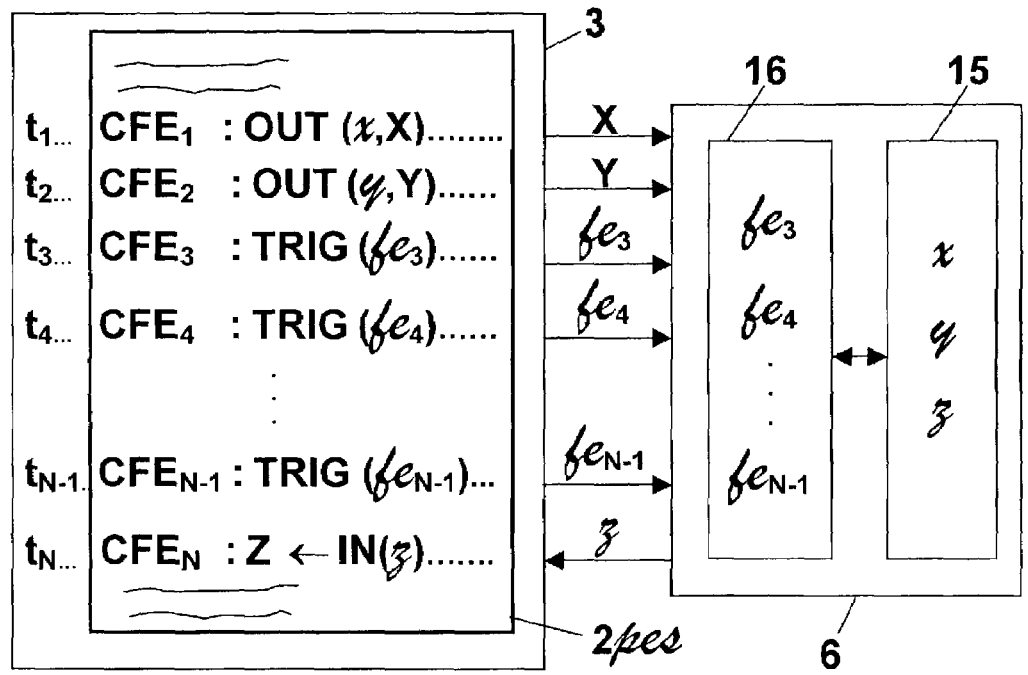

FIG. 61 illustrates an example of implementation of the invention for which the algorithmic processing chosen in FIG. 60 is remoted in the unit 6. In this example, during the execution in the data processing system 3 of the first execution part 2pes of the protected software 2p and in the presence of the unit 6, appear:

at time instants $t_1$, $t_2$, the execution of the elementary commands $CFE_1$, $CFE_2$ triggering in the unit 6, the execution by means of the second execution part 2*peu*, of the corresponding elementary functions $fe_1$, $fe_2$ which provide the transfer of data X, Y from the data processing system 3 to memorization zones respectively x, y located in the memorization means 15 of the unit 6, said elementary commands $CFE_1$, $CFE_2$ being represented respectively by OUT(x, X), OUT(y, Y), at time instants $t_3$ to $t_{N-1}$, the execution of the elementary commands $CFE_3$ to $CFE_{N-1}$, triggering in the unit 6, the execution by means of the second execution part 2*peu*, of the corresponding elementary functions $fe_3$ to $fe_{N-1}$, said elementary commands $CFE_3$ to $CFE_{N-1}$ being represented, respectively, by $TRIG(fe_3)$ to $TRIG(fe_{N-1})$. The series of elementary functions $fe_3$ to $fe_{N-1}$ executed in combination is algorithmically equivalent to the function F. More precisely, the execution of said elementary commands leads to the execution in the unit 6, of the elementary functions $fe_3$ to $fe_{N-1}$ which use the contents of the memorization zones x, y and return the result to a memorization zone z of the unit 6, and at time instant $t_N$, the execution of the elementary command $CFE_N$ triggering in the unit 6, the execution by means of the second execution part 2*peu*, of the elementary function $fe_N$ providing the transfer of the result of the algorithmic processing, contained in the memorization zone z of the unit 6 to the data processing system 3, so as to assign it to the variable Z, said elementary command $CFE_N$ being represented by IN(z).

In the illustrated example, the elementary commands 1 to N are executed successively. It should be observed that two improvements can be effected:

The first improvement concerns the case where several algorithmic processings are remoted in the unit 6 and at least the result of one algorithmic processing is used by another algorithmic processing. In this case, some elementary commands used for the transfer, can possibly be removed.

Figure 62:
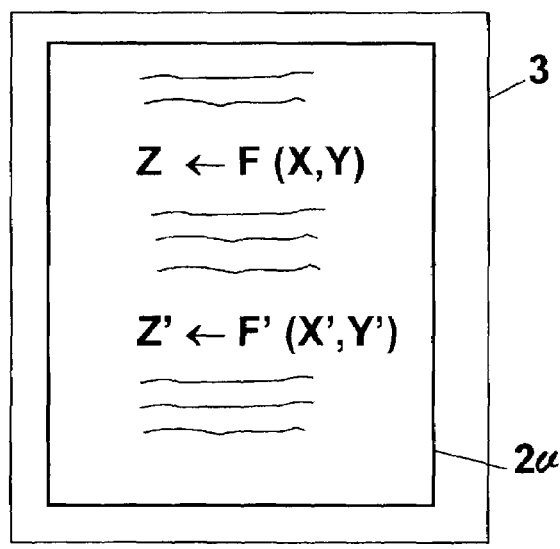
Figure 63:
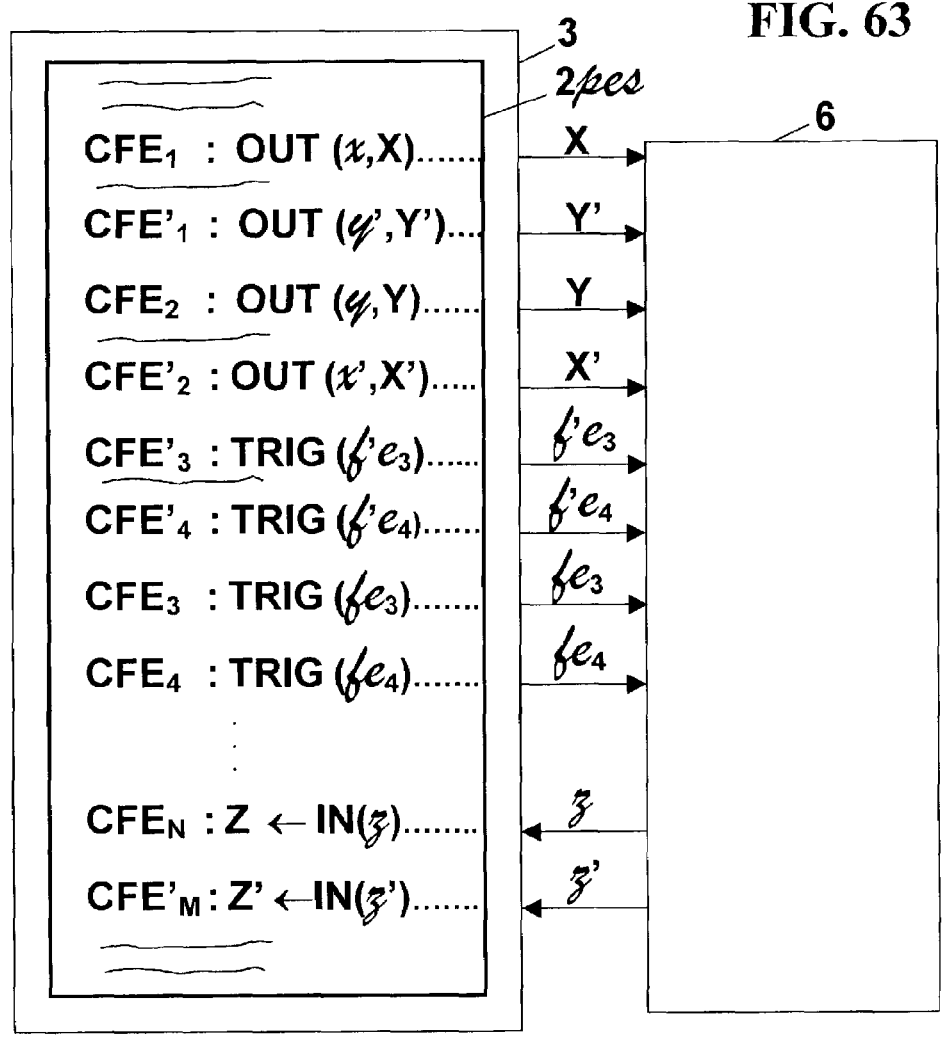

The second improvement aims at opting for a pertinent sequence of the elementary commands among the set of sequences allowing the execution of the protected software 2*p*. In this respect, it is preferable to choose a sequence of the elementary commands which temporally dissociates the execution of the elementary functions, by intercalating between them, portions of code executed in the data processing system 3 and including or not elementary commands used for the determination of other data. FIGS. 62 and 63 illustrate the principle of such an embodiment.

FIG. 62 shows an example of execution of a vulnerable software 2*v*. In this example, appears during the execution of the vulnerable software 2*v*, in the data processing system 3, the execution of two algorithmic processings leading to the determination of Z and Z', such that $Z \leftarrow F(X, Y)$ and $Z' \leftarrow F'(X', Y')$.

FIG. 63 illustrates an example of implementation of the process according to the invention for which the two algorithmic processing chosen in FIG. 62 are remoted in the unit 6. According to such an example, during the execution in the data processing system 3 of the first execution part 2*pes* of the protected software 2*p* and in the presence of the unit 6, appear, as explained above, the execution of the elementary commands $CFE_1$ to $CFE_N$ corresponding to the determination of Z and the execution of the elementary commands $CFE'_1$, to $CFE'_M$ corresponding to the determination of Z'.

As illustrated, the elementary commands $CFE_1$ to $CFE_N$ are not executed consecutively, inasmuch as the elementary commands $CFE'_1$, to $CFE'_M$, as well as other portions of code are intercalated. In the example, the following sequence is thus carried out: $CFE_1$, portion of intercalated code, $CFE'_1$, $CFE_2$, portion of intercalated code, $CFE'_2$, $CFE'_3$, portion of intercalated code, $CFE'_4$, $CFE_3$, $CFE_4$, . . . , $CFE_N$, $CFE'_M$.

It should be observed that, during the execution of the protected software 2*p*, in the presence of the unit 6, each time an elementary command contained in a portion of the first execution part 2*pes* of the protected software 2*p* imposes it, the corresponding elementary function is executed in the unit 6. Thus, it appears, that in the presence of the unit 6, said portion is executed correctly and that, consequently, the protected software 2*p* is completely functional.

Figure 64:
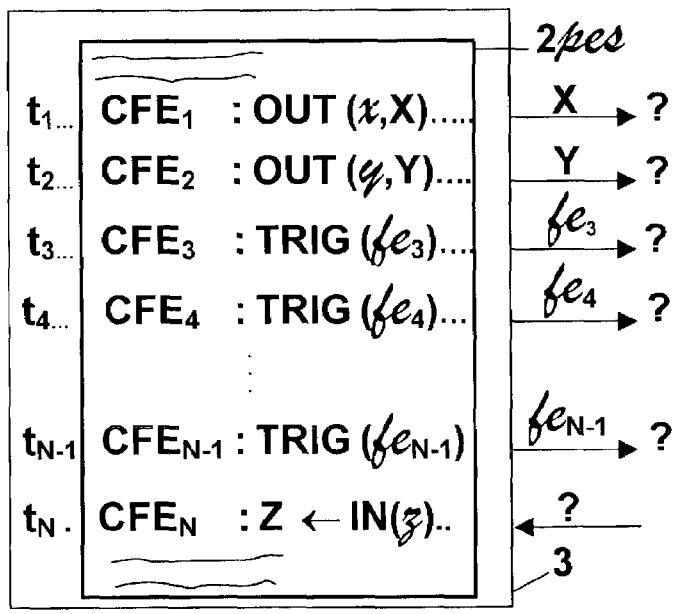

FIG. 64 illustrates an example of an attempt of execution of the protected software 2*p*, when the unit 6 is missing. In this example, during the execution in the data processing system 3, of the first execution part 2*pes* of the protected software 2*p*, at every time instant, the execution of an elementary command cannot trigger the execution of the corresponding elementary function, because of the absence of the unit 6. The value to assign to the variable Z cannot therefore be determined correctly.

It therefore appears, that in the absence of the unit 6, at least one request by a portion of the first execution part 2*pes* of the protected software 2*p*, to trigger the execution of an elementary function in the unit 6 cannot be fulfilled correctly, so that at least said portion is not executed correctly and that, consequently, the protected software 2*p* is not completely functional.

According to another advantageous characteristic of the invention, the protection process aims at implementing a principle of protection, called by <<detection and coercion>>, a description of which is carried out in relation to FIGS. 70 to 74.

For the implementation of the principle of protection by detection and coercion, are defined:
  at least one software execution characteristic liable to be monitored at least in part in the unit 6,
  at least one criterion to abide by for at least one software execution characteristic,
  detection means 17 to implement in the unit 6 and enabling to detect that at least one software execution characteristic does not abide by at least one associated criterion,
  and coercion means 18 to implement in the unit 6 and enabling to inform the data processing system 3 and/or modify the execution of a software, when at least one criterion is not abided by.

For the implementation of the principle of protection by detection and coercion, are also constructed exploitation means enabling to transform a blank unit 60 into a unit 6 implementing at least the detection means 17 and the coercion means 18.

Figure 70:
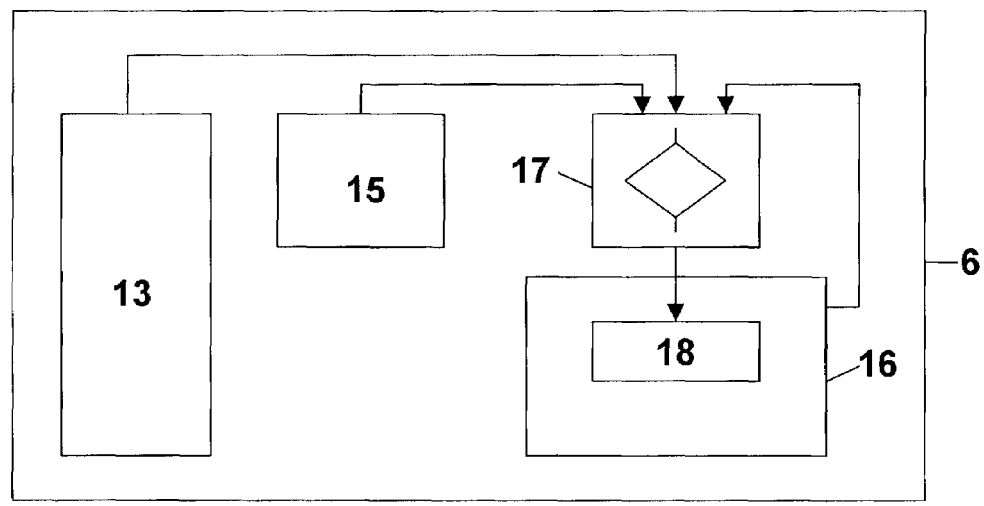
FIGS. 70 to 74 are diagrams illustrating the protection process according to the invention implementing the principle of protection by detection and coercion.

FIG. 70 illustrates the means necessary to the implementation of this principle of protection by detection and coercion. The unit 6 includes the detection means 17 and the coercion means 18 belonging to the processing means 16. The coercion means 18 are informed by the detection means 17 that a criterion has not been abided by.

More precisely, the detection means 17 use information coming from the transfer means 13 and/or from the memorization means 15 and/or from the processing means 16, so as to monitor one or several software execution characteristics. For each software execution characteristic is set at least one criterion to abide by.

In the case where it is detected that at least one software execution characteristic does not abide by at least one criterion, the detection means 17 inform the coercion means 18 of it. Said coercion means 18 are adapted to modify, in the appropriate way, the state of the unit 6.

For the implementation of the principle of protection by detection and coercion, are also chosen:
- at least one software execution characteristic to monitor, among the software execution characteristics liable to be monitored,
- at least one criterion to abide by for at least one chosen software execution characteristic,
- in the source of the vulnerable software 2vs, at least one algorithmic processing for which at least one software execution characteristic is to be monitored,
- and in the source of the vulnerable software 2vs, at least one portion containing at least one chosen algorithmic processing.

At least one chosen portion of the source of the vulnerable software 2vs is then modified, so as to obtain the source of the protected software 2ps. This modification is such that, during the execution of the protected software 2p, among others:
- at least one portion of the first execution part 2pes, which is executed in the data processing system 3, takes into account that at least one chosen software execution characteristic is to be monitored, at least in part in the unit 6,
- and the second execution part 2peu, which is executed in the unit 6, monitors at least in part, a chosen software execution characteristic.

During the execution of the protected software 2p, protected by this principle of protection by detection and coercion, in the presence of the unit 6:
- as long as all the criteria corresponding to all the monitored execution characteristics of all the modified portions of the protected software 2p are abided by, said modified portions of the protected software 2p work nominally, so that said protected software 2p works nominally,
- and if at least one of the criteria corresponding to a monitored execution characteristic of a portion of the protected software 2p is not abided by, the data processing system 3 is informed of it and/or the functioning of the portion of the protected software 2p is modified, so that the functioning of the protected software 2p is modified.

Naturally, in the absence of the unit 6, at least one request by a portion of the first execution part 2pes of the protected software 2p to use the unit 6 cannot be fulfilled correctly so that at least said portion is not executed correctly and that consequently the protected software 2p is not completely functional.

For the implementation of the principle of protection by detection and coercion, two types of software execution characteristics are used preferentially.

The first type of software execution characteristic corresponds to a variable of measurement of the execution of a software and the second type corresponds to a profile of usage of a software. Said two types of characteristics can be used independently or in combination.

For the implementation of the principle of protection by detection and coercion using, as execution characteristic, a variable of measurement of software execution, are defined:

- in the memorization means 15, the possibility to memorize at least one variable of measurement used to quantify the usage of at least one functionality of a software,
- in the detection means 17, the possibility to monitor at least one threshold associated to each variable of measurement,
- and actualization means enabling to update each variable of measurement depending on the usage of the functionality to which it is associated.

Are also constructed exploitation means implementing, in addition to the detection means 17 and the coercion means 18, the actualization means.

Are also chosen, in the source of the vulnerable software 2vs:
- at least one functionality of the vulnerable software 2v whose usage is liable to be monitored using a variable of measurement,
- at least one variable of measurement used to quantify the usage of said functionality,
- at least one threshold associated to the variable of measurement corresponding to a limit of usage of said functionality,
- and at least one method of update of the variable of measurement depending on the usage of said functionality.

The source of the vulnerable software 2vs is then modified, so as to obtain the source of the protected software 2ps, this modification being such that, during the execution of the protected software 2p, the second execution 2peu:
- actualizes the variable of measurement depending on the usage of said functionality,
- and takes into account at least one threshold crossing.

In other words, during the execution of the protected software 2p, the variable of measurement is updated depending on the usage of said functionality, and when the threshold is crossed, the detection means 17 inform of it the coercion means 18 which make an adapted decision to inform the data processing system 3 and/or to modify the processings carried out by the processing means 16 enabling to modify the functioning of the portion of the protected software 2p, so that the functioning of the protected software 2p is modified.

For the implementation of a first preferred variant embodiment of the principle of protection by detection and coercion using, as characteristic, a variable of measurement, are defined:
- for at least one variable of measurement, several associated thresholds,
- and different coercion means corresponding to each of said thresholds.

Are also chosen, in the source of the vulnerable software 2vs:
- at least one variable of measurement used to quantify the usage of at least one functionality of the software and to which must be associated several thresholds corresponding to different limits of usage of said functionalities,
- and at least two thresholds associated to the variable of measurement.

The source of the vulnerable software 2vs is then modified, so as to obtain the source of the protected software 2ps, this modification being such that, during the execution of the protected software 2p, the second execution part 2peu:
- actualizes the variable of measurement depending on the usage of said functionality, and takes into account, differently, the crossing of the various thresholds.

In other words, classically, during the execution of the protected software 2p, when the first threshold is crossed, the unit 6 informs the data processing system 3 enjoining the protected software 2p not to use said functionality anymore. If the protected software 2p carries on using said functionality, the second threshold will potentially be crossed. In the case where the second threshold is crossed, the coercion means 18 can make the chosen functionality ineffective and/or make the protected software 2p ineffective.

For the implementation of a second preferred variant embodiment of the principle of protection by detection and coercion using, as characteristic, a variable of measurement, are defined refilling means enabling to credit at least one software functionality monitored by a variable of measurement with at least one additional usage.

Are also constructed exploitation means implementing, in addition to the detection means 17, the coercion means 18 and the actualization means, the refilling means.

Is also chosen, in the source of the vulnerable software 2vs, at least one variable of measurement used to limit the usage of at least one functionality of the software and which must be able to be credited with at least one additional usage.

The source of the vulnerable software 2vs is then modified, so as to obtain the source of the protected software 2ps, this modification being such that, during a phase called of refilling, at least one additional usage of at least one functionality corresponding to a chosen variable of measurement can be credited.

Is carried out, during the phase of refilling, the reactualization of at least one chosen variable of measurement and/or of at least one associated threshold, so as to allow at least one additional usage of the corresponding functionality. In other words, it is possible, during the phase of refilling, to credit additional usages of at least one functionality of the protected software 2p.

For the implementation of the principle of protection by detection and coercion using, as characteristic, a profile of software usage, is defined as criterion to abide by for said profile of usage, at least one feature of software execution.

Are also chosen, in the source of the vulnerable software 2vs:
  at least one profile of usage to monitor,
  and at least one feature of execution by which at least one chosen profile of usage must abide.

The source of the vulnerable software 2vs is then modified, so as to obtain the source of the protected software 2ps, this modification being such that, during the execution of the protected software 2p, the second execution part 2peu abides by all the chosen features of execution. In other words, the unit 6 itself monitors the way the second execution part 2peu is executed and can inform the data processing system 3 and/or modify the functioning of the protected software 2p, in the case where at least one feature of execution is not abided by.

During the execution of the protected software 2p, protected by this principle, in the presence of the unit 6:
  as long as all the features of execution of all the modified portions of the protected software 2p are abided by, said modified portions of the protected software 2p work nominally, so that said protected software 2p works nominally,
  and if at least one feature of execution of a portion of protected software 2p is not abided by, the data processing system 3 is informed of it and/or the functioning of the portion of the protected software 2p is modified, so that the functioning of the protected software 2p is modified.

The monitoring of different features of execution can be considered, like for instance the monitoring of the presence of instructions including a marker or the monitoring of the execution chaining for at least one part of the instructions.

For the implementation of the principle of protection by detection and coercion using as feature of execution to abide by, the monitoring of the execution chaining for at least one part of the instructions, are defined:
  an instructions set, whose instructions are liable to be executed in the unit 6,
  a set of instructions commands for said instructions set, said instructions commands are liable to be executed in the data processing system 3. The execution of each of said instructions commands in the data processing system 3 triggers in the unit 6, the execution of the corresponding instruction,
  detection means 17 enabling to detect that the chaining of the instructions does not correspond to the expected one,
  and coercion means 18 enabling to inform the data processing system 3 and/or to modify the execution of a software when the chaining of the instructions does not correspond to the expected one.

Are also constructed exploitation means enabling the unit 6 to also execute the instructions of the instructions set, the execution of said instructions being triggered by the execution in the data processing system 3 of the instructions commands.

Is also chosen, in the source of the vulnerable software 2vs, at least one algorithmic processing which must be remoted in the unit 6 and for which the chaining of at least one part of the instructions is to be monitored.

The source of the vulnerable software 2vs is then modified, so as to obtain the source of the vulnerable software 2ps, this modification being such that, during the execution of the protected software 2p:
  the second execution part 2peu executes at least the functionality of the chosen algorithmic processing,
  the chosen algorithmic processing is split into instructions,
  the chaining by which at least some of the instructions must abide during their execution in the unit 6 is specified,
  and the first execution part 2pes of the protected software 2p executes instructions commands which trigger the execution of the instructions in the unit 6.

During the execution of the protected software 2p, protected by this principle, in the presence of the unit 6:
  as long as the chaining of the instructions of all the modified portions of the protected software 2p, executed in the unit 6 corresponds to the expected one, said modified portions of the protected software 2p work nominally, so that said protected software 2p works nominally,
  and if the chaining of the instructions of a portion of the protected software 2p executed in the unit 6 does not correspond to the expected one, the data processing system 3 is informed of it and/or the functioning of the portion of protected software 2p is modified, so that the functioning of the protected software 2p is modified.

Figure 71:
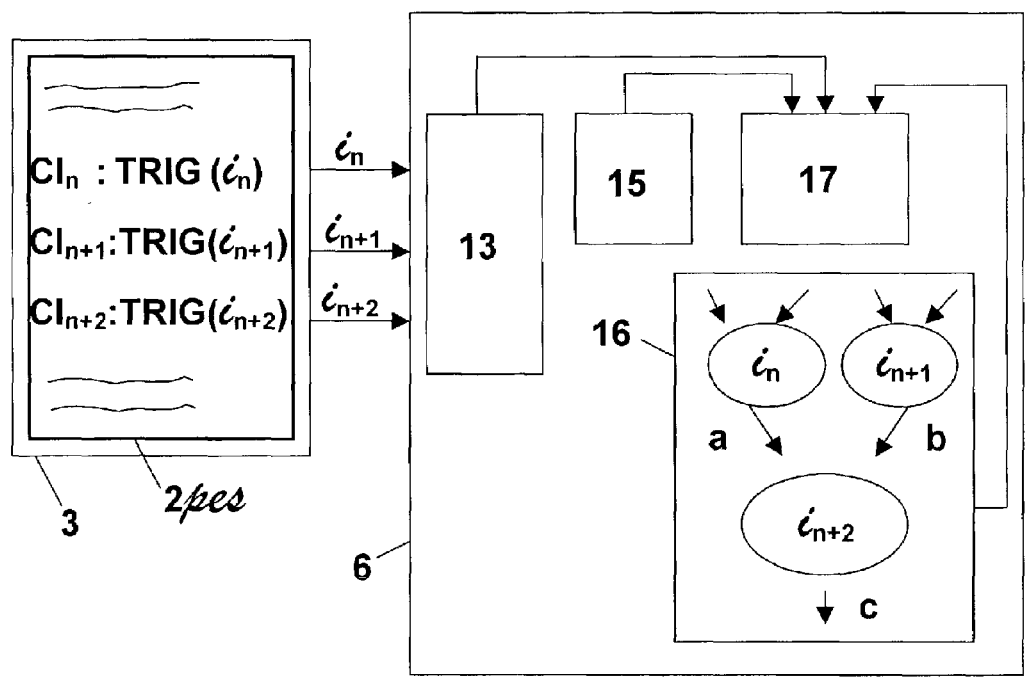

FIG. 71 illustrates an example of implementation of the principle of protection by detection and coercion using, as feature of execution to abide by the monitoring of the execution chaining of a at least one part of the instructions, in the case where the expected chaining is abided by.

The first execution part 2pes of the protected software 2p, executed in the data processing system 3, executes instructions commands $CI_i$ triggering, in the unit 6 the execution of the instructions $i_i$ belonging to the instructions set. In said instructions set, at least some of the instructions each include a part defining the functionality of the instruction and a part enabling to verify the expected chaining for the execution of the instructions. In this example, the instructions commands $CI_i$ are represented by $TRIG(i_i)$ and the expected chaining for the execution of the instructions is $i_n$, $i_{n+1}$ and $i_{n+2}$. The execution in the unit 6, of the instruction in gives the result a and the execution of the instruction $i_{n+1}$ gives the result b. The instruction $i_{n+2}$ uses as operand, the results a and b of the instructions $i_n$ and $i_{n+1}$ and its execution gives the result c.

Taking into account that said chaining of the instructions executed in the unit 6 corresponds to the expected one, it results in a normal or nominal functioning of the protected software 2p.

Figure 72:
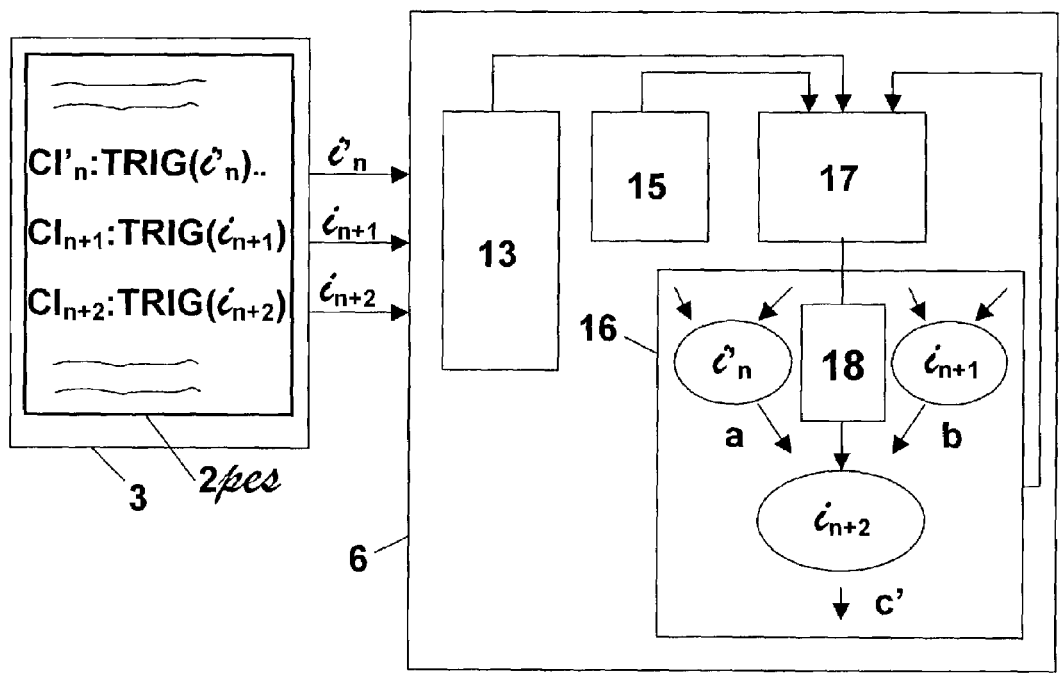

FIG. 72 illustrates an example of implementation of the principle of protection by detection and coercion using, as feature of execution to abide by, the monitoring of the execution chaining of at least one part of the instructions, in the case where the expected chaining is not abided by.

According to this example, the expected chaining for the execution of the instructions is still $i_n$, $i_{n+1}$ and $i_{n+2}$. However, the execution chaining is modified by the replacement of the instruction $i_n$ with the instruction $i'_n$, so that the chaining actually executed is $i'_n$, $i_{n+1}$ and $i_{n+2}$. The execution of the instruction $i'_n$ gives the result a, i.e. the same result that the execution of the instruction in. However, at the latest during the execution of the instruction $i_{n+2}$, the detection means 17 detect that the instruction $i'_n$ does not correspond to the expected instruction to generate the result a used as operand of the instruction $i_{n+2}$. The detection means 17 inform of it the coercion means 18 which modify accordingly, the functioning of the instruction $i_{n+2}$, so that the execution of the instruction $i_{n+2}$ gives the result c' which can be different than c. Naturally, if the execution of the instruction $i'_n$ gives a result a' different from the result a of the instruction $i_n$, it is clear that the result of the instruction $i_{n+2}$ can also be different from c.

Inasmuch as the execution chaining of the instructions executed in the unit 6 does not correspond to the expected one, a modification of the functioning of the protected software 2p can therefore be obtained.

Figure 73:
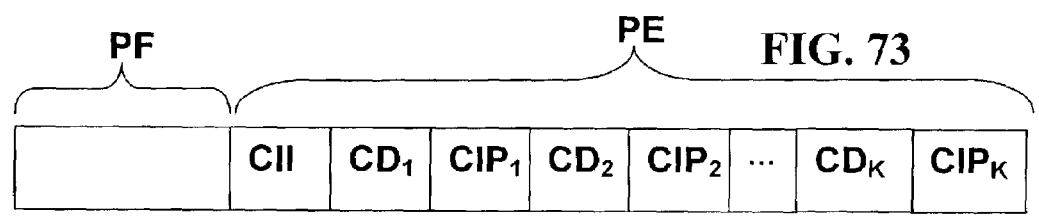
Figure 74:

FIGS. 73 and 74 illustrates a preferred variant embodiment of the principle of protection by detection and coercion using, as feature of execution to abide by, the monitoring of the execution chaining of at least one part of the instructions. According to this preferred variant, is defined an instructions set whose at least some instructions work with registers and use at least one operand with the intention of returning a result.

As illustrated in FIG. 73, are defined for at least some of the instructions working with registers, a part PF defining the functionality of the instruction and a part PE defining the expected chaining for the execution of the instructions. The part PF corresponds to the operation code known by the Man of art. The part PE defining the expected chaining, includes bits fields corresponding to:

an identification field of the instruction CII, and for each operand k of the instruction, with k varying from 1 to K, and K number of operands of the instruction:

a flag field $CD_k$, indicating whether or not it is appropriate to verify the origin of the operand k, and an expected identification field $CIP_k$ of the operand, indicating the expected identity of the instruction which has generated the contents of the operand k.

As illustrated in FIG. 74, the instructions set includes V registers belonging to the processing means 16, each register being named $R_v$, with v varying from 1 to V. For each register $R_v$, are defined two fields, namely:

a functional field $CF_v$, known by the Man of art and enabling to store the result of the execution of the instructions, and a generated identification field $CIG_v$ enabling to memorize the identity of the instruction which has generated the contents of the functional field $CF_v$. Said generated identification field $CIG_v$ is automatically updated with the contents of the identification field of the instruction CII which has generated the functional field $CF_v$. Said generated identification field $CIG_v$ is neither accessible, nor modifiable by any of the instructions and is solely used for the detection means 17.

During the execution of an instruction, the detection means 17 carry out for each operand k the following operations:

the flag field $CD_k$ is read, if the flag field $CD_k$ imposes it, the expected identification field $CIP_k$ and the generated identification field $CIG_v$, corresponding to the register used by the operand k are both read, the equality of the two fields $CIP_k$ and $CIG_v$ is checked, and if the equality is false, the detection means 17 consider that the execution chaining of the instructions is not abided by.

The coercion means 18 enable to modify the result of the instructions when the detection means 17 has informed them of an instructions chaining not abided by. A preferred embodiment is carried out by modifying the functional part PF of the instruction currently executed or the functional part PF of subsequent instructions.

According to another advantageous characteristic of the invention, the protection process aims at implementing a principle of protection, called by <<renaming>> a description of which is carried out in relation to FIGS. 80 to 85.

For the implementation of the principle of protection by renaming, are defined:

a set of dependent functions, whose dependent functions are liable to be executed, by means of the second execution part 2peu, in the unit 6, and possibly to transfer data between the data processing system 3 and the unit 6, said set of dependent functions can be finite or infinite, a set of triggering commands for said dependent functions, said triggering commands being liable to be executed in the data processing system 3 and to trigger in the unit 6, the execution of corresponding dependent functions, for each triggering command, an order corresponding at least in part to the information transmitted by the first execution part 2pes, to the second execution part 2peu, so as to trigger the execution of the corresponding dependent function, said order having the form of at least one argument of the triggering command, a method of renaming of the orders designed to be used during the modification of the vulnerable software 2v, such a method enabling to rename the orders so as to obtain triggering commands with renamed orders enabling to conceal the identity of the corresponding dependent functions, and restoring means 20 designed to be used in the unit 6 during the usage phase and enabling to restore the initial order, from the renamed order, so as to restore the dependent function to execute.

For the implementation of the principle of protection by renaming, are also constructed exploitation means enabling to transform a blank unit 60 into a unit 6 implementing at least the restoring means 20.

For the implementation of the principle of protection by renaming, are also chosen, in the source of the vulnerable software 2vs:

at least one algorithmic processing using at least one operand and returning at least one result, and at least one portion of the source of the vulnerable software 2vs, containing at least one chosen algorithmic processing.

The source of the vulnerable software 2vs is then modified, so as to obtain the source of the protected software 2ps. This modification is such that, among others:

during the execution of the protected software 2p, at least one portion of the first execution part 2pes, which is executed in the data processing system 3, takes into account that the functionality of at least one chosen algorithmic processing is executed in the unit 6, during the execution of the protected software 2p, the second execution part 2peu, which is executed in the unit 6, executes at least the functionality of at least one chosen algorithmic processing, each chosen algorithmic processing is split so that during the execution of the protected software 2p, each chosen algorithmic processing is executed, by means of the second execution part 2peu, using dependent functions. Preferably, each chosen algorithmic processing is split into dependent functions $fd_n$ (with n varying from 1 to N), namely:

possibly one or several dependent functions enabling the placing of one or several operands at the unit 6's disposal, dependent functions, some of which use the operand(s) and execute in combination the functionality of the chosen algorithmic processing, using said operand(s), and possibly, one or several dependent functions enabling the placing by the unit 6, at the data processing system 3's disposal of the result of the chosen algorithmic processing, during the execution of the protected software 2p, the second execution part 2peu executes the dependent functions $fd_n$, during the execution of the protected software 2p, the dependent functions are triggered by triggering commands with renamed orders, and a sequence of the triggering commands is chosen among the set of sequences allowing the execution of the protected software 2p.

The first execution part 2pes of the protected software 2p, executed in the data processing system 3, executes triggering commands with renamed orders transferring renamed orders to the unit 6, and triggering in the unit 6 the restoring by means of the restoring means 20, of the orders, and then the execution by means of the second execution part 2peu, of each of the previously defined dependent functions $fd_n$.

In other words, the principle of protection by renaming is carried out by renaming the orders of the triggering commands, so as to obtain triggering commands with renamed orders whose execution in the data processing system 3, triggers in the unit 6, the execution of the dependent functions which would have been triggered by the triggering commands with not-renamed orders, without however the examination of the protected software 2p enabling to determine the identity of the executed dependent functions.

Figure 80:
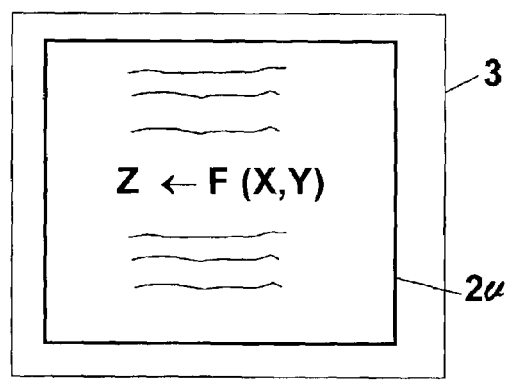
FIGS. 80 to 85 are diagrams illustrating the protection process according to the invention implementing the principle of protection by par renaming.

FIG. 80 illustrates an example of execution of a vulnerable software 2v. In this example, appears during the execution of the vulnerable software 2v in the data processing system 3, at a certain time instant, the calculation of $Z \leftarrow F(X, Y)$ corresponding to the assignment to a variable Z of the result of an algorithmic processing represented by a function F and using the operands X and Y.

Figure 81:
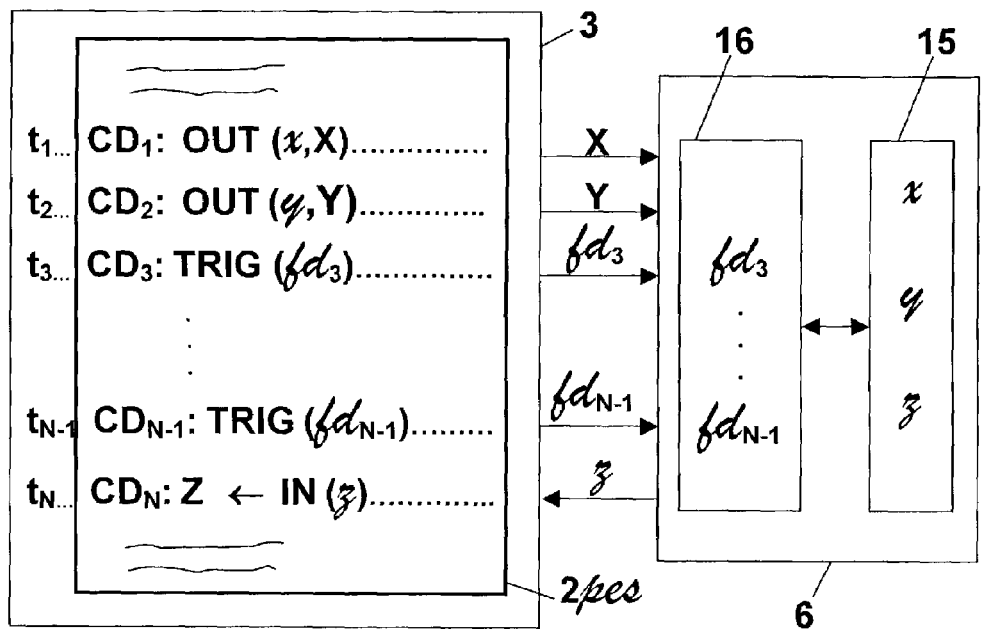
Figure 82:
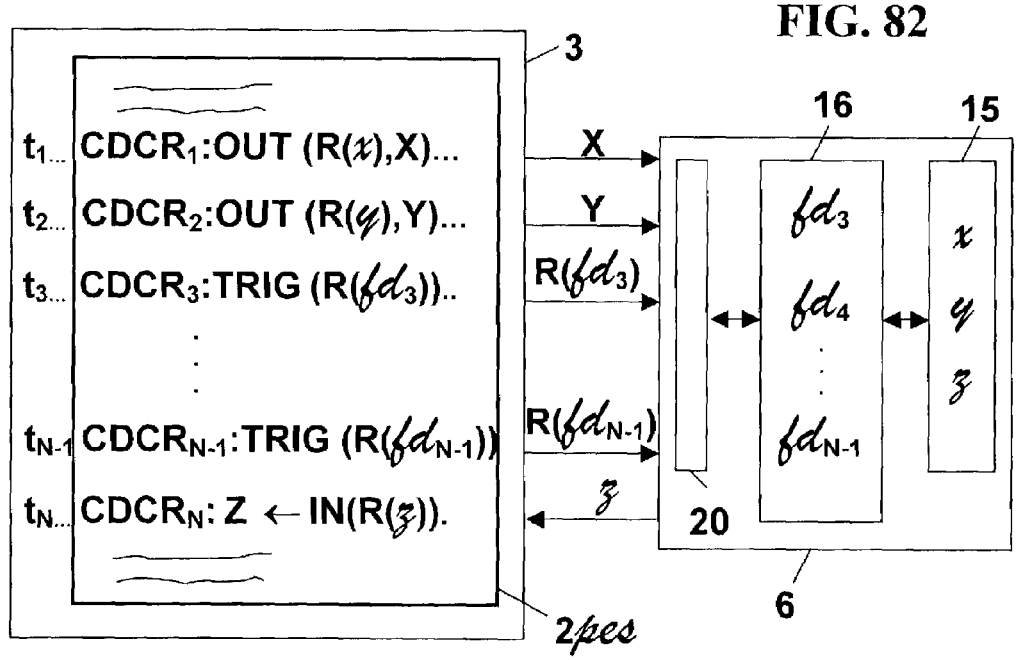

FIGS. 81 and 82 illustrate an example of implementation of the invention.

FIG. 81 illustrates the partial implementation of the invention. In this example, during the execution in the data processing system 3 of the first execution part 2pes of the protected software 2p and in the presence of the unit 6, appear:

at time instants $t_1$, $t_2$, the execution of the triggering commands $CD_1$, $CD_2$ triggering in the unit 6, the execution by means of the second execution part 2peu, of the corresponding dependent functions $fd_1$, $fd_2$ which provide the transfer of data X, Y from the data processing system 3 to the memorization zones respectively x, y located in the memorization means 15 of the unit 6, said triggering commands $CD_1$, $CD_2$ being represented respectively by OUT(x, X), OUT(y, Y), at time instants $t_3$ to $t_{N-1}$, the execution of the triggering commands $CD_3$ to $CD_{N-1}$, triggering in the unit 6, the execution by means of the second execution part 2peu, of the corresponding dependent functions $fd_3$ to $fd_{N-1}$, said triggering commands $CD_3$ to $CD_{N-1}$ being represented respectively, by $TRIG(fd_3)$ to $TRIG(fd_{N-1})$. The series of dependent functions $fd_3$ to $fd_{N-1}$ executed in combination is algorithmically equivalent to the function F. More precisely, the execution of said triggering commands leads to the execution in the unit 6, of the dependent functions $fd_3$ to $fd_{N-1}$ which use the contents of the memorization zones x, y and return the result in a memorization zone z of the unit 6, and at time instant $t_N$, the execution of a triggering command $CD_N$ triggering in the unit 6, the execution by means of the second execution part 2peu, of the dependent function $fd_N$ providing the transfer of the result of the algorithmic processing contained in the memorization zone z of the unit 6 to the data processing system 3, so as to assign it to the variable Z, said command being represented by IN(z).

In this example, to completely implement the invention, are chosen as orders, the first argument of the triggering commands OUT and the argument of the triggering commands TRIG and IN. The orders chosen in this way are renamed using the method of renaming of the orders. In this manner, the orders of the triggering commands $CD_1$ to $CD_N$ i.e. x, y, $fd_3$, $fd_{N-1}$, z are renamed so as to obtain respectively R(x), R(y), R($fd_3$) . . . , R($fd_{N-1}$), R(z).

FIG. 82 illustrates the complete implementation of the invention. In this example, during the execution in the data processing system 3, of the first execution part 2pes of the protected software 2p, and in the presence of the unit 6, appear:

at time instants $t_1$, $t_2$, the execution of the triggering commands with renamed orders $CDCR_1$, $CDCR_2$, transferring to the unit 6, the renamed orders R(x), R(y)

as well as the data X, Y triggering in the unit 6 the restoring by means of the restoring means 20, of the renamed orders to restore the orders i.e. the identity of the memorization zones x, y, and then the execution by means of the second execution part 2*peu*, of the corresponding dependent functions $fd_1$, $fd_2$ which provide the transfer of the data X, Y from the data processing system 3 to the memorization zones respectively x, y located in the memorization means 15 of the unit 6, said triggering commands with renamed orders $CDCR_1$, $CDCR_2$ being represented respectively by OUT (R(x), X), OUT (R(y), Y), at time instants $t_3$ to $t_{N-1}$, the execution of the triggering commands with renamed orders $CDCR_3$ to $CDCR_{N-1}$, transferring to the unit 6, the renamed orders $R(fd_3)$ to $R(fd_{N-1})$, triggering in the unit 6 the restoring by means of the restoring means 20, of the orders, i.e. $fd_3$ to $fd_{N-1}$, and then the execution by means of the second execution part 2*peu*, of the dependent functions $fd_3$ to $fd_{N-1}$, said triggering commands with renamed orders $CDCR_3$ to $CDCR_{N-1}$ being represented respectively by TRIG $(R(fd_3))$ to TRIG $(R(fd_{N-1}))$, and at time instant $t_N$, the execution of the triggering command with renamed order $CDCR_N$ transferring to the unit 6, the renamed order R(z) triggering in the unit 6 the restoring by means of restoring means 20, of the order i.e. the identity of the memorization zone z, and then the execution by means of the second execution part 2*peu*, of the dependent function $fd_N$ providing the transfer of the result of the algorithmic processing contained in the memorization zone z of the unit 6 to the data processing system 3, so as to assign it to the variable Z, said triggering command with renamed order $CDCR_N$ being represented by IN (R(z)).

In the illustrated example, the triggering commands with renamed orders 1 to N are executed successively. It should be observed that two improvements can be effected:

The first improvement concerns the case where several algorithmic processings are remoted to the unit 6 and at least the result of one algorithmic processing is used by another algorithmic processing. In this case, some triggering commands with renamed orders used for the transfer, can possibly be removed.

Figure 83:
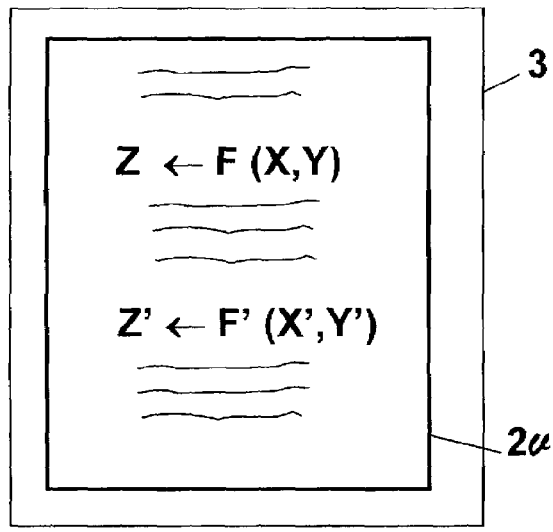
Figure 84:
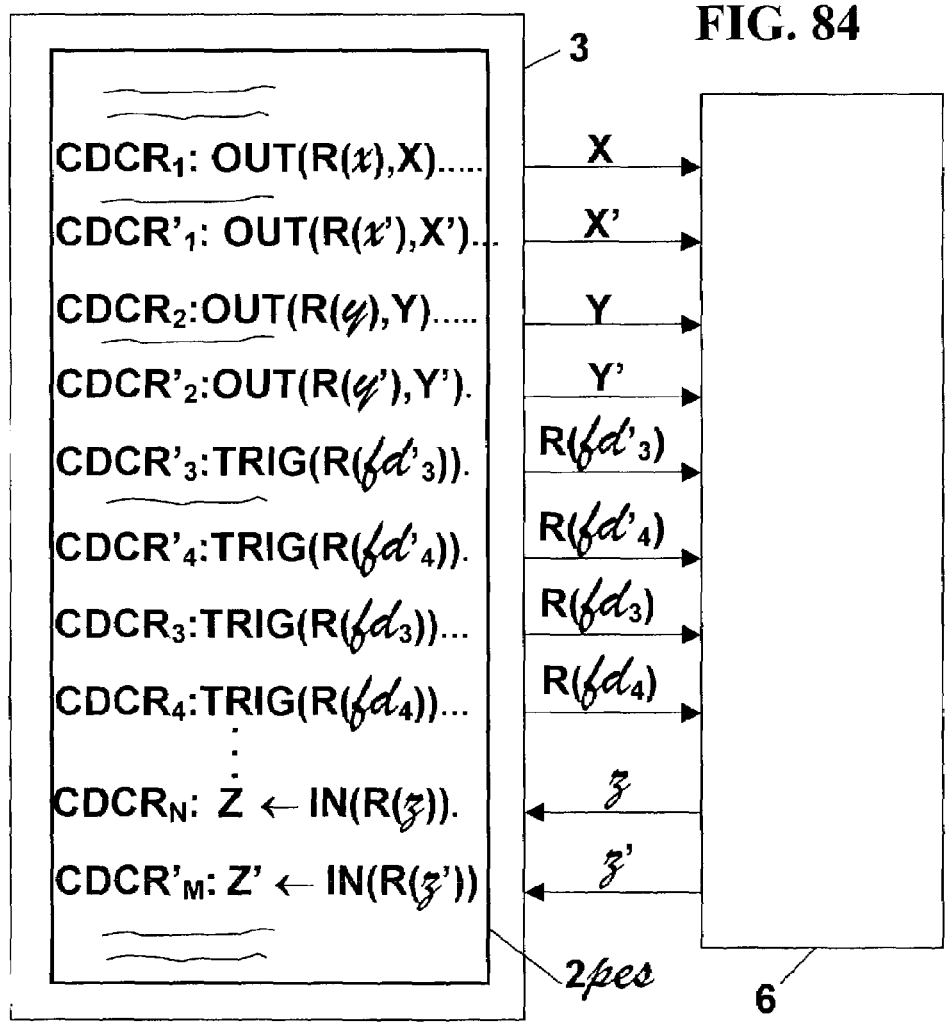

The second improvement aims at opting for a pertinent sequence of the triggering commands with renamed orders among the set of sequences allowing the execution of the protected software 2*p*. In this respect, it is preferable to choose a sequence of the triggering commands with renamed orders which dissociate temporally the execution of the dependent functions, by intercalating, between them portions of code executed in the data processing system 3 and including or not triggering commands with renamed orders used of the determination of other data. FIGS. 83 and 84 illustrate the principle of such an embodiment.

FIG. 83 shows an example of execution of a vulnerable software 2*v*. In this example, appears, during the execution of the vulnerable software 2*v*, in the data processing system 3, the execution of two algorithmic processings leading to the determination of Z and Z', such as Z←F(X, Y) and Z'←F'(X', Y').

FIG. 84 illustrates an example of implementation of the process according to the invention for which the two algorithmic proccesings chosen in FIG. 83 are remoted to the unit 6. According to such an example, during the execution in the data processing system 3 of the first execution part 2*pes* of the protected software 2*p* and in the presence of the unit 6, appear, as explained above, the execution of the triggering commands with renamed orders $CDCR_1$ to $CDCR_N$ corresponding to the determination of Z and the execution of the triggering commands with renamed orders $CDCR'_1$ to $CDCR'_M$ corresponding to the determination of Z'. As illustrated, the triggering commands with renamed orders $CDCR_1$ to $CDCR_N$ are not executed consecutively, inasmuch as the triggering commands with renamed orders $CDCR'_1$ to $CDCR'_M$ as well as other portions of code are intercalated. In the example, the following sequence is thus carried out: $CDCR_1$, portion of intercalated code, $CDCR'_1$, $CDCR_2$, portion of intercalated code, $CDCR'_2$, $CDCR'_3$, portion of intercalated code, $CDCR'_4$, $CDCR_3$, $CDCR_4$, ... , $CDCR_N$, $CDCR'_M$.

It should be observed that, during the execution of a portion of the first execution part 2*pes* of the protected software 2*p*, the triggering commands with renamed orders executed in the data processing system 3, trigger in the unit 6 the restoring of the identity of the corresponding dependent functions and then their execution. Thus, it appears that in the presence of the unit 6, said portion is executed correctly and that, consequently, the protected software 2*p* is completely functional.

Figure 85:
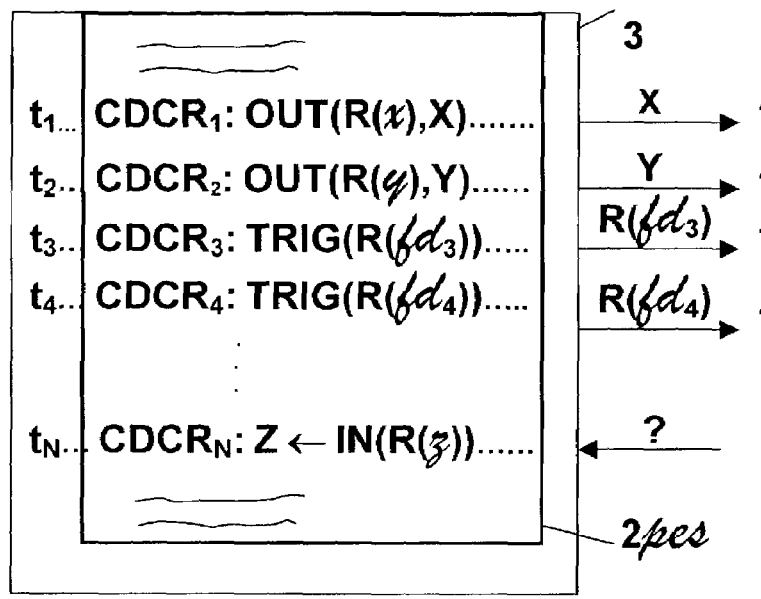

FIG. 85 illustrates an example of an attempt of execution of the protected software 2*p*, when the unit 6 is missing. In this example, during the execution in the data processing system 3 of the first execution part 2*pes* of the protected software 2*p*, at every time instant, the execution of a triggering command with renamed order can trigger neither the restoring of the order nor the execution of the corresponding dependent function, because of the absence of the unit 6. The value to assign to the variable Z cannot therefore be determined correctly.

It therefore appears, that in the absence of the unit 6, at least one request by a portion of the first execution part 2*pes* of the protected software 2*p*, to trigger the restoring of an order and the execution of a dependent function in the unit 6 cannot be fulfilled correctly, so that at least said portion is not executed correctly and that, consequently, the protected software 2*p* is not completely functional.

Thanks to this principle of protection by renaming, the examination in the protected software 2*p* of the triggering commands with renamed orders does not enable to determine the identity of the dependent functions which have to be executed in the unit 6. It should be observed that the renaming of the orders is carried out during the modification of the vulnerable 2*v* to a protected software 2*p*.

According to a variant of the principle of protection by renaming, is defined for at least one dependent function, a family of dependent functions algorithmically equivalent but triggered by different triggering commands with renamed orders. According to this variant, for at least one algorithmic processing using dependent functions, said algorithmic processing is split into dependent functions which for at least one of them is replaced with a dependent function of the same family instead of keeping several occurrences of the same dependent function. To this end, triggering commands with renamed orders are modified to take into account the replacement of dependent functions with dependent functions of the same family. In other words, two dependent functions of the same family have different orders and consequently different triggering commands with renamed orders and, it is not possible, by examining the protected software 2*p*, to discover that the dependent functions called are algorithmically equivalent.

According to a first preferred embodiment of the variant of the principle of protection by renaming, is defined for at least one dependent function, a family of algorithmically equivalent dependent functions, by concatenating a noise field to the information defining the functional part of the dependent function to execute in the unit 6.

According to a second preferred embodiment of the variant of the principle of protection by renaming, is defined for at least one dependent function, a family of algorithmically equivalent dependent functions by using identification fields.

According to a preferred variant embodiment of the principle of protection by renaming, is defined as method of renaming of the orders a ciphering method enabling to cipher the orders to transform them into renamed orders. Remember that the renaming of the orders is carried out during the phase of protection P. For this preferred variant, the restoring means 20 are means implementing a deciphering method enabling to decipher the renamed orders and thus to restore the identity of the dependent functions to execute in the unit 6. Said restoring means are implemented in the unit 6 and can be of software or hardware nature. Said restoring means 20 are appealed to during the usage phase U each time a triggering command with renamed order is executed in the data processing system 3 with the intention of triggering in the unit 6, the execution of a dependent function.

Figure 90:
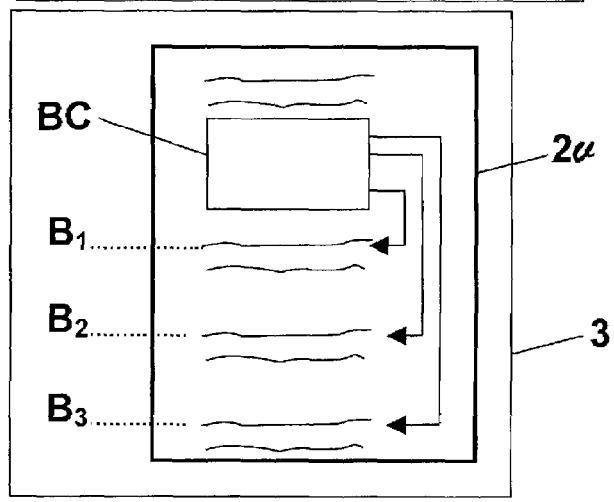
FIGS. 90 to 92 are diagrams illustrating the protection process according to the invention implementing the principle of protection by conditional branch.
Figure 91:
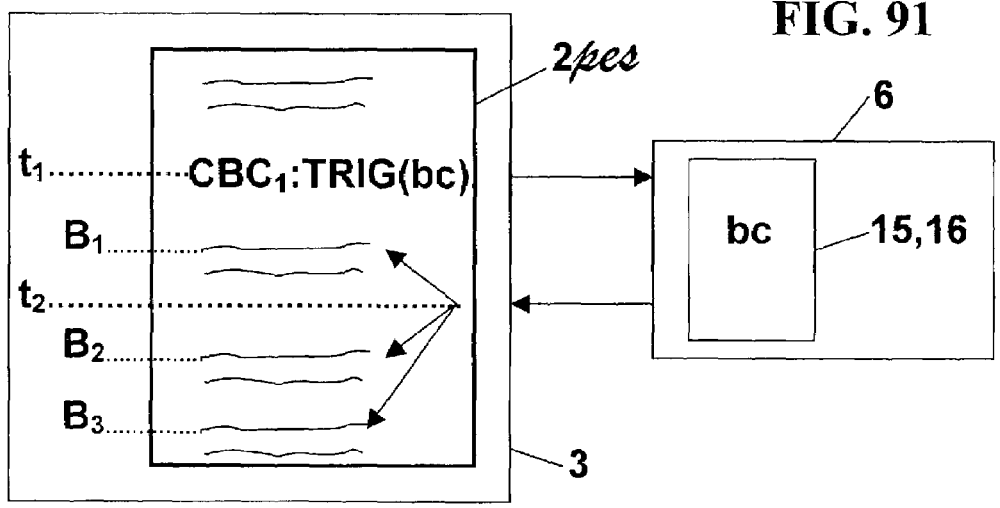
Figure 92:
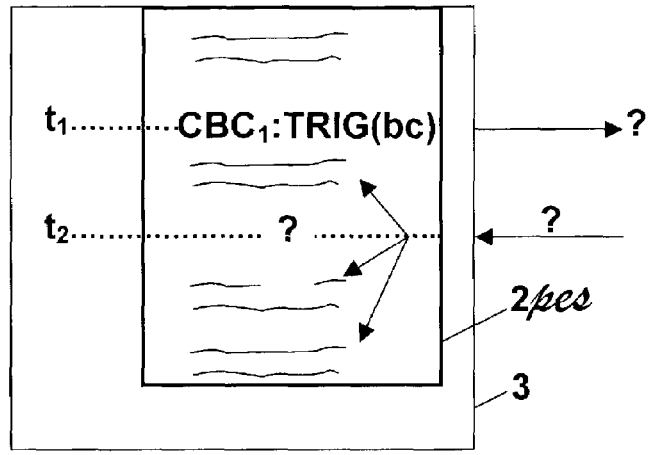

According to another advantageous characteristic of the invention, the protection process aims at implementing a principle of protection called by <<conditional branch >> a description of which is carried out in relation to FIGS. 90 to 92.

For the implementation of the principle of protection by conditional branch, is chosen in the source of the vulnerable software 2vs, at least one conditional branch BC. Is also chosen at least one portion of the source of the vulnerable software 2vs containing at least one chosen conditional branch BC.

At least one chosen portion of the source of the vulnerable software 2vs is then modified, so as to obtain the source of the protected software 2ps. This modification is such that, during the execution of the protected software 2p, among others:
- at least one portion of the first execution part 2pes, which is executed in the data processing system 3, takes into account that the functionality of at least one chosen conditional branch BC is executed in the unit 6,
- and the second execution part 2peu, which is executed in the unit 6, executes at least the functionality of at least one chosen conditional branch BC and puts at the data processing system 3's disposal, a piece of information enabling the first execution part 2pes, to carry on its execution at the chosen spot.

The first execution part 2pes of the protected software 2p, executed in the data processing system 3, executes conditional branches commands, triggering in the unit 6, the execution by means of the second execution part 2peu, of remoted conditional branches be whose functionality is equivalent to the functionality of the chosen conditional branches BC.

FIG. 90 illustrates an example of execution of a vulnerable software 2v. In this example, appears, during the execution of the vulnerable software 2v in the data processing system 3 at a certain time instant, a conditional branch BC indicating to the vulnerable software 2v the spot where to carry on its execution, i.e. one of the three possible spots $B_1$, $B_2$ or $B_3$. It must be understood that the conditional branch BC takes the decision to carry on the execution of the software at spot $B_1$, $B_2$ or $B_3$.

FIG. 91 illustrates an example of implementation of the invention for which the conditional branch chosen to be remoted to the unit 6, corresponds to the conditional branch BC. In this example, during the execution in the data processing system 3 of the first execution part 2pes of the protected software 2p and in the presence of the unit 6, appear:
- at time instant $t_1$, the execution of the conditional branch command $CBC_1$ triggering in the unit 6, the execution by means of the second execution part 2peu, of the remoted conditional branch bc algorithmically equivalent to the conditional branch BC, said conditional branch command $CBC_1$ being represented by TRIG (bc),
- and at time instant $t_2$, the transfer from the unit 6 to the data processing system 3, of the information enabling the first execution part 2pes, to carry on its execution at the chosen spot, i.e. the spot $B_1$, $B_2$ or $B_3$.

It should be observed that during the execution of a portion of the first execution part 2pes of the protected software 2p, the conditional branches commands executed in the data processing system 3 trigger the execution of the corresponding remoted conditional branches in the unit 6. Thus, it appears, that in the presence of the unit 6, said portion is executed correctly and that, consequently, the protected software 2p is completely functional.

FIG. 92 illustrates an example of an attempt of execution of the protected software 2p, when the unit 6 is missing. In this example, during the execution in the data processing system 3 of the first execution part 2pes of the protected software 2p:
- at time instant $t_1$, the execution of the conditional branch command $CBC_1$, cannot trigger the execution of the remoted conditional branch bc, taking into account the absence of the unit 6,
- and at time instant $t_2$, the transfer of the piece of information enabling the first execution part 2pes to carry on at the chosen spot fails taking into account the absence of the unit 6.

It therefore appears that in the absence of the unit 6, at least one request by a portion of the first execution part 2pes to trigger the execution of a remoted conditional branch in the unit 6, cannot be fulfilled correctly, so that at least said portion is not executed correctly and that, consequently, the protected software 2p is not completely functional.

In the previous description in relation to FIGS. 90 to 92, the subject of the invention aims at remoting in the unit 6, a conditional branch. Naturally, a preferred embodiment of the invention can be carried out by remoting in the unit 6, a series of conditional branches whose overall functionality is equivalent to all the functionalities of the conditional branches which have been remoted. The execution of the overall functionality of said series of remoted conditional branches leads to the placing at the data processing system 3's disposal of a piece of information enabling the first execution part 2pes of the protected software 2p to carry on its execution at the chosen spot.

In the previous description in relation to FIGS. 40 to 92, six different principles of software protection have been made explicit generally speaking independently of one another. The protection process in accordance with the invention, is implemented by using the principle of protection by temporal dissociation, possibly combined with one or several other principles of protection. In the case where the principle of protection by temporal dissociation is complemented by the implementation of at least another principle of protection, the principle of protection by temporal dissociation is advantageously complemented by the principle of protection by variable and/or the principle of protection by elementary functions and/or the principle of protection by conditional branch.

And when the principle of protection by variable is also implemented, it can be complemented in its turn by the principle of protection by elementary functions and/or the principle of protection by conditional branch.

And when the principle of protection by elementary functions is also implemented, it can be complemented in its turn by the principle of protection by detection and coercion and/or the principle of protection by renaming and/or the principle of protection by conditional branch.

And when the principle of protection by detection and coercion is also implemented, it can be complemented in its turn by the principle of protection by renaming and/or the principle of protection by conditional branch.

And when the principle of protection by renaming is also implemented, it can be complemented in its turn by the principle of protection by conditional branch.

According to the preferred variant embodiment, the principle of protection by temporal dissociation is complemented by the principle of protection by variable, complemented by the principle of protection by elementary functions, complemented by the principle of protection by detection and coercion, complemented by the principle of protection by renaming, complemented by the principle of protection by conditional branch.

In the case where a principle of protection is applied, in complement to the principle of protection by temporal dissociation, its previously carried out description must include, to take into account its combined implementation, the following modifications:

the notion of vulnerable software must be understood as software vulnerable towards the principle of protection being described. Thus, in the case where a principle of protection has already been applied to the vulnerable software, the expression "vulnerable software" must be interpreted by the reader as the expression "software protected by the principle(s) of protection already applied";

the notion of protected software must be understood as software protected towards the principle of protection being described. Thus, in the case where a principle of protection has already been applied, the expression "protected software" must be interpreted by the reader as the expression "new version of the protected software";

and the choice(s) made for the implementation of the principle of protection being described must take into account the choice(s) made for the implementation of the principle(s) of protection already applied.

Figure 100:
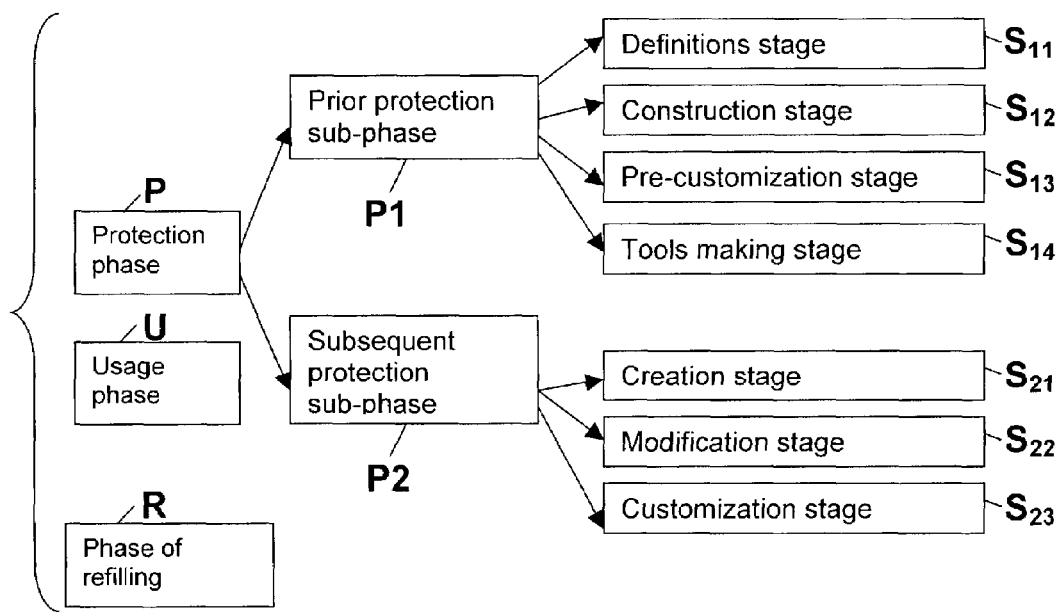
FIG. 100 is a diagram illustrating the different phases of implementation of the subject of the invention.

The rest of the description enables to have a better understanding of the implementation of the protection process in accordance with the invention. This protection process according to the invention is composed, as shown more precisely in FIG. 100:

first, of a protection phase P during which a vulnerable software 2v is modified to become a protected software 2p, then, of a usage phase U during which the protected software 2p is used. During this usage phase U:

in the presence of the unit 6 and each time a portion of the first execution part 2pes executed in the data processing system 3 imposes it, an imposed functionality is executed in the unit 6, so that said portion is executed correctly and that, consequently, the protected software 2p is completely functional, in the absence of the unit 6 and in spite of the request by a portion of the first execution part 2pes to execute a functionality in the unit 6, said request cannot be fulfilled correctly, so that at least said portion is not executed correctly and that consequently, the protected software 2p is not completely functional, and possibly of a phase of refilling R during which is credited at least one additional usage of a functionality protected by the implementation of the second preferred variant embodiment of the principle of protection by detection and coercion using as characteristic, a variable of measurement.

The protection phase P can be split into two protection sub-phases $P_1$ and $P_2$. The first one, called prior protection sub-phase $P_1$, takes place independently of the vulnerable software 2v to protect. The second one, called subsequent protection sub-phase $P_2$ is dependent of the vulnerable software 2v to protect. It should be observed that the prior protection sub-phase $P_1$ and the subsequent protection sub-phase $P_2$ can be carried out advantageously by two different persons or two different teams. For instance, the prior protection sub-phase $P_1$ can be carried out by a person or a company providing the development of software protection systems, while the subsequent protection sub-phase $P_2$ can be carried out by a person or a company providing the development of software requiring to be protected. Naturally, it is clear that the prior protection sub-phase $P_1$ and the subsequent protection sub-phase $P_2$ can also be carried out by the same person or team.

The prior protection sub-phase $P_1$ is composed of several stages $S_{11}, \ldots, S_{1i}$ for each of which various tasks or jobs are to be carried out.

The first stage of this prior protection sub-phase $P_1$ is called "definitions stage $S_{11}$". During this definitions stage $S_{11}$:

are chosen:

the type of the unit 6. As an illustrative example, can be chosen as unit 6, a chip card reader 8 and the chip card 7 associated to the reader, and the transfer means 12, 13 designed to be implemented respectively in the data processing system 3 and in the unit 6, during the usage phase U and capable of providing the transfer of data between the data processing system 3 and the unit 6, and in the case where the protection process according to the invention implements the principle of protection by elementary function, are also defined:

a set of elementary functions whose elementary functions are liable to be executed in the unit 6, and a set of elementary commands for said set of elementary functions, said elementary commands being liable to be executed in the data processing system 3 and to trigger the execution in the unit 6, of the elementary functions, and in the case where the protection process according to the invention implements the principle of protection by detection and coercion, are also defined:

at least one software execution characteristic, liable to be monitored at least in part in the unit 6, at least one criterion to abide by for at least one software execution characteristic, detection means 17 to implement in the unit 6 and enabling to detect that at least one software execution characteristic does not abide by at least one associated criterion, and coercion means 18 to implement in the unit 6 and enabling to inform the data processing system 3 and/or modify the execution of a software, when at least one criterion is not abided by, and in the case where the protection process according to the invention implements the principle of protection by detection and coercion using as characteristic a variable of measurement of the software execution, are also defined:

as software execution characteristic liable to be monitored, a variable of measurement of the usage of a functionality of a software, as criterion to abide by, at least one threshold associated to each variable of measurement, and actualization means enabling to update at least one variable of measurement, and in the case where the protection process according to the invention also implements a first preferred variant embodiment of the principle of protection by detection and coercion using as characteristic a variable of measurement of the software execution, are also defined:

for at least one variable of measurement, several associated thresholds, and different coercion means corresponding to each of said thresholds, and in the case where the protection process according to the invention implements a second preferred variant embodiment of the principle of protection by detection and coercion using as characteristic a variable of measurement of the software execution, are also defined refilling means enabling to add at least one additional usage to at least one software functionality monitored by a variable of measurement, and in the case where the protection process according to the invention implements the principle of protection by detection and coercion using as characteristic a profile of software usage, are also defined:

as software execution characteristic liable to be monitored, a profile of software usage, and as criterion to abide by, at least one feature of software execution, and in the case where the protection process according to the invention implements the principle of protection by detection and coercion using as feature of execution to abide by, the monitoring of the execution chaining, are also defined:

an instructions set whose instructions are liable to be executed in the unit 6, a set of instructions commands for said instructions set, said instructions commands being liable to be executed in the data processing system 3 and to trigger in the unit 6 the execution of the instructions, as profile of usage, the chaining of the instructions, as feature of execution, an expected chaining for the execution of the instructions, as detection means 17, means enabling to detect that the chaining of the instructions does not correspond to the expected one, and as coercion means 18, means enabling to inform the data processing system 3 and/or to modify the functioning of the portion of protected software 2p when the chaining of the instructions does not correspond to the expected one, and in the case where the protection process according to the invention implements a preferred variant embodiment of the principle of protection by detection and coercion using as feature of execution to abide by, the monitoring of the execution chaining, are also defined:

as instructions set, an instructions set whose at least some instructions work with registers and use at least one operand with the intention of returning a result, for at least some of the instructions working with registers:

a part PF defining the functionality of the instruction, and a part defining the expected chaining for the execution of the instructions and including bits fields corresponding to:

an identification field of the instruction CII, and for each operand of the instruction:

a flag field $CD_k$, and an expected identification field $CIP_k$ of the operand, for each register belonging to the exploitation means and used by the instructions set, a generated identification field $CIG_v$ in which is automatically memorized the identification of the last instruction which has returned its result in said register, as detection means 17, means enabling, during the execution of an instruction, for each operand, when the flag field $CD_k$ imposes it, to check the equality of the generated identification field $CIG_v$ corresponding to the register used by said operand, and the expected identification field $CIP_k$ of the origin of said operand, and as coercion means 18, means enabling to modify the result of the instructions, if at least one of the checked equalities is false.

and in the case where the protection process according to the invention implements the principle of protection by renaming, are also defined:

as a triggering command, an elementary command or an instruction command, as a dependent function, an elementary function or an instruction, as an order, at least one argument for a triggering command, corresponding at least in part to the information transmitted by the data processing system 3 to the unit 6, so as to trigger the execution of the corresponding dependent function, a method of renaming of the orders enabling to rename the orders so as to obtain triggering commands with renamed orders, and restoring means 20 designed to be used in the unit 6 during the usage phase U, and enabling to restore the dependent function to execute, from the renamed order, and in the case where the protection process according to the invention implements a variant of the principle of protection by renaming, is also defined for at least one dependent function, a family of dependent functions algorithmically equivalent, but triggered by triggering commands whose renamed orders are different, and in the case where the protection process according to the invention implements one of the preferred embodiments of the variant of the principle of protection by renaming, are also defined for at least one dependent function, a family of algorithmically equivalent dependent functions:

by concatenating a field of noise to the information defining the functional part of the dependent function to execute in the unit 6, or by using the identification field of the instruction CII and the expected identification fields $CIP_k$ of the operands.

and in the case where the protection process according to the invention implements a preferred variant of the principle of protection by renaming, are also defined:
as method of renaming of the orders, a ciphering method to cipher the orders,
and as restoring means 20, means implementing a deciphering method to decipher the renamed orders and thus restore the identity of the dependent functions to execute in the unit 6.

During the prior protection sub-phase $P_1$, the definitions stage $S_{11}$ is followed by a stage called "construction stage $S_{12}$". During such a stage $S_{12}$, are constructed the transfer means 12, 13 and the exploitation means corresponding to the definitions of the definitions stage $S_{11}$.

During this construction stage $S_{12}$, are therefore carried out:
the construction of the transfer means 12, 13 enabling, during the usage phase U, the transfer of data between the data processing system 3 and the unit 6,
and when the principle of protection by elementary functions is also implemented, the construction of the exploitation means also enabling the unit 6, during the usage phase U to execute the elementary functions of the set of elementary functions,
and when the principle of protection by detection and coercion is also implemented, the construction:
of the exploitation means enabling the unit 6, during the usage phase U to also implement the detection means 17 and the coercion means 18,
and possibly of the exploitation means enabling the unit 6, during the usage phase U to also implement the actualization means,
and possibly of the exploitation means enabling the unit 6, during the usage phase U to also implement the refilling means,
and possibly of the exploitation means also enabling the unit 6, during the usage phase U to execute the instructions of the instructions set,
and when the principle of protection by renaming is also implemented, the construction of the exploitation means enabling the unit 6, during the usage phase U to also implement the restoring means.

The construction of the exploitation means is carried out classically, through a program development unit and taking into account the definitions intervened in the definitions stages $S_{11}$. Such a unit is described in the rest of the description in FIG. 110.

During the prior protection sub-phase $P_1$, the construction stage $S_{12}$ can be followed by a stage called "pre-customization stage $S_{13}$". During this pre-customization stage $S_{13}$, at least a part of the transfer means 13 and/or the exploitation means are uploaded to at least one blank unit 60, with the intention of obtaining at least one pre-customized unit 66. It should be observed that part of the exploitation means, once transferred to a pre-customized unit 66, is no longer directly accessible outside said pre-customized unit 66. The transfer of the exploitation means to a blank unit 60 can be carried out through an adapted pre-customization unit, which is described in the rest of the description in FIG. 120. In the case of a pre-customized unit 66, constituted by a chip card 7 and its reader 8, the pre-customization concerns only the chip card 7.

During the prior protection sub-phase $P_1$, after the definitions stage $S_{11}$ and, possibly after the construction stage $S_{12}$, a stage called "tools making stage $S_{14}$" can take place. During this tools making stage $S_{14}$ are made tools enabling to help generate protected software or automate the protection of software. Such tools enable:
to help choose or to choose automatically in the vulnerable software 2v to protect:
the algorithmic processing(s) liable to be split into steps remotable in the unit 6,
the portion(s) liable to be modified,
and when the principle of protection by variable is also implemented, the variable(s) liable to be remoted in the unit 6,
and when the principle of protection by elementary functions is also implemented, the algorithmic processing(s) liable to be split into elementary functions remotable in the unit 6,
and when the principle of protection by detection and coercion is also implemented, the software execution characteristic(s) to monitor and, possibly, the algorithmic processing(s) liable to be split into instructions remotable in the unit 6,
and when the principle of protection by renaming is also implemented, the algorithmic processing(s) liable to be split into dependent functions remotable in the unit 6 and for which the orders of the triggering commands can be renamed,
and when the principle of protection by conditional branch is also implemented, the conditional branch (es) whose functionality is liable to be remoted in the unit 6,
and, possibly, to help generate protected software or to automate the protection of software.

These different tools can be carried out independently or in combination and each tool can have various forms, such as for instance pre-processor, assembler, compiler, etc.

The prior protection sub-phase $P_1$ is followed by a subsequent protection sub-phase $P_2$ which depends on the vulnerable software 2v to protect. This subsequent protection sub-phase $P_2$ is composed of several stages as well. The first stage corresponding to the implementation of the principle of protection by temporal dissociation is called "creation stage $S_{21}$". During this creation stage $S_{21}$, the choices made during the definition stage $S_{11}$ are used. With the aid of said choices and possibly of tools constructed during the tools making stage $S_{14}$, the protected software 2p is created:
by choosing, at least one algorithmic processing which, during the execution of the vulnerable software 2v, uses at least one operand and enables to obtain at least one result,
by choosing at least one portion of the source of the vulnerable software 2vs containing, at least one chosen algorithmic processing,
by producing a source of the protected software 2ps from the source of the vulnerable software 2vs, by modifying at least one chosen portion of the source of the vulnerable software 2vs to obtain at least one modified portion of the source of the protected software 2ps, this modification being such that:
during the execution of the protected software 2p a first execution part 2pes is executed in the data processing system 3 and a second execution part 2peu is executed in a unit 6, obtained from the blank unit 60 after upload of information,
the second execution part 2peu executes at least the functionality of at least one chosen algorithmic processing, at least one chosen algorithmic processing is split so that during the execution of the protected software 2*p* appear by means of the second execution part 2*peu*, several distinct steps, namely:

the placing of at least one operand at the unit 6's disposal, the carrying out by the unit 6, of the algorithmic processing's functionality on at least said operand, and possibly, the placing at the data processing system 3's disposal of at least one result by the unit 6, for at least one chosen algorithmic processing, steps commands are defined so that during the execution of the protected software 2*p*, each step command is executed by the first execution part 2*pes* and triggers, in the unit 6, the execution by means of the second execution part 2*peu*, of a step, and a sequence of the steps commands is chosen among the set of sequences allowing the execution of the protected software 2*p*, and by producing:

a first object part 2*pos* of the protected software 2*p*, from the source of the protected software 2*ps*, said first object part 2*pos* being such that during the execution of the protected software 2*p*, appears a first execution part 2*pes* which is executed in the data processing system 3 and whose at least a portion takes into account that the steps commands are executed according to the chosen sequence, and a second object part 2*pou* of the protected software 2*p*, said second object part 2*pou* being such that, after being uploaded to the blank unit 60 and during the execution of the protected software 2*p*, appears the second execution part 2*peu* by means of which the steps triggered by the first execution 2*pes* are executed.

Naturally, the principle of protection by temporal dissociation according to the invention can be applied directly during the development of a new software without requiring the prior realization of a vulnerable software 2*v*. In this way, a protected software 2*p* is obtained directly.

During the subsequent protection sub-phase $P_2$, and when at least another principle of protection is applied in addition to the principle of protection by temporal dissociation, a "modification stage $S_{22}$" takes place. During this modification stage $S_{22}$, are used the definitions intervened in the definitions stage $S_{11}$. Using said definitions and possibly tools constructed during the tools making stage $S_{14}$, the protected software 2*p* is modified to allow the implementation of the principles of protection according to one of the arrangements herebefore defined.

When the principle of protection by variable is implemented, the protected software 2*p* is modified:

by choosing at least one variable used in at least one chosen algorithmic processing, which during the execution of the protected software 2*p*, partially defines the state of the protected software 2*p*, by modifying at least one chosen portion of the source of the protected software 2*ps*, this modification being such that during the execution of the protected software 2*p*, at least one chosen variable or at least one copy of chosen variable resides in the unit 6, and by producing:

the first object part 2*pos* of the protected software 2*p*, said first object part 2*pos* being such that during the execution of the protected software 2*p*, at least one portion of the first execution part 2*pes* takes also into account that at least one variable or at least one copy of variable resides in the unit 6, and the second object part 2*pou* of the protected software 2*p*, said second object part 2*pou* being such that, after upload to the unit 6 and during the execution of the protected software 2*p*, appears the second execution part 2*peu* by means of which at least one chosen variable, or at least one copy of chosen variable resides too in the unit 6.

When the principle of protection by elementary functions is implemented, the protected software 2*p* is modified:

by modifying at least one chosen portion of the source of the protected software 2*ps*, this modification being such that:

at least one step is split so that during the execution of the protected software 2*p*, said step is executed by means of the second execution part 2*peu*, using elementary functions, for at least one split step, elementary commands are integrated to the source of the protected software 2*ps*, so that during the execution of the protected software 2*p*, each elementary command is executed by the first execution part 2*pes* and triggers in the unit 6, the execution by means of the second execution part 2*peu*, of an elementary function, and a sequence of the elementary commands is chosen among the set of sequences allowing the execution of the protected software 2*p*, and by producing:

the first object part 2*pos* of the protected software 2*p*, said first object part 2*pos* being such that during the execution of the protected software 2*p*, at least one portion of the first execution part 2*pes* also executes the elementary commands according to the chosen sequence, and the second object part 2*pou* of the protected software 2*p* also containing the exploitation means, said second object part 2*pou* being such that, after upload to the unit 6 and during the execution of the protected software 2*p*, appears the second execution part 2*peu* by means of which are also executed the elementary functions triggered by the first execution part 2*pes*.

When the principle of protection by detection and coercion is implemented, the protected software 2*p* is modified:

by choosing at least one software execution characteristic to monitor, among the software execution characteristics liable to be monitored, by choosing at least one criterion to abide by for at least one chosen software execution characteristic, by choosing in the source of the protected software 2*ps*, elementary functions for which at least one chosen software execution characteristic is to be monitored, by modifying at least one chosen portion of the source of the protected software 2*ps*, this modification being such that during the execution of the protected software 2*p*, at least one chosen execution characteristic is monitored by means of the second execution part 2*peu*, and the fact that a criterion is not abided by leads to the data processing system 3 being informed and/or to a modification of the execution of the protected software 2*p*, and by producing the second object part 2*pou* of the protected software 2*p* containing the exploitation means also implementing the detection means 17 and the coercion means 18, said second object part 2*pou* being such that, after upload to the unit 6 and during the execution of the protected software 2*p*, at least one software execution characteristic is monitored and the fact that a criterion is not abided by leads to the data processing system 3 being informed and/or to a modification of the execution of the protected software 2*p*.

For the implementation of the principle of protection by detection and coercion using as characteristic a variable of measurement of the software execution, the protected software 2*p* is modified:
- by choosing as software execution characteristic to monitor, at least one variable of measurement of the usage of at least one functionality of a software,
- by choosing:
  - at least one functionality of the protected software 2*p* whose usage is liable to be monitored using a variable of measurement,
  - at least one variable of measurement used to quantify the usage of said functionality,
  - at least one threshold associated to a chosen variable of measurement corresponding to a limit of usage of said functionality,
  - and at least one method of update of a chosen variable of measurement depending on the usage of said functionality,
- and by modifying at least one chosen portion of the source of the protected software 2*ps*, this modification being such that, during the execution of the protected software 2*p*, the variable of measurement is actualized by means of the second execution part 2*peu* depending on the usage of said functionality, and at least one threshold crossing is taken into account.

For the implementation of a first preferred variant embodiment of the principle of protection by detection and coercion using, as characteristic, a variable of measurement, the protected software 2*p* is modified:
- by choosing in the source of the protected software 2*ps*, at least one chosen variable of measurement to which must be associated several thresholds corresponding to different limits of usage of the functionality,
- by choosing at least two thresholds associated to the chosen variable of measurement,
- and by modifying at least one chosen portion of the source of the protected software 2*ps*, this modification being such that, during the execution of the protected software 2*p*, the crossings of the various thresholds are taken into account differently, by means of the second execution part 2*peu*.

For the implementation of a second preferred variant embodiment of the principle of protection by detection and coercion using as characteristic, a variable of measurement, the protected software 2*p* is modified:
- by choosing in the source of the protected software 2*ps*, at least one chosen variable of measurement enabling to limit the usage of a functionality and which must be able to be credited with at least one additional usage,
- and by modifying at least one chosen portion, this modification being such that during a phase called of refilling, at least one additional usage of at least one functionality corresponding to a chosen variable of measurement can be credited.

For the implementation of the principle of protection by detection and coercion using as characteristic, a profile of software usage, the protected software 2*p* is modified:
- by choosing as software execution characteristic to monitor at least one profile of software usage,
- by choosing at least one feature of execution by which at least one chosen profile of usage must abide,
- and by modifying at least one chosen portion of the source of the protected software 2*ps*, this modification being such that, during the execution of the protected software 2*p*, the second execution part 2*peu* abides by all the chosen features of execution.

For the implementation of the principle of protection by detection and coercion using as feature of execution to abide by, the monitoring of the execution chaining, the protected software 2*p* is modified:
- by modifying at least one chosen portion of the source of the protected software 2*ps*:
  - by transforming the elementary functions into instructions,
  - by specifying the chaining by which must abide at least some of the instructions during their execution in the unit 6,
  - and by transforming the elementary commands into instructions commands corresponding to the instructions used.

When the principle of protection by renaming is implemented, the protected software 2*p* is modified:
- by choosing in the source of the protected software 2*ps*, triggering commands,
- by modifying at least one chosen portion of the source of the protected software 2*ps* by renaming the orders of the chosen triggering commands, so as to conceal the identity of the corresponding dependent functions,
- and by producing:
  - the first object part 2*pos* of the protected software 2*p*, said first object part 2*pos* being such that during the execution of the protected software 2*p*, the triggering commands with renamed orders are executed,
  - and the second object part 2*pou* of the protected software 2*p* containing the exploitation means also implementing the restoring means 20, said second object part 2*pou* being such that, after upload to the unit 6 and during the execution of the protected software 2*p*, the identity of the dependent functions whose execution is triggered by the first execution part 2*pes* is restored by means of the second execution part 2*peu*, and the dependent functions are executed by means of the second execution part 2*peu*.

For the implementation of a variant of the principle of protection by renaming, the protected software 2*p* is modified:
- by choosing, in the source of the protected software 2*ps* at least one triggering command with renamed order,
- and by modifying at least one chosen portion of the source of the protected software 2*ps* by replacing at least the renamed order of one chosen triggering command with renamed order, with another renamed order, triggering a dependent function of the same family.

When the principle of protection by conditional branch is implemented, the protected software 2*p* is modified:
- by choosing, in the source of the protected software 2*ps*, at least one conditional branch carried out in at least one chosen algorithmic processing,
- by modifying at least one chosen portion of the source of the protected software 2*ps*, this modification being such that during the execution of the protected software 2*p*, the functionality of at least one chosen conditional branch is executed, by means of the second execution part 2*peu*, in the unit 6,
- and by producing:
  - the first object part 2*pos* of the protected software 2*p*, said first object part 2*pos* being such that during the execution of the protected software 2p, the functionality of at least one chosen conditional branch is executed in the unit 6, and the second object part 2pou of the protected software 2p, said second object part 2pou being such that, after upload to the unit 6 and during the execution of the protected software 2p, appears the second execution part 2peu by means of which the functionality of at least one chosen conditional branch is executed.

For the implementation of a preferred embodiment of the principle of protection by conditional branch, the protected software 2p is modified:

by choosing, in the source of the protected software 2ps, at least one series of chosen conditional branches, by modifying at least one chosen portion of the source of the protected software 2ps, this modification being such that during the execution of the protected software 2p, the overall functionality of at least one chosen series of conditional branches is executed, by means of the second execution part 2peu, in the unit 6, and by producing:

the first object part 2pos of the protected software 2p, said first object part 2pos being such that during the execution of the protected software 2p, the functionality of at least one chosen series of conditional branches is executed in the unit 6, and the second object part 2pou of the protected software 2p, said second object part 2pou being such that, after upload to the unit 6 and during the execution of the protected software 2p, appears the second execution part 2peu by means of which the overall functionality of at least one chosen series of conditional branches is executed.

Naturally, the principles of protection according to the invention can be applied directly during the development of a new software without requiring the prior carrying out of intermediate protected pieces of software. In this way, the creation stage $S_{21}$ and the modification stage $S_{22}$ can be carried out concomitantly so as to obtain directly the protected software 2p.

During the subsequent protection sub-phase $P_2$, after the creation stage $S_{21}$ of the protected software 2p, and possibly after the modification stage $S_{22}$, a stage called "customization stage $S_{23}$" takes place. During this customization stage $S_{23}$, the second object part 2pou possibly containing the exploitation means is uploaded to at least one blank unit 60, with the intention of obtaining at least one unit 6, or a part of the second object part 2pou possibly containing the exploitation means is uploaded to at least one pre-customized unit 66, with the intention of obtaining at least one unit 6. The uploading of this customization information enables to make operational at least one unit 6. It should be observed that part of said information, once transferred to a unit 6, is not directly accessible outside said unit 6. The transfer of the customization information to a blank unit 60 or a pre-customized unit 66 can be carried out through an adapted customization unit which is described in the rest of the description in FIG. 150. In the case of a unit 6, constituted by a chip card 7 and its reader 8, the customization concerns only the chip card 7.

For the implementation of the protection phase P, various technical means are described more precisely in relation to FIGS. 110, 120, 130, 140 and 150.

Figure 110:
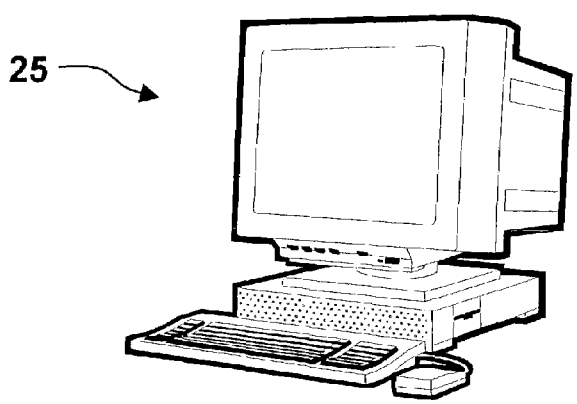
FIG. 110 illustrates an embodiment of a system allowing the implementation of the construction stage of the protection phase in accordance with the invention.

FIG. 110 illustrates an embodiment of a system 25 enabling to implement the construction stage $S_{12}$ which takes into account the definitions intervened during the definitions stage $S_{11}$ and during which are constructed the transfer means 12, 13 and possibly, the exploitation means intended for the unit 6. Such a system 25 includes a program development unit or workstation which has classically the form of a computer comprising a system unit, a screen, peripherals such as keyboard-mouse, and including, among others, the following programs: file editors, assemblers, pre-processors, compilers, interpreters, debuggers and link editors.

Figure 120:
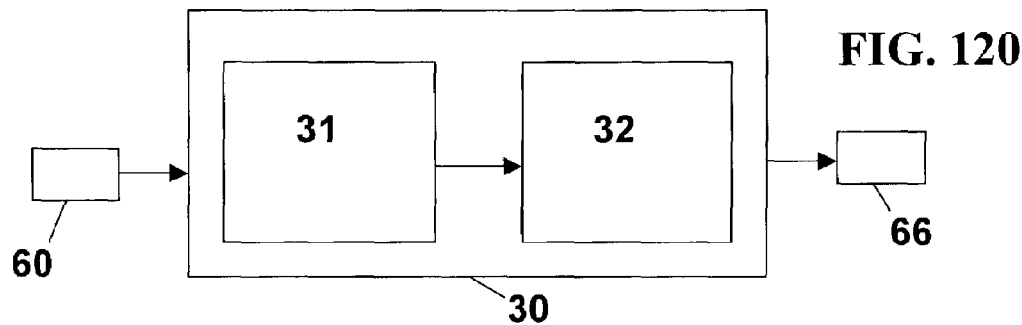
FIG. 120 illustrates an embodiment of a pre-customization unit used in the protection process in accordance with the invention.

FIG. 120 illustrates an embodiment of a pre-customization unit 30 enabling to upload at least in part the transfer means 13 and/or the exploitations means to at least one blank unit 60 with the intention of obtaining a pre-customized unit 66. Said pre-customization unit 30 includes reading and writing means 31 enabling to electrically pre-customize, a blank unit 60 so as to obtain a pre-customized unit 66 to which the transfer means 13 and/or the exploitations means have been uploaded. The pre-customization unit 30 can also include physical customization means 32 of the blank unit 60 which can for instance, have the form of a printer. In the case where the unit 6 is constituted by a chip card 7 and its reader 8, the pre-customization generally concerns only the chip card 7.

Figure 130:
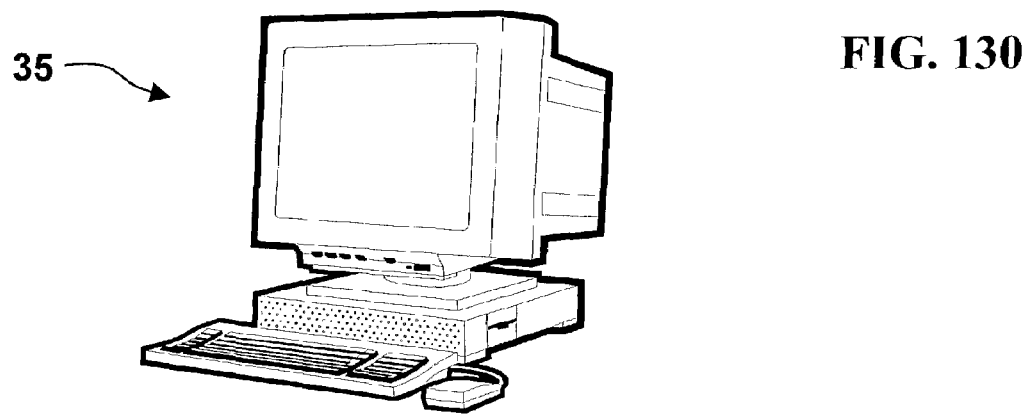
FIG. 130 illustrates an embodiment of a system allowing the implementation of the tools making stage of the protection phase in accordance with the invention.

FIG. 130 illustrates an embodiment of a system 35 enabling to carry out the making of the tools enabling to help generate protected software or to automate software protection. Such a system 35 includes a program development unit or workstation which has classically the form of a computer comprising a system unit, a screen, peripherals such as keyboard-mouse, and including, among others, the following programs: file editors, assemblers, pre-processors, compilers, interpreters, debuggers and link editors.

Figure 140:
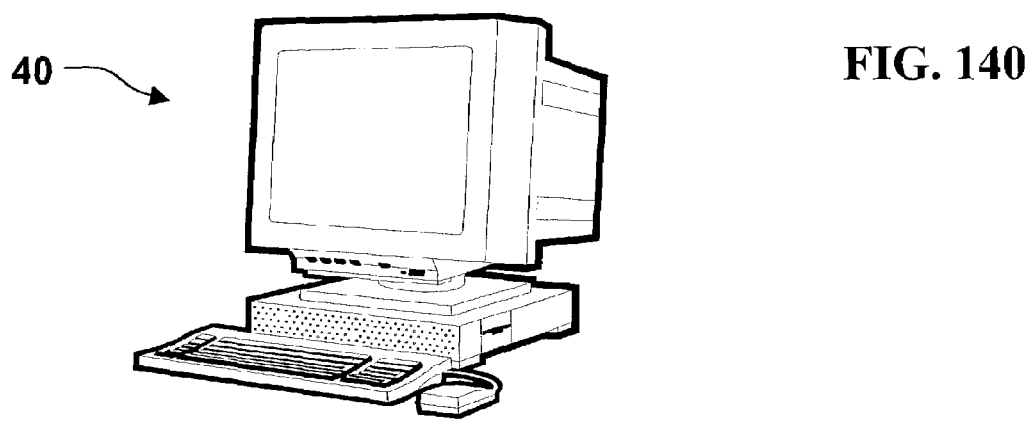
FIG. 140 illustrates an embodiment of a system allowing the implementation of the protection process according to the invention.

FIG. 140 illustrates an embodiment of a system 40 enabling to create directly a protected software 2p or to modify a vulnerable software 2v with the intention of obtaining a protected software 2p. Such a system 40 includes a program development unit or workstation which has classically the form of a computer comprising a system unit, a screen, peripherals such as keyboard-mouse, and including, among others, the following programs: file editors, assemblers, pre-processors, compilers, interpreters, debuggers and link editors, as well as tools enabling to help generate protected software or to automate software protection.

Figure 150:
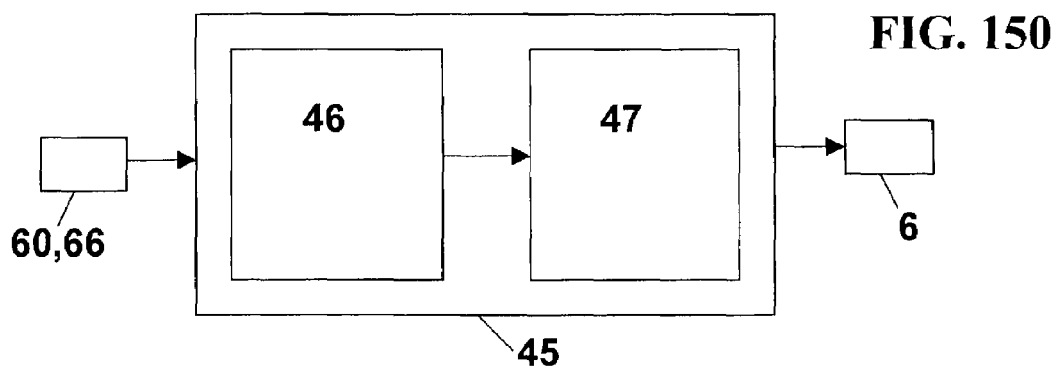
FIG. 150 illustrates an embodiment of a customization unit used in the protection process in accordance with the invention.

FIG. 150 illustrates an embodiment of a customization unit 45 enabling to upload the second object part 2pou to at least one blank unit 60 with the intention of obtaining at least one unit 6 or to upload a part of the second object part 2pou to at least one pre-customized unit 66 with the intention of obtaining at least one unit 6. Said customization unit 45 includes reading and writing means 46 enabling to electrically customize, at least one blank unit 60 or at least one pre-customized unit 66, so as to obtain at least one unit 6. At the close of this customization, a unit 6 includes the information necessary to the execution of the protected software 2p. The customization unit 45 can also include physical customization means 47 for at least one unit 6 which can for instance, have the form of a printer. In the case where a unit 6 is constituted by a chip card 7 and its reader 8, the customization generally concerns only the chip card 7.

The protection process according to the invention can be implemented with the following improvements:

It can be planned to use jointly several processing and memorizing units between which is divided out the second object part 2pou of the protected software 2p so that their joint use enables to execute the protected software 2p, the absence of at least one of said processing and memorizing units preventing the usage of the protected software 2p.

In the same way, after the pre-customization stage $S_{13}$ and during customization stage $S_{23}$, the part of the second object part 2pou necessary to transform the pre-customized unit 66 into a unit 6 can be contained in a processing and memorizing unit used by the customization unit 45 so as to limit the access to said part of the second object part 2pou. Naturally, said part of the second object part 2pou can be divided out between several processing and memorizing units so that said part of the second object part 2pou is accessible only during the joint use of said processing and memorizing units.

What is claimed is:

1. Process to protect, using at least one blank unit (60) including at least memorization means (15) and processing means (16), a vulnerable software (2v) against its unauthorized usage, said vulnerable software (2v) being produced from a source (2vs) and working on a data processing system (3), said protection process comprising:

in a protection phase (P):

creating a protected software (2p):

by choosing, a first computing operation and a second computing operation which, during the execution of the vulnerable software (2v), the first computing operation uses a first operand to obtain a first result and the second computing operating uses a second operand to obtain a second results, by choosing at least one portion of the source of the vulnerable software (2vs) containing the first and second computing operations, by producing a source of the protected software (2ps) from the source of the vulnerable software (2vs), by modifying at least one chosen portion of the source of the vulnerable software (2vs) to obtain at least one modified portion of the source of the protected software (2ps), this modification being such that:

during the execution of the protected software (2p) a first execution part (2pes) is executed in the data processing system (3) and a second execution part (2peu) is executed in a unit (6), obtained from the blank unit (60) after upload of information, the second execution part (2peu) executes at least the functionality of at least said chosen first and second computing operations, a first operand movement is performed on said first operand as required for correct execution of the protected program, a second operand movement is performed on said second operand as required for said correct execution of the protected program, a first result movement is performed on said first result as required for said correct execution of the protected program, a second result movement is performed on said second result as required for said correct execution of the protected program, each of said first and second operand movements, said first and second computing operations, and said first and second result movements constitute a step, the first operand movement, the first result movement and the first computing operation comprises a first set of steps and the second operand movement, tie second result movement and the second computing operation comprises a second set of steps, at least one step of one of the sets is interleaved with the steps of the other set in order to execute the steps in said interleaved order, and steps commands are defined so that during the execution of the protected software (2p), the step commands are executed by the first execution part (2pes) and respectively trigger, in the unit (6), the execution by means of the second execution part (2peu), of the steps in the interleaved order, and by producing:

a first object part (2pos) of the protected software (2p), from the source of the protected software (2ps), said first object part (2pos) being such that during the execution of the protected software (2p), appears a first execution part (2pes) which is executed in the data processing system (3) and whose at least a portion executes said steps commands in order to trigger execution of said steps in the interleaved order, and a second object part (2pou) of the protected software (2p), said second object part (2pou) being such that, after being uploaded to the blank unit (60) and during the execution of the protected software (2p), appears the second execution part (2peu) by means of which the steps triggered by the first execution (2pes) are executed, and uploading the second object part (2pou) to the blank unit (60), with the intention of obtaining the unit (6), and during a usage phase (U) during which is executed the protected software (2p):

in the presence of the unit (6) and each time a step command contained in a portion of the first execution part (2pes) imposes it, executing the corresponding step in the unit (6), so that said portion is executed correctly and that, consequently, the protected software (2p) is completely functional, and in the absence of the unit (6), in spite of the request by a portion of the first execution part (2pes) to trigger the execution of a step in the unit (6), not being able to fulfill said request correctly, so that at least said portion is not executed correctly and that, consequently the protected software (2p) is not completely functional.

2. Process according to claim 1, comprising:

during the protection phase (P):

modifying the protected software (2p):

by choosing at least one variable used in at least one chosen algorithmic processing, which during the execution of the protected software (2p), partially defines the state of the protected software (2p), by modifying at least one chosen portion of the source of the protected software (2ps), this modification being such that during the execution of the protected software (2p), at least one chosen variable or at least one copy of chosen variable resides in the unit (6), and by producing:

the first object part (2pos) of the protected software (2p), said first object part (2pos) being such that during the execution of the protected software (2p), at least one portion of the first execution part (2pes) takes also into account that at least one variable or at least one copy of variable resides in the unit (6), and the second object part (2pou) of the protected software (2p), said second object part (2pou) being such that, after upload to the unit (6) and during the execution of the protected software (2p), appears the second execution part (2peu) by means of which at least one chosen variable, or at least one copy of chosen variable resides too in the unit (6), and during the usage phase (U):
in the presence of the unit (6) each time a portion of the first execution part (2*pes*) imposes it, using a variable or a copy of variable residing in the unit (6), so that said portion is executed correctly and that, consequently, the protected software (2*p*) is completely functional,
and in the absence of the unit (6), in spite of the request by a portion of the first execution part (2*pes*) to use a variable or a copy of variable residing in the unit (6), not being able to fulfill said request correctly, so that at least said portion is not executed correctly and that, consequently the protected software (2*p*) is not completely functional.

3. Process according claim 2, comprising:
during the protection phase (P):
defining:
a set of elementary functions whose elementary functions are liable to be executed in the unit (6),
and a set of elementary commands for said set of elementary functions, said elementary commands being liable to be executed in the data processing system (3) and to trigger the execution in the unit (6), of the elementary functions,
constructing exploitation means enabling the unit (6) to execute the elementary functions of said set, the execution of said elementary functions being triggered by the execution in the data processing system (3), of the elementary commands,
and modifying the protected software (2*p*):
by modifying at least one chosen portion of the source of the protected software (2*ps*), this modification being such that:
at least one step is split so that during the execution of the protected software (2*p*), said step is executed by means of the second execution part (2*peu*), using elementary functions,
for at least one split step, elementary commands are integrated to the source of the protected software (2*ps*), so that during the execution of the protected software (2*p*), each elementary command is executed by the first execution part (2*pes*) and triggers in the unit (6), the execution by means of the second execution part (2*peu*), of an elementary function,
and a sequence of the elementary commands is chosen among the set of sequences allowing the execution of the protected software (2*p*),
and by producing:
the first object part (2*pos*) of the protected software (2*p*), said first object part (2*pos*) being such that during the execution of the protected software (2*p*), at least one portion of the first execution part (2*pes*) also executes the elementary commands according to the chosen sequence,
and the second object part (2*pou*) of the protected software (2*p*) also containing the exploitation means, said second object part (2*pou*) being such that, after upload to the unit (6) and during the execution of the protected software (2*p*), appears the second execution part (2*peu*) by means of which are also executed the elementary functions triggered by the first execution part (2*pes*),
and during the usage phase (U):
in the presence of the unit (6) and each time an elementary command contained in a portion of the first execution part (2*pes*) imposes it, executing the corresponding elementary function in the unit (6), so that said portion is executed correctly and that, consequently, the protected software (2*p*) is completely functional,
and in the absence of the unit (6), in spite of the request by a portion of the first execution part (2*pes*), to trigger the execution of an elementary function in the unit (6), not being able to fulfill said request correctly, so that at least said portion is not executed correctly and that, consequently, the protected software (2*p*) is not completely functional.

4. Process according to claim 3, comprising:
during the protection phase (P):
defining:
an instructions set whose instructions are liable to be executed in the unit (6),
a set of instructions commands for said instructions set, said instructions commands being liable to be executed in the data processing system (3) and to trigger in the unit (6) the execution of the instructions,
that the chaining of the instructions is liable to be monitored at least in part in the unit (6),
that the expected chaining must be abided by during the execution of software,
detection means (17) to implement in the unit (6) and enabling to detect that the chaining of the instructions does not abide by the expected chaining,
and coercion means (18) to implement in the unit (6) and enabling to inform the data processing system (3) and/or to modify the execution of a software, when the chaining of the instructions does not correspond to the expected one,
constructing the exploitation means also enabling the unit (6), to execute the instructions of the instructions set and to implement the detection means (17) and the coercion means (18),
and modifying the protected software (2*p*):
by modifying at least one chosen portion of the source of the protected software (2*ps*):
by transforming the elementary functions into instructions,
by choosing in the source of the protected software (2*ps*), instructions whose chaining is to be monitored,
by specifying the expected chaining by which at least some of the chosen instructions must abide during their execution in the unit (6),
and by transforming the elementary commands into instructions commands corresponding to the instructions used,
this modification being such that during the execution of the protected software (2*p*), the chaining of the instructions is monitored by means of the second execution part (2*peu*), and the fact that the expected chaining is not abided by leads to the data processing system (3) being informed and/or to a modification of the execution of the protected software (2*p*),
and by producing the second object part (2*pou*) of the protected software (2*p*) containing the exploitation means also enabling the execution of the instructions of the instructions set and also implementing the detection means (17) and the coercion means (18), said second object part (2*pou*) being such that, after upload to the unit (6) and during the execution of the protected software (2*p*), the chaining of the instructions is monitored and the fact that the expected chaining is not abided by leads to the data processing system (3) being informed and/or to a modification of the execution of the protected software (2*p*),
and during the usage phase (U):
in the presence of the unit (6):

as long as the chaining of the instructions corresponds to the expected chaining in all the modified portions of the protected software (2p), enabling said portions of the protected software (2p) to work nominally and consequently enabling the protected software (2p) to work nominally, and in the case where it is detected in a portion of the protected software (2p) that the chaining of the instructions executed in the unit (6) does not correspond to the expected one, informing the data processing system (3) of it and/or modifying the functioning of the portion of the protected software (2p), so that the functioning of the protected software (2p) is modified.

5. Process according to claim 4 comprising:

during the protection phase (P):

defining:

as a triggering command, an instruction command, as a dependent function, an instruction, as an order, at least one argument for a triggering command, corresponding at least in part to the information transmitted by the data processing system (3) to the unit (6), so as to trigger the execution of the corresponding dependent function, a method of renaming of the orders enabling to rename the orders so as to obtain triggering commands with renamed orders, and restoring means (20) designed to be used in the unit (6) during the usage phase (U), and enabling to restore the dependent function to execute, from the renamed order, constructing exploitation means enabling the unit (6) to also implement the restoring means, and modifying the protected software (2p):

by choosing in the source of the protected software (2ps), triggering commands, by modifying at least one chosen portion of the source of the protected software (2ps) by renaming the orders of the chosen triggering commands, so as to conceal the identity of the corresponding dependent functions, and by producing:

the first object part (2pos) of the protected software (2p), said first object part (2pos) being such that during the execution of the protected software (2p), the triggering commands with renamed orders are executed, and the second object part (2pou) of the protected software (2p) containing the exploitation means also implementing the restoring means (20), said second object part (2pou) being such that, after upload to the unit (6) and during the execution of the protected software (2p), the identity of the dependent functions whose execution is triggered by the first execution part (2pes) is restored by means of the second execution part (2peu), and the dependent functions are executed by means of the second execution part (2peu), and during the usage phase (U):

in the presence of the unit (6) and each time a triggering command with renamed order, contained in a portion of the first execution part (2pes) imposes it, restoring in the unit (6), the identity of the corresponding dependent function and executing it, so that said portion is executed correctly and that, consequently, the protected software (2p) is completely functional, and in the absence of the unit (6), in spite of the request by a portion of the first execution part (2pes), to trigger the execution of a dependent function in the unit (6), not being able to fulfill said request correctly, so that at least said portion is not executed correctly and that, consequently, the protected software (2p) is not completely functional.

6. Process according to claim 5, comprising:

during the protection phase (P):

defining for at least one dependent function, a family of dependent functions algorithmically equivalent, but triggered by triggering commands whose renamed orders are different, and modifying the protected software (2p):

by choosing, in the source of the protected software (2ps) at least one triggering command with renamed order, and by modifying at least one chosen portion of the source of the protected software (2ps) by replacing at least the renamed order of one chosen triggering command with renamed order, with another renamed order, triggering a dependent function of the same family.

7. Process according to claim 6, comprising:

during the protection phase (P), defining, for at least one dependent function, a family of algorithmically equivalent dependent functions:

by concatenating a field of noise to the information defining the functional part of the dependent function to execute in the unit (6), or by using the identification field of the instruction (CII) and the expected identification fields ($CIP_k$) of the operands.

8. Process according to claim 5, 6 or 7, comprising:

during the protection phase (P):

defining:

as method of renaming of the orders, a ciphering method to cipher the orders, and as restoring means (20), means implementing a deciphering method to decipher the renamed orders and thus restore the identity of the dependent functions to execute in the unit (6).

9. Process according to claim 3 comprising:

during the protection phase (P):

defining:

as a triggering command, an elementary command, as a dependent function, an elementary function, as an order, at least one argument for a triggering command, corresponding at least in part to the information transmitted by the data processing system (3) to the unit (6), so as to trigger the execution of the corresponding dependent function, a method of renaming of the orders enabling to rename the orders so as to obtain triggering commands with renamed orders, and restoring means (20) designed to be used in the unit (6) during the usage phase (U), and enabling to restore the dependent function to execute, from the renamed order, constructing exploitation means enabling the unit (6) to also implement the restoring means, and modifying the protected software (2p):

by choosing in the source of the protected software (2ps), triggering commands, by modifying at least one chosen portion of the source of the protected software (2ps) by renaming the orders of the chosen triggering commands, so as to conceal the identity of the corresponding dependent functions, and by producing:

the first object part (2pos) of the protected software (2p), said first object part (2pos) being such that during the execution of the protected software (2p), the triggering commands with renamed orders are executed, and the second object part (2*pou*) of the protected software (2*p*) containing the exploitation means also implementing the restoring means (20), said second object part (2*pou*) being such that, after upload to the unit (6) and during the execution of the protected software (2*p*), the identity of the dependent functions whose execution is triggered by the first execution part (2*pes*) is restored by means of the second execution part (2*peu*), and the dependent functions are executed by means of the second execution part (2*peu*), and during the usage phase (U):

in the presence of the unit (6) and each time a triggering command with renamed order, contained in a portion of the first execution part (2*pes*) imposes it, restoring in the unit (6), the identity of the corresponding dependent function and executing it, so that said portion is executed correctly and that, consequently, the protected software (2*p*) is completely functional, and in the absence of the unit (6), in spite of the request by a portion of the first execution part (2*pes*), to trigger the execution of a dependent function in the unit (6), not being able to fulfill said request correctly, so that at least said portion is not executed correctly and that, consequently, the protected software (2*p*) is not completely functional.

10. Process according to claim 9, comprising:

during the protection phase (P):

defining for at least one dependent function, a family of dependent functions algorithmically equivalent, but triggered by triggering commands whose renamed orders are different, and modifying the protected software (2*p*):

by choosing, in the source of the protected software (2*ps*) at least one triggering command with renamed order, and by modifying at least one chosen portion of the source of the protected software (2*ps*) by replacing at least the renamed order of one chosen triggering command with renamed order, with another renamed order, triggering a dependent function of the same family.

11. Process according to claim 10, comprising:

during the protection phase (P), defining, for at least one dependent function, a family of algorithmically equivalent dependent functions:

by concatenating a field of noise to the information defining the functional part of the dependent function to execute in the unit (6), or by using the identification field of the instruction (CII) and the expected identification fields ($CIP_k$) of the operands.

12. Process according to claim 9, 10 or 11, comprising:

during the protection phase (P):

defining:

as method of renaming of the orders, a ciphering method to cipher the orders, and as restoring means (20), means implementing a deciphering method to decipher the renamed orders and thus restore the identity of the dependent functions to execute in the unit (6).

13. Process according claim 1, comprising:

during the protection phase (P):

defining:

a set of elementary functions whose elementary functions are liable to be executed in the unit (6), and a set of elementary commands for said set of elementary functions, said elementary commands being liable to be executed in the data processing system (3) and to trigger the execution in the unit (6), of the elementary functions, constructing exploitation means enabling the unit (6) to execute the elementary functions of said set, the execution of said elementary functions being triggered by the execution in the data processing system (3), of the elementary commands, and modifying the protected software (2*p*):

by modifying at least one chosen portion of the source of the protected software (2*ps*), this modification being such that:

at least one step is split so that during the execution of the protected software (2*p*), said step is executed by means of the second execution part (2*peu*), using elementary functions, for at least one split step, elementary commands are integrated to the source of the protected software (2*ps*), so that during the execution of the protected software (2*p*), each elementary command is executed by the first execution part (2*pes*) and triggers in the unit (6), the execution by means of the second execution part (2*peu*), of an elementary function, and a sequence of the elementary commands is chosen among the set of sequences allowing the execution of the protected software (2*p*), and by producing:

the first object part (2*pos*) of the protected software (2*p*), said first object part (2*pos*) being such that during the execution of the protected software (2*p*), at least one portion of the first execution part (2*pes*) also executes the elementary commands according to the chosen sequence, and the second object part (2*pou*) of the protected software (2*p*) also containing the exploitation means, said second object part (2*pou*) being such that, after upload to the unit (6) and during the execution of the protected software (2*p*), appears the second execution part (2*peu*) by means of which are also executed the elementary functions triggered by the first execution part (2*pes*), and during the usage phase (U):

in the presence of the unit (6) and each time an elementary command contained in a portion of the first execution part (2*pes*) imposes it, executing the corresponding elementary function in the unit (6), so that said portion is executed correctly and that, consequently, the protected software (2*p*) is completely functional, and in the absence of the unit (6), in spite of the request by a portion of the first execution part (2*pes*), to trigger the execution of an elementary function in the unit (6), not being able to fulfill said request correctly, so that at least said portion is not executed correctly and that, consequently, the protected software (2*p*) is not completely functional.

14. Process according to claims 13 or 3, comprising:

during the protection phase (P):

defining:

at least one software execution characteristic, liable to be monitored at least in part in the unit (6), at least one criterion to abide by for at least one software execution characteristic, detection means (17) to implement in the unit (6) and enabling to detect that at least one software execution characteristic does not abide by at least one associated criterion, and coercion means (18) to implement in the unit (6) and enabling to inform the data processing system (3)

and/or modify the execution of a software, when at least one criterion is not abided by, constructing the exploitation means enabling the unit (6), to also implement the detection means (17) and the coercion means (18), and modifying the protected software (2p):

by choosing at least one software execution characteristic to monitor, among the software execution characteristics liable to be monitored, by choosing at least one criterion to abide by for at least one chosen software execution characteristic, by choosing in the source of the protected software (2ps), elementary functions for which at least one chosen software execution characteristic is to be monitored, by modifying at least one chosen portion of the source of the protected software (2ps), this modification being such that during the execution of the protected software (2p), at least one chosen execution characteristic is monitored by means of the second execution part (2peu), and the fact that a criterion is not abided by leads to the data processing system (3) being informed and/or to a modification of the execution of the protected software (2p), and by producing the second object part (2pou) of the protected software (2p) containing the exploitation means also implementing the detection means (17) and the coercion means (18), said second object part (2pou) being such that, after upload to the unit (6) and during the execution of the protected software (2p), at least one software execution characteristic is monitored and the fact that a criterion is not abided by leads to the data processing system (3) being informed and/or to a modification of the execution of the protected software (2p), and during the usage phase (U):

in the presence of the unit (6):

as long as all the criteria corresponding to all the monitored execution characteristics of all the modified portions of the protected software (2p) are abided by, enabling said portions of the protected software (2p) to work nominally and consequently enabling the protected software (2p) to work nominally, and if at least one of the criteria corresponding to a monitored execution characteristic of a portion of the protected software (2p) is not abided by, informing the data processing system (3) of it and/or modifying the functioning of the portion of the protected software (2p), so that the functioning of the protected software (2p) is modified.

15. Process according to claim 14, to limit usage of a protected software (2p), comprising:

during the protection phase (P):

defining:

as software execution characteristic liable to be monitored, a variable of measurement of the usage of a functionality of a software, as criterion to abide by, at least one threshold associated to each variable of measurement, and actualization means enabling to update at least one variable of measurement, constructing the exploitation means enabling the unit (6) to also implement the actualization means, and modifying the protected software (2p):

by choosing as software execution characteristic to monitor, at least one variable of measurement of the usage of at least one functionality of a software, by choosing:

at least one functionality of the protected software (2p) whose usage is liable to be monitored using a variable of measurement, at least one variable of measurement used to quantify the usage of said functionality, at least one threshold associated to a chosen variable of measurement corresponding to a limit of usage of said functionality, and at least one method of update of a chosen variable of measurement depending on the usage of said functionality, and by modifying at least one chosen portion of the source of the protected software (2ps), this modification being such that, during the execution of the protected software (2p), the variable of measurement is actualized by means of the second execution part (2peu) depending on the usage of said functionality, and at least one threshold crossing is taken into account, and during the usage phase (U), in the presence of the unit (6), and in the case where at least one threshold crossing corresponding to at least one limit of usage is detected, informing the data processing system (3) of it and/or modifying the functioning of the portion of the protected software (2p), so that the functioning of the protected software (2p) is modified.

16. Process according to claim 15, comprising:

during the protection phase (P):

defining:

for at least one variable of measurement, several associated thresholds, and different coercion means corresponding to each of said thresholds, and modifying the protected software (2p):

by choosing in the source of the protected software (2ps), at least one chosen variable of measurement to which must be associated several thresholds corresponding to different limits of usage of the functionality, by choosing at least two thresholds associated to the chosen variable of measurement, and by modifying at least one chosen portion of the source of the protected software (2ps), this modification being such that, during the execution of the protected software (2p), the crossings of the various thresholds are taken into account differently, by means of the second execution part (2peu), and during the usage phase (U):

in the presence of the unit (6):

in the case where the crossing of a first threshold is detected, enjoining the protected software (2p) not to use the corresponding functionality anymore, and in the case where the crossing of a second threshold is detected, making ineffective the corresponding functionality and/or at least one portion of the protected software (2p).

17. Process according to claim 15, comprising:

during the protection phase (P):

defining refilling means enabling to credit at least one software functionality monitored by a variable of measurement with at least one additional usage, constructing the exploitation means also allowing the unit (6) to implement the refilling means, and modifying the protected software (2p):

by choosing in the source of the protected software (2ps), at least one chosen variable of measurement enabling to limit the usage of a functionality and which must be able to be credited with at least one additional usage, and by modifying at least one chosen portion, this modification being such that during a phase called of refilling, at least one additional usage of at least one functionality corresponding to a chosen variable of measurement can be credited, and during the phase of refilling:

reactualizing at least one chosen variable of measurement and/or at least one associated threshold, so as to allow at least one additional usage of the functionality.

18. Process according to claim 14, comprising:

during the protection phase (P):

defining:

as software execution characteristic liable to be monitored, a profile of software usage, and as criterion to abide by, at least one feature of software execution, and modifying the protected software ($2p$):

by choosing as software execution characteristic to monitor at least one profile of software usage, by choosing at least one feature of execution by which at least one chosen profile of usage must abide, and by modifying at least one chosen portion of the source of the protected software ($2ps$), this modification being such that, during the execution of the protected software ($2p$), the second execution part ($2peu$) abides by all the chosen features of execution, and during the usage phase (U) in the presence of the unit (6), and in the case where it is detected that at least one feature of execution is not abided by, informing the data processing system (3) of it and/or modifying the functioning of the portion of the protected software ($2p$), so that the functioning of the protected software ($2p$) is modified.

19. Process according to claim 18, comprising:

during the protection phase (P):

defining:

an instructions set whose instructions are liable to be executed in the unit (6), a set of instructions commands for said instructions set, said instructions commands being liable to be executed in the data processing system (3) and to trigger in the unit (6) the execution of the instructions, as profile of usage, the chaining of the instructions, as feature of execution, an expected chaining for the execution of the instructions, as detection means (17), means enabling to detect that the chaining of the instructions does not correspond to the expected one, and as coercion means (18), means enabling to inform the data processing system (3) and/or to modify the functioning of the portion of protected software ($2p$) when the chaining of the instructions does not correspond to the expected one, constructing the exploitation means also enabling the unit (6) to execute the instructions of the instructions set, the execution of said instructions being triggered by the execution in the data processing system (3), of the instructions commands, and modifying the protected software ($2p$):

by modifying at least one chosen portion of the source of the protected software ($2ps$):

by transforming the elementary functions into instructions, by specifying the chaining by which must abide at least some of the instructions during their execution in the unit (6), and by transforming the elementary commands into instructions commands corresponding to the instructions used, and during the usage phase (U), in the presence of the unit (6), in the case where it is detected that the chaining of the instructions executed in the unit (6) does not correspond to the expected one, informing the data processing system (3) of it and/or modifying the functioning of the portion of the protected software ($2p$), so that the functioning of the protected software ($2p$) is modified.

20. Process according to claim 19, comprising:

during the protection phase (P):

defining:

as instructions set, an instructions set whose at least some instructions work with registers and use at least one operand with the intention of returning a result, for at least some of the instructions working with registers:

a part (PF) defining the functionality of the instruction, and a part defining the expected chaining for the execution of the instructions and including bits fields corresponding to:

an identification field of the instruction (CII), and for each operand of the instruction:

a flag field ($CD_k$), and an expected identification field ($CIP_k$) of the operand, for each register belonging to the exploitation means and used by the instructions set, a generated identification field ($CIG_v$) in which is automatically memorized the identification of the last instruction which has returned its result in said register, as detection means (17), means enabling, during the execution of an instruction, for each operand, when the flag field ($CD_k$) imposes it, to check the equality of the generated identification field ($CIG_v$) corresponding to the register used by said operand, and the expected identification field ($CIP_k$) of the origin of said operand, and as coercion means (18), means enabling to modify the result of the instructions, if at least one of the checked equalities is false.

21. Process according to claim 13, comprising:

during the protection phase (P):

defining:

an instructions set whose instructions are liable to be executed in the unit (6), a set of instructions commands for said instructions set, said instructions commands being liable to be executed in the data processing system (3) and to trigger in the unit (6) the execution of the instructions, that the chaining of the instructions is liable to be monitored at least in part in the unit (6), that the expected chaining must be abided by during the execution of software, detection means (17) to implement in the unit (6) and enabling to detect that the chaining of the instructions does not abide by the expected chaining, and coercion means (18) to implement in the unit (6) and enabling to inform the data processing system (3) and/or to modify the execution of a software, when the chaining of the instructions does not correspond to the expected one, constructing the exploitation means also enabling the unit (6), to execute the instructions of the instructions set and to implement the detection means (17) and the coercion means (18), and modifying the protected software ($2p$):

by modifying at least one chosen portion of the source of the protected software (2ps):

by transforming the elementary functions into instructions, by choosing in the source of the protected software (2ps), instructions whose chaining is to be monitored, by specifying the expected chaining by which at least some of the chosen instructions must abide during their execution in the unit (6), and by transforming the elementary commands into instructions commands corresponding to the instructions used, this modification being such that during the execution of the protected software (2p), the chaining of the instructions is monitored by means of the second execution part (2peu), and the fact that the expected chaining is not abided by leads to the data processing system (3) being informed and/or to a modification of the execution of the protected software (2p), and by producing the second object part (2pou) of the protected software (2p) containing the exploitation means also enabling the execution of the instructions of the instructions set and also implementing the detection means (17) and the coercion means (18), said second object part (2pou) being such that, after upload to the unit (6) and during the execution of the protected software (2p), the chaining of the instructions is monitored and the fact that the expected chaining is not abided by leads to the data processing system (3) being informed and/or to a modification of the execution of the protected software (2p), and during the usage phase (U):

in the presence of the unit (6):

as long as the chaining of the instructions corresponds to the expected chaining in all the modified portions of the protected software (2p), enabling said portions of the protected software (2p) to work nominally and consequently enabling the protected software (2p) to work nominally, and in the case where it is detected in a portion of the protected software (2p) that the chaining of the instructions executed in the unit (6) does not correspond to the expected one, informing the data processing system (3) of it and/or modifying the functioning of the portion of the protected software (2p), so that the functioning of the protected software (2p) is modified.

22. Process according to claim 21 comprising:

during the protection phase (P):

defining:

as a triggering command, an instruction command, as a dependent function, an instruction, as an order, at least one argument for a triggering command, corresponding at least in part to the information transmitted by the data processing system (3) to the unit (6), so as to trigger the execution of the corresponding dependent function, a method of renaming of the orders enabling to rename the orders so as to obtain triggering commands with renamed orders, and restoring means (20) designed to be used in the unit (6) during the usage phase (U), and enabling to restore the dependent function to execute, from the renamed order, constructing exploitation means enabling the unit (6) to also implement the restoring means, and modifying the protected software (2p):

by choosing in the source of the protected software (2ps), triggering commands, by modifying at least one chosen portion of the source of the protected software (2ps) by renaming the orders of the chosen triggering commands, so as to conceal the identity of the corresponding dependent functions, and by producing:

the first object part (2pos) of the protected software (2p), said first object part (2pos) being such that during the execution of the protected software (2p), the triggering commands with renamed orders are executed, and the second object part (2pou) of the protected software (2p) containing the exploitation means also implementing the restoring means (20), said second object part (2pou) being such that, after upload to the unit (6) and during the execution of the protected software (2p), the identity of the dependent functions whose execution is triggered by the first execution part (2pes) is restored by means of the second execution part (2peu), and the dependent functions are executed by means of the second execution part (2peu), and during the usage phase (U):

in the presence of the unit (6) and each time a triggering command with renamed order, contained in a portion of the first execution part (2pes) imposes it, restoring in the unit (6), the identity of the corresponding dependent function and executing it, so that said portion is executed correctly and that, consequently, the protected software (2p) is completely functional, and in the absence of the unit (6), in spite of the request by a portion of the first execution part (2pes), to trigger the execution of a dependent function in the unit (6), not being able to fulfill said request correctly, so that at least said portion is not executed correctly and that, consequently, the protected software (2p) is not completely functional.

23. Process according to claim 22, comprising:

during the protection phase (P):

defining for at least one dependent function, a family of dependent functions algorithmically equivalent, but triggered by triggering commands whose renamed orders are different, and modifying the protected software (2p):

by choosing, in the source of the protected software (2ps) at least one triggering command with renamed order, and by modifying at least one chosen portion of the source of the protected software (2ps) by replacing at least the renamed order of one chosen triggering command with renamed order, with another renamed order, triggering a dependent function of the same family.

24. Process according to claim 23, comprising:

during the protection phase (P), defining, for at least one dependent function, a family of algorithmically equivalent dependent functions:

by concatenating a field of noise to the information defining the functional part of the dependent function to execute in the unit (6), or by using the identification field of the instruction (CII) and the expected identification fields ($CIP_k$) of the operands.

25. Process according to claim 22, 23 or 24, comprising:

during the protection phase (P):

defining:

as method of renaming of the orders, a ciphering method to cipher the orders, and as restoring means (20), means implementing a deciphering method to decipher the renamed orders and thus restore the identity of the dependent functions to execute in the unit (6).

26. Process according to claim 13 comprising:

during the protection phase (P):

defining:

as a triggering command, an elementary command, as a dependent function, an elementary function, as an order, at least one argument for a triggering command, corresponding at least in part to the information transmitted by the data processing system (3) to the unit (6), so as to trigger the execution of the corresponding dependent function, a method of renaming of the orders enabling to rename the orders so as to obtain triggering commands with renamed orders, and restoring means (20) designed to be used in the unit (6) during the usage phase (U), and enabling to restore the dependent function to execute, from the renamed order, constructing exploitation means enabling the unit (6) to also implement the restoring means, and modifying the protected software (2p):

by choosing in the source of the protected software (2ps), triggering commands, by modifying at least one chosen portion of the source of the protected software (2ps) by renaming the orders of the chosen triggering commands, so as to conceal the identity of the corresponding dependent functions, and by producing:

the first object part (2pos) of the protected software (2p), said first object part (2pos) being such that during the execution of the protected software (2p), the triggering commands with renamed orders are executed, and the second object part (2pou) of the protected software (2p) containing the exploitation means also implementing the restoring means (20), said second object part (2pou) being such that, after upload to the unit (6) and during the execution of the protected software (2p), the identity of the dependent functions whose execution is triggered by the first execution part (2pes) is restored by means of the second execution part (2peu), and the dependent functions are executed by means of the second execution part (2peu), and during the usage phase (U):

in the presence of the unit (6) and each time a triggering command with renamed order, contained in a portion of the first execution part (2pes) imposes it, restoring in the unit (6), the identity of the corresponding dependent function and executing it, so that said portion is executed correctly and that, consequently, the protected software (2p) is completely functional, and in the absence of the unit (6), in spite of the request by a portion of the first execution part (2pes), to trigger the execution of a dependent function in the unit (6), not being able to fulfill said request correctly, so that at least said portion is not executed correctly and that, consequently, the protected software (2p) is not completely functional.

27. Process according to claim 26, comprising:

during the protection phase (P):

defining for at least one dependent function, a family of dependent functions algorithmically equivalent, but triggered by triggering commands whose renamed orders are different, and modifying the protected software (2p):

by choosing, in the source of the protected software (2ps) at least one triggering command with renamed order, and by modifying at least one chosen portion of the source of the protected software (2ps) by replacing at least the renamed order of one chosen triggering command with renamed order, with another renamed order, with another renamed order, triggering a dependent function of the same family.

28. Process according to claim 27, comprising:

during the protection phase (P), defining, for at least one dependent function, a family of algorithmically equivalent dependent functions:

by concatenating a field of noise to the information defining the functional part of the dependent function to execute in the unit (6), or by using the identification field of the instruction (CII) and the expected identification fields ($CIP_k$) of the operands.

29. Process according to claim 26, 27 or 28, comprising:

during the protection phase (P):

defining:

as method of renaming of the orders, a ciphering method to cipher the orders, and as restoring means (20), means implementing a deciphering method to decipher the renamed orders and thus restore the identity of the dependent functions to execute in the unit (6).

30. Process according to one of the claims 1, 2, 13, 3, 4, 21, 9, 10, 11, 26, 27, 28, 5, 6, 7, 22, 23 or 24, comprising:

during the protection phase (P):

modifying the protected software (2p):

by choosing, in the source of the protected software (2ps), at least one conditional branch carried out in at least one chosen algorithmic processing, by modifying at least one chosen portion of the source of the protected software (2ps), this modification being such that during the execution of the protected software (2p), the functionality of at least one chosen conditional branch is executed, by means of the second execution part (2peu), in the unit (6), and by producing:

the first object part (2pos) of the protected software (2p), said first object part (2pos) being such that during the execution of the protected software (2p), the functionality of at least one chosen conditional branch is executed in the unit (6), and the second object part (2pou) of the protected software (2p), said second object part (2pou) being such that, after upload to the unit (6) and during the execution of the protected software (2p), appears the second execution part (2peu) by means of which the functionality of at least one chosen conditional branch is executed, and during the usage phase (U):

in the presence of the unit (6) and each time a portion of the first execution part (2pes) imposes it, executing the functionality of at least one conditional branch in the unit (6), so that said portion is executed correctly and that, consequently, the protected software (2p) is completely functional, and in the absence of the unit (6) and in spite of the request by a portion of the first execution part (2pes) to execute the functionality of a conditional branch in the unit (6), not being able to fulfill said request correctly, so that at least said portion is not executed correctly and that consequently, the protected software (2p) is not completely functional.

31. Process according to claim 30, comprising, during the protection phase (P), modifying the protected software (2p):

by choosing, in the source of the protected software (2*ps*), at least one series of chosen conditional branches, by modifying at least one chosen portion of the source of the protected software (2*ps*), this modification being such that during the execution of the protected software (2*p*), the overall functionality of at least one chosen series of conditional branches is executed, by means of the second execution part (2*peu*), in the unit (6), and by producing:

the first object part (2*pos*) of the protected software (2*p*), said first object part (2*pos*) being such that during the execution of the protected software (2*p*), the functionality of at least one chosen series of conditional branches is executed in the unit (6), and the second object part (2*pou*) of the protected software (2*p*), said second object part (2*pou*) being such that, after upload to the unit (6) and during the execution of the protected software (2*p*), appears the second execution part (2*peu*) by means of which the overall functionality of at least one chosen series of conditional branches is executed.

32. Process according to one of the claims 1, 2, 13, 3, 4, 21, 9, 10, 11, 26, 27, 28, 5, 6, 7, 22, 23 or 24, comprising splitting the protection phase (P) into a prior protection sub-phase (P1), independent of the software to protect and a subsequent protection sub-phase (P2), dependent of the software to protect.

33. Process according to claim 32, comprising, during the prior protection sub-phase (P1), making intervene a definitions stage (S11) during which are carried out all the definitions.

34. Process according to claim 33, comprising, after the definitions stage (S11), making intervene a construction stage (S12) during which are constructed the exploitation means.

35. Process according to claim 34, comprising, after the construction stage (S12), making intervene a pre-customization stage (S13), comprising uploading to a blank unit (60), at least a part of the exploitation means with the intention of obtaining a pre-customized unit (66).

36. Process according to claim 35, comprising splitting the subsequent protection sub-phase (P2), into:

a creation stage (S21) during which the protected software (2*p*) is created, from the vulnerable software (2*v*), possibly, a modification stage (S22) during which the protected software (2*p*) is modified, and a customization stage (S23) during which:

the second object part (2*pou*) of the protected software (2*p*) possibly containing the exploitation means is uploaded to at least one blank unit (60) with the intention of obtaining at least one unit (6), or a part of the second object part (2*pou*) of the protected software (2*p*) possibly containing the exploitation means is uploaded to at least one pre-customized unit (66) with the intention of obtaining at least one unit (6).

37. Process according to claim 36, comprising, during the creation stage (S21) and possibly during the modification stage (S22), using at least one tool which help generate protected software or which automate software protection.

38. System for the implementation of the process in accordance with claim 36, characterized in that it includes a program development unit used to create or modify a protected software (2*p*).

39. System for the implementation of the process in accordance with claim 36, characterized in that it includes a customization unit (45) enabling to upload:

the second object part (2*pou*) to at least one blank unit (60), with the intention of obtaining at least one unit (6), or a part of the second object part (2*pou*) to at least one pre-customized unit (66), with the intention of obtaining at least one unit (6).

40. Unit (6) enabling to execute a protected software (2*p*) and to prevent its unauthorized usage, characterized in that it contains the second object part (2*pou*) of the protected software (2*p*) uploaded using a customization unit (45) in accordance with claim 39.

41. Computer readable storage medium containing a distribution set (2*pd*) of a protected software (2*p*), characterized in that the distribution set of the protected software includes:

a first distribution part (2*pds*) containing the first object part (2*pos*) and designed to work in a data processing system (3), and a second distribution part (2*pdu*) having the form:

of a blank unit (60), or of a pre-customized unit (66), able after upload of customization information, to transform into a unit (6) in accordance with claim 40, or of a unit (6) in accordance with claim 40.

42. Computer readable storage medium containing a distribution set (2*pd*) of a protected software (2*p*) according to claim 41, characterized in that the first distribution part (2*pds*) has the form of a physical distribution medium, a CDROM for instance, or the form of files distributed through a network.

43. Computer readable storage medium containing a distribution set (2*pd*) of a protected software (2*p*) according to claim 41, characterized in that the second distribution part (2*pdu*), having the form of blank units (60), of pre-customized units (66) or of units (6), includes at least one chip card (7).

44. Processing and memorizing unit characterized in that it contains the part of the second object part (2*pou*) necessary to transform a pre-customized unit (66) into a unit (6) in accordance with claim 40.

45. Set of processing and memorizing units characterized in that the processing and memorizing units used jointly, contain the part of the second object part (2*pou*) necessary to transform a pre-customized unit (66) into a unit (6) in accordance with claim 40.

46. Set of units (6), characterized in that the second object part (2*pou*) of the protected software (2*p*), uploaded using a customization unit (45) in accordance with claim 39, is divided out between several processing and memorizing units so that their joint use enables to execute the protected software (2*p*).

47. System for the implementation of the process in accordance with claim 35, characterized in that it includes a pre-customization unit (30) enabling to upload at least a part of the exploitation means to at least one blank unit (60), with the intention of obtaining at least one pre-customized unit (66).

48. Pre-customized unit (66), characterized in that it is obtained by the system in accordance with claim 47.

49. System for the implementation of the process in accordance with claim 34, characterized in that it includes a program development unit, used, during the construction stage (S12), to carry out the construction of the exploitation means intended for the unit (6), taking into account the definitions intervened during the definitions stage (S11).

50. Process according to claim 33, comprising, during the prior protection sub-phase (P1), making intervene a tools making stage (S14) during which are made tools enabling to help generate protected software or to automate software protection.

51. System for the implementation of the process in accordance with claim 50, characterized in that it includes a program development unit, used to carry out during the tools making stage (S14), the making of tools which help generate protected software or which automate software protection.

* * * * *